United States Patent
Walker

(10) Patent No.: US 11,055,292 B2
(45) Date of Patent: *Jul. 6, 2021

(54) SYSTEMS AND METHODS FOR GENERATING AND ARBITRATING AMONG MULTIPLE MARKET-DATA FEEDS

(71) Applicant: GTO LLC, Chicago, IL (US)

(72) Inventor: Robert James Walker, Chicago, IL (US)

(73) Assignee: GTO LLC, Chicago, IL (US)

( * ) Notice: Subject to any disclaimer, the term of this patent is extended or adjusted under 35 U.S.C. 154(b) by 136 days.

This patent is subject to a terminal disclaimer.

(21) Appl. No.: 16/197,010

(22) Filed: Nov. 20, 2018

(65) Prior Publication Data

US 2019/0155933 A1 May 23, 2019

Related U.S. Application Data

(60) Provisional application No. 62/589,255, filed on Nov. 21, 2017.

(51) Int. Cl.
*G06F 7/00* (2006.01)
*G06F 16/2455* (2019.01)
(Continued)

(52) U.S. Cl.
CPC .... *G06F 16/24568* (2019.01); *G06F 12/0868* (2013.01); *G06F 13/128* (2013.01);
(Continued)

(58) Field of Classification Search
CPC ........... G06F 16/24568; G06F 16/2474; G06F 16/2477; G06F 12/0868; G06F 16/278; G06F 16/252
See application file for complete search history.

(56) References Cited

U.S. PATENT DOCUMENTS 5,394,503 A 2/1995 Dietz
5,796,623 A 8/1998 Butts
(Continued)

FOREIGN PATENT DOCUMENTS

EP 1388982 2/2004
EP 2341661 7/2011
(Continued)

OTHER PUBLICATIONS xCelor xPort, "Faster than a meter of fiber", dated Nov. 4, 2013, 15 pages.

(Continued)

*Primary Examiner* — Mohammed R Uddin
(74) *Attorney, Agent, or Firm* — Invention Mine LLC

(57) ABSTRACT

A market data processing device (MDPD) receives, from an upstream device, an input feed of order-book updates to ticker symbols. A first market-data feed is generated at the MDPD at least in part by: filtering the input feed down to order-book updates to a ticker-symbol subset; and inserting a sequence number into each such order-book update. Also generated at the MDPD is a second market-data feed that includes the order-book updates of the first market-data feed having the same sequence numbers inserted into the same order-book updates. The first market-data feed is transmitted to an arbitration device via a first communication path. The second market-data feed is transmitted to the arbitration device via a second communication path that is separate and distinct from the first communication path for use by the arbitration device in conducting sequence-number-based arbitration between the first and second market-data feeds.

25 Claims, 45 Drawing Sheets

(51) Int. Cl.

| | | |
|---|---|---|
| *G06Q 40/04* | (2012.01) | |
| *G06F 16/25* | (2019.01) | |
| *G06F 16/27* | (2019.01) | |
| *G06F 16/2458* | (2019.01) | |
| *H04L 29/06* | (2006.01) | |
| *G06F 12/0868* | (2016.01) | |
| *G06F 13/12* | (2006.01) | |
| *G06F 13/38* | (2006.01) | |
| *G06F 13/42* | (2006.01) | |

(52) U.S. Cl.
CPC ........ *G06F 13/385* (2013.01); *G06F 13/4221* (2013.01); *G06F 16/2474* (2019.01); *G06F 16/2477* (2019.01); *G06F 16/252* (2019.01); *G06F 16/278* (2019.01); *G06Q 40/04* (2013.01); *H04L 69/165* (2013.01)

(56) References Cited

U.S. PATENT DOCUMENTS

| | | | |
|---|---|---|---|
| 6,243,510 B1 | 6/2001 | Rauch | |
| 6,278,982 B1 * | 8/2001 | Korhammer | G06Q 40/04 705/36 R |
| 6,411,598 B1 | 6/2002 | McGlade | |
| 6,597,826 B1 | 7/2003 | Ramaswami | |
| 6,728,016 B1 | 4/2004 | Hunt | |
| 6,834,139 B1 | 12/2004 | Prairie | |
| 7,013,084 B2 | 3/2006 | Battou | |
| 7,215,843 B2 | 5/2007 | Fukashiro | |
| 7,293,090 B1 | 11/2007 | Saleh | |
| 7,315,510 B1 | 1/2008 | Owens | |
| 7,796,504 B1 | 9/2010 | Owens | |
| 7,891,004 B1 | 2/2011 | Gelvin et al. | |
| 8,260,133 B2 | 9/2012 | Li | |
| 8,289,845 B1 | 10/2012 | Baldonado | |
| 8,774,232 B2 | 7/2014 | Smith | |
| 8,948,005 B1 | 2/2015 | Gert | |
| 9,674,118 B2 | 6/2017 | Walker | |
| 2001/0036181 A1 | 11/2001 | Rogers | |
| 2002/0149815 A1 | 10/2002 | Schafer | |
| 2003/0097438 A1 | 5/2003 | Bearden | |
| 2004/0129871 A1 | 7/2004 | Laberge | |
| 2005/0008284 A1 | 1/2005 | Chaudhuri | |
| 2006/0112188 A1 | 5/2006 | Albanese | |
| 2006/0146808 A1 | 7/2006 | Campini | |
| 2007/0255886 A1 | 11/2007 | Dao | |
| 2009/0287628 A1 | 11/2009 | Indeck et al. | |
| 2010/0191637 A1 | 7/2010 | Alderucci et al. | |
| 2010/0293316 A1 | 11/2010 | Mehrotra | |
| 2011/0109792 A1 | 5/2011 | Montag | |
| 2011/0170859 A1 | 7/2011 | Conklin | |
| 2011/0276707 A1 * | 11/2011 | Mast | G06Q 40/04 709/230 |
| 2012/0005062 A1 | 1/2012 | Lutnick et al. | |
| 2012/0089496 A1 * | 4/2012 | Taylor | G06Q 40/00 705/35 |
| 2012/0130919 A1 | 5/2012 | Gaber | |
| 2012/0197776 A1 | 8/2012 | Studnitzer | |
| 2012/0246052 A1 * | 9/2012 | Taylor | G06Q 40/06 705/37 |
| 2013/0113696 A1 | 5/2013 | Miller et al. | |
| 2013/0262287 A1 | 10/2013 | Parsons et al. | |
| 2014/0019327 A1 | 1/2014 | Lutnick et al. | |
| 2014/0180903 A1 * | 6/2014 | Parsons | G06Q 40/04 705/37 |
| 2014/0181133 A1 | 6/2014 | Parsons et al. | |
| 2015/0016243 A1 | 1/2015 | Haugen | |
| 2015/0271106 A1 | 9/2015 | Walker | |
| 2015/0280989 A1 | 10/2015 | Raza | |
| 2016/0078537 A1 | 3/2016 | Katsuyama et al. | |
| 2016/0078538 A1 * | 3/2016 | Katsuyama | G06Q 40/04 705/37 |
| 2016/0335302 A1 | 11/2016 | Teodorescu et al. | |
| 2016/0344788 A1 | 11/2016 | Cradick et al. | |
| 2017/0116289 A1 | 4/2017 | Deshmukh et al. | |
| 2018/0225230 A1 | 8/2018 | Litichever et al. | |
| 2018/0288102 A1 | 10/2018 | Ghosh et al. | |

FOREIGN PATENT DOCUMENTS

| | | |
|---|---|---|
| GB | 2350983 | 12/2000 |
| WO | 2013155566 | 10/2013 |

OTHER PUBLICATIONS

Vitesse, VSC3172, "6.5 Gbps 72×72 Asynchronous Crosspoint Switch", www.vitese.com, dated 2006, 2 pages.

Shah, M. Yip, Extreme Networks S: "Extreme Networks' Ethernet Automatic Protection Switching (EAPS) Version 1", Oct. 1, 2003; 20031000, Oct. 1, 2003, XP015009401, 7 pages.

"Ethernet ring protection switching", G.8032/Y.1344 (Jun. 2008):, ITU-T Standard, International Telecommunication Union, Geneva, CH, No. G.8032/Y.1344 (Jun. 2008), Jun. 22, 2008 (Jun. 22, 2008), pp. 1-46, XP017466874, [retrieved on Apr. 30, 2009], Chapter 7-9.

Notification of Transmittal of the International Search Report and the Written Opinion of the International Searching Authority, or the Declaration, for PCT/US2016/046566, dated Nov. 16, 2016, 13 pages.

Notification of Transmittal of the International Search Report and the Written Opinion of the International Searching Authority, or the Declaration, for PCT/US2016/046569, dated Oct. 17, 2016, 12 pages.

Flick, John. "Definitions of Managed Objects for the Ethernet-like Interface Types", No. RFC 3635. 2003. (64 pages).

Bach, R., et al., "Optical Performance Monitoring", Journal of Lightwave Technology, IEEE Service Center, New York, NY US, vol. 22, No. 1, Jan. 1, 2004, pp. 294-304, XP011107635, ISSN: 0733-8724, DOI: 10.1109/JLT.2003.822154. 11 pages.

International Search Report and Written Opinion for PCT/US2016/046570, dated Nov. 11, 2016, 12 pages.

PCT International Preliminary Report on Patentability PCT/US16/46566 dated Feb. 22, 2018, 9 pages.

* cited by examiner

1850

| IF-SEQ. # | SYMBOL | TYPE | ORDER # | DIR | QTY | PRICE |
|---|---|---|---|---|---|---|
| 1 | ABC | ADD-ORDER | 7002 | BUY | 100 | $7 |
| 2 | GHI | ADD-ORDER | 7003 | SELL | 50 | $9 |
| 3 | DEF | ADD-ORDER | 7004 | SELL | 200 | $8 |
| 4 | JKL | ADD-ORDER | 7005 | BUY | 75 | $8 |
| 5 | MNO | ADD-ORDER | 7006 | BUY | 300 | $7 |
| 6 | STU | ADD-ORDER | 7007 | BUY | 100 | $6 |
| 7 | ABC | ADD-ORDER | 7008 | SELL | 50 | $9 |
| 8 | STU | MODIFY-ORDER | 7007 | BUY | 50 | $6 |
| 9 | GHI | ADD-ORDER | 7009 | SELL | 100 | $6 |
| 10 | ABC | MODIFY-ORDER | 7002 | BUY | 50 | $5 |
| 11 | ABC | CANCEL-ORDER | 7008 | - | - | - |

| OF-SEQ. # | SYMBOL | SYM SEQ. # | TYPE | ORDER # | DIR | QTY | PRICE |
|---|---|---|---|---|---|---|---|
| 1 | ABC | 1 | ADD-ORDER | 7002 | BUY | 100 | $7 |
| 2 | MNO | 1 | ADD-ORDER | 7006 | BUY | 300 | $7 |
| 3 | ABC | 2 | ADD-ORDER | 7008 | SELL | 50 | $9 |
| 4 | ABC | 3 | MODIFY-ORDER | 7002 | BUY | 50 | $5 |
| 5 | ABC | 4 | CANCEL-ORDER | 7008 | - | - | - |

1860
Symbol: ABC

| ORDER # | DIR | QTY | PRICE |
|---|---|---|---|
| 7002 | BUY | 50 | $5 |
| 7008 | SELL | 50 | $9 |

1864 →

1860
Symbol: ABC

| ORDER # | DIR | QTY | PRICE |
|---|---|---|---|
| 7002 | BUY | 100 | $7 |
| 7008 | SELL | 50 | $9 |

1868 →

1860
Symbol: ABC

| ORDER # | DIR | QTY | PRICE |
|---|---|---|---|
| 7002 | BUY | 50 | $5 |

1862 →

1860
Symbol: ABC

| ORDER # | DIR | QTY | PRICE |
|---|---|---|---|
| 7002 | BUY | 100 | $7 |

| IF-SEQ. # | | OF-SEQ. # | SYMBOL | SYM SEQ. # |
|---|---|---|---|---|
| 1 | ↕ | 1 | ABC | 1 |
| 5 | ↕ | 2 | MNO | 1 |
| 7 | ↕ | 3 | ABC | 2 |
| 10 | ↕ | 4 | ABC | 3 |
| 11 | ↕ | 5 | ABC | 4 |

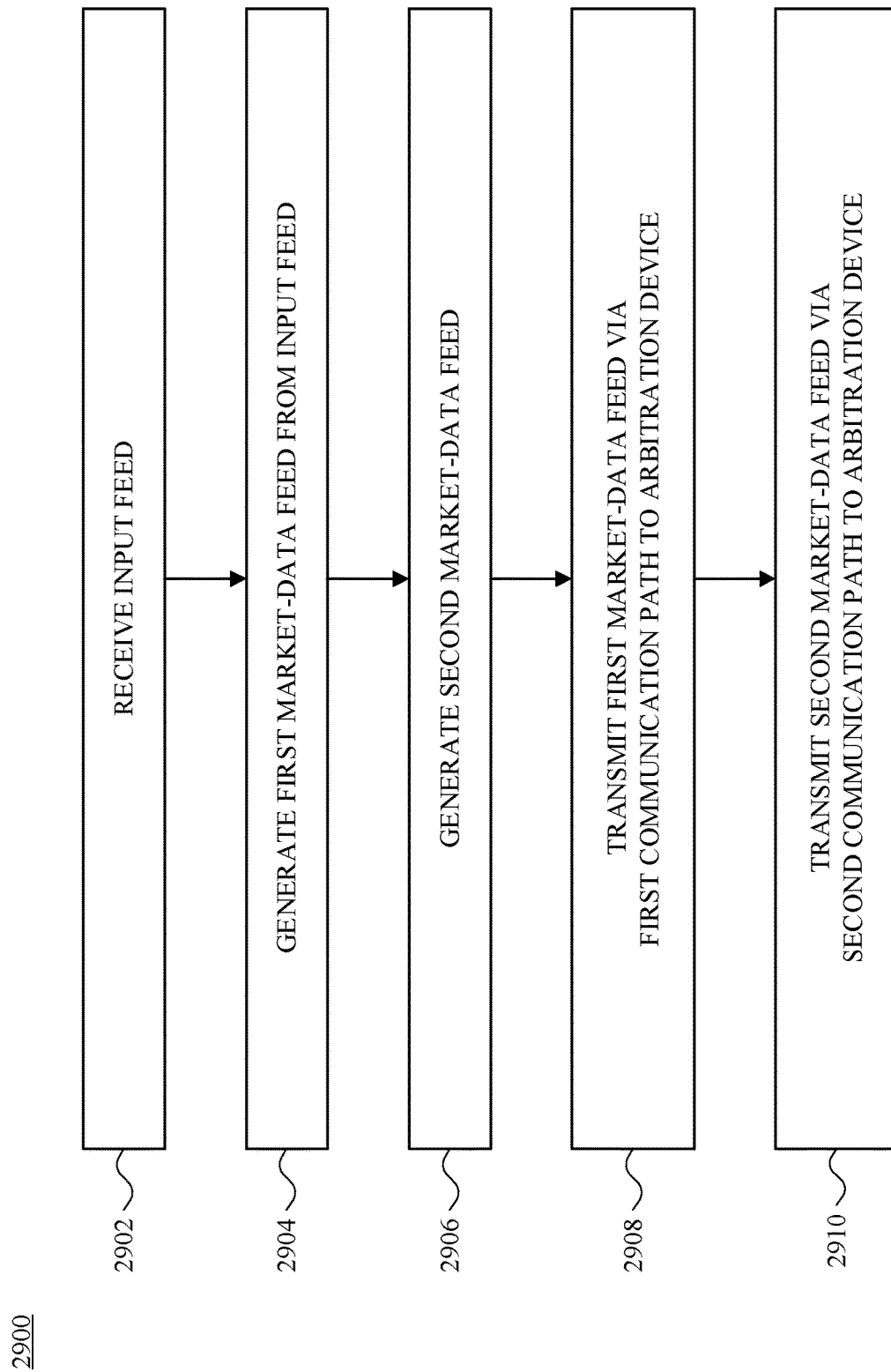

| TIME | P1 (A) | P1 (A*) | P2 (B) | P2 (B*) | G-F RESP (C) | {BUFFER} | REQ G-F | {MISSING} | SEND | LAST SENT |
|---|---|---|---|---|---|---|---|---|---|---|
| T01A | 1 | -- | -- | -- | -- | {} | -- | {} | 1 | 1 |
| T02A | 2 | -- | -- | -- | -- | {} | -- | {} | 2 | 2 |
| T03A* | -- | 1(D) | -- | -- | -- | {} | -- | {} | -- | 2 |
| T04A* | -- | 2(D) | -- | -- | -- | {} | -- | {} | -- | 2 |
| T05B | -- | -- | 1(D) | -- | -- | {} | -- | {} | -- | 2 |
| T06A* | -- | 4 | -- | -- | -- | {4} | 3 | {3} | -- | 2 |
| T06B | -- | -- | 2(D) | -- | -- | {4} | -- | {3} | -- | 2 |
| T07A | 7 | -- | -- | -- | -- | {4,7} | 5-6 | {3,5,6} | -- | 2 |
| T07A* | -- | 5 | -- | -- | -- | {4,5,7} | -- | {3,6} | -- | 2 |
| T07B | -- | -- | 3 | -- | -- | {7} | -- | {6} | 3,4,5 | 5 |
| T07B* | -- | -- | -- | 1(D) | -- | {7} | -- | {6} | -- | 5 |
| T08A | 8 | -- | -- | -- | -- | {7,8} | -- | {6} | -- | 5 |
| T08B | -- | -- | 4(D) | -- | -- | {7,8} | -- | {6} | -- | 5 |
| T08B* | -- | -- | -- | 2(D) | -- | {7,8} | -- | {6} | -- | 5 |

| TIME | P1 (A) | P1 (A*) | P2 (B) | P2 (B*) | G-F RESP (C) | {BUFFER} | REQ G-F | {MISSING} | SEND | LAST SENT |
|---|---|---|---|---|---|---|---|---|---|---|
| T09A | 9 | --- | --- | --- | --- |  | --- |  | --- | 5 |
| T09A* | --- | 7(D) | --- | --- | --- | {7,8,9} | --- | {6} | --- | 5 |
| T09B | --- | --- | 5(D) | --- | --- | {7,8,9} | --- | {6} | --- | 5 |
| T09B* | --- | --- | --- | 3(D) | --- | {7,8,9} | --- | {6} | --- | 5 |
| T10A | 10 | --- | --- | --- | --- | {7,8,9,10} | --- | {6} | --- | 5 |
| T10A* | --- | 8(D) | --- | --- | --- | {7,8,9,10} | --- | {6} | --- | 5 |
| T10B* | --- | --- | --- | 4(D) | --- | {7,8,9,10} | --- | {6} | --- | 5 |
| T11A | 11 | --- | --- | --- | --- | {7,8,9,10,11} | --- | {6} | --- | 5 |
| T11A* | --- | 9(D) | --- | --- | --- | {7,8,9,10,11} | --- | {6} | --- | 5 |
| T11B | --- | --- | 7(D) | --- | --- | {7,8,9,10,11} | --- | {6} | --- | 5 |
| T11B* | --- | --- | --- | 5(D) | --- | {7,8,9,10,11} | --- | {6} | --- | 5 |
| T12A | 12 | --- | --- | --- | --- | {7,8,9,10,11,12} | --- | {6} | --- | 5 |
| T12A* | --- | 10(D) | --- | --- | --- | {7,8,9,10,11,12} | --- | {6} | --- | 5 |
| T12B | --- | --- | 8(D) | --- | --- | {7,8,9,10,11,12} | --- | {6} | --- | 5 |

FIG. 37B

| TIME | P1 (A) | P1 (A*) | P2 (B) | P2 (B*) | G-F RESP (C) | {BUFFER} | REQ G-F | {MISSING} | SEND | LAST SENT |
|---|---|---|---|---|---|---|---|---|---|---|
| T13A | 13 | -- | -- | -- | -- | {7,8,9,10,11,12,13} | -- | {6} | -- | 5 |
| T13A* | -- | 11(D) | -- | -- | -- | {7,8,9,10,11,12,13} | -- | {6} | -- | 5 |
| T13B | -- | -- | 9(D) | -- | -- | {7,8,9,10,11,12,13} | -- | {6} | -- | 5 |
| T13B* | -- | -- | -- | 7(D) | -- | {7,8,9,10,11,12,13} | -- | {6} | -- | 5 |
| T14A | 14 | -- | -- | -- | -- | {7,8,9,10,11,12,13,14} | -- | {6} | -- | 5 |
| T14A* | -- | 12(D) | -- | -- | -- | {7,8,9,10,11,12,13,14} | -- | {6} | -- | 5 |
| T14B | -- | -- | 10(D) | -- | -- | {7,8,9,10,11,12,13,14} | -- | {6} | -- | 5 |
| T14B* | -- | -- | -- | 8(D) | -- | {7,8,9,10,11,12,13,14} | -- | {6} | -- | 5 |
| T14C | -- | -- | -- | -- | 3(D) | {7,8,9,10,11,12,13,14} | -- | {6} | -- | 5 |
| T15A | 15 | -- | -- | -- | -- | {7,8,9,10,11,12,13,14,15} | -- | {6} | -- | 5 |
| T15A* | -- | 13(D) | -- | -- | -- | {7,8,9,10,11,12,13,14,15} | -- | {6} | -- | 5 |
| T15B | -- | -- | 11(D) | -- | -- | {7,8,9,10,11,12,13,14,15} | -- | {6} | -- | 5 |
| T15B* | -- | -- | -- | 9(D) | -- | {7,8,9,10,11,12,13,14,15} | -- | {6} | -- | 5 |
| T15C1 | -- | -- | -- | -- | 5(D) | {7,8,9,10,11,12,13,14,15} | -- | {6} | -- | 5 |
| T15C2 | -- | -- | -- | -- | 6 | {} | -- | {} | 6-15 | 15 |
| T16A | 16 | -- | -- | -- | -- | {} | -- | {} | 16 | 16 |
| T17A | 17 | -- | -- | -- | -- | {} | -- | {} | 17 | 17 |

FIG. 37C

SYSTEMS AND METHODS FOR GENERATING AND ARBITRATING AMONG MULTIPLE MARKET-DATA FEEDS

CROSS-REFERENCE TO RELATED APPLICATIONS

This application claims the benefit of U.S. Provisional Application No. 62/589,255, filed Nov. 21, 2017, the contents of which is hereby incorporated by reference herein in its entirety. This application incorporates by reference U.S. patent application Ser. No. 16/196,983, naming inventor Robert James Walker, entitled "SYSTEMS AND METHODS FOR GENERATING CUSTOMIZED FILTERED-AND-PARTITIONED MARKET-DATA FEEDS", U.S. patent application Ser. No. 16/196,989, naming inventor Robert James Walker, entitled "SYSTEMS AND METHODS FOR TARGETED EXCHANGE EMULATION", and U.S. patent application Ser. No. 16/197,015, naming inventor Robert James Walker, entitled "SYSTEMS AND METHODS FOR DISTRIBUTED ARCHITECTURE OF MARKET-DATA PROCESSING DEVICE", each of which filed on the same filing date as the present application.

BACKGROUND

Many business transactions, including those that involve the purchase and sale of securities, are conducted over digital networks. Such transactions generate a large and ever-increasing amount of raw real-time data. The handling of large streams of market data introduces numerous challenges.

SUMMARY

Presently disclosed are systems and methods for generating and arbitrating among multiple market-data feeds.

One embodiment takes the form of a method that includes receiving, by an MDPD, from an upstream device, an input feed of order-book updates to respective ticker symbols in a plurality of ticker symbols. The method also includes generating, at the MDPD, a first market-data feed at least in part by (i) filtering the received input feed down to a filtered feed of order-book updates by keeping only order-book updates to the respective ticker symbols in a ticker-symbol subset and (ii) inserting a sequence number into each order-book update in the first market-data feed. The method also includes generating, at the MDPD, a second market-data feed that includes the order-book updates of the first market-data feed having the same respective sequence numbers inserted into the same respective order-book updates. The method also includes transmitting the first market-data feed via a first communication path to an arbitration device. The method also includes transmitting the second market-data feed via a second communication path, separate and distinct from the first communication path, to the arbitration device for use by the arbitration device in conducting sequence-number-based arbitration between the first and second market-data feeds.

Another embodiment takes the form of an MDPD that includes a communication interface, a processor, and data storage containing instructions executable by the processor for causing the MDPD to carry out at least the functions listed in the preceding paragraph.

Another embodiment takes the form of an MDPD that includes a communication interface that is configured to receive, from an upstream device, an input feed of order-book updates to respective ticker symbols in a plurality of ticker symbols. The MDPD also includes a feed-generation module that is configured to generate a first market-data feed at least in part by (i) filtering the received input feed down to a filtered feed of order-book updates by keeping only order-book updates to the respective ticker symbols in a ticker-symbol subset and (ii) inserting a sequence number into each order-book update in the first market-data feed. The feed-generation module is further configured to generate a second market-data feed that includes the order-book updates of the first market-data feed having the same respective sequence numbers inserted into the same respective order-book updates. The communication module is further configured to (i) transmit the first market-data feed via a first communication path to an arbitration device and (ii) transmit the second market-data feed via a second communication path, separate and distinct from the first communication path, to the arbitration device for use by the arbitration device in conducting sequence-number-based arbitration between the first and second market-data feeds.

Another embodiment takes the form of a method that includes receiving, from an upstream device via a first communication path, a pre-arbitration first market-data feed of order-book updates to respective ticker symbols in a plurality of ticker symbols. Each order-book update in the pre-arbitration first market-data feed includes a respective sequence number. The method also includes receiving, from the upstream device, one or more supplemental market-data feeds of order-book updates to respective ticker symbols in the plurality of ticker symbols. Each order-book update in each supplemental market-data feed includes a respective sequence number. Order-book updates having the same sequence numbers in both the pre-arbitration first market-data feed and a supplemental market-data feed represent the same updates to the same ticker symbols. Receiving the one or more supplemental market-data feeds includes receiving a second market-data feed via a second communication path that is separate and distinct from the first communication path. The method also includes generating a post-arbitration first market-data feed at least in part by (i) including all order-book updates received in the pre-arbitration first market-data feed in the post-arbitration first market-data feed; (ii) identifying gaps of one or more order-book updates missing from the pre-arbitration first market-data feed; and (iii) patching, in the post-arbitration first market-data feed, one or more of the gaps identified as missing from the pre-arbitration first market-data feed with one or more matching-sequence-numbered order-book updates received in at least one of the supplemental market-data feeds. The method also includes outputting the post-arbitration first market-data feed to a market-data processor.

Another embodiment takes the form of an arbitration device that includes a communication interface, a processor, and data storage containing instructions executable by the processor for causing the arbitration device to carry out at least the functions listed in the preceding paragraph.

Another embodiment takes the form of a downstream device that includes an arbitration module and a feed-processing module. The arbitration module is configured to receive, from an upstream device via a first communication path, a pre-arbitration first market-data feed of order-book updates to respective ticker symbols in a plurality of ticker symbols. Each order-book update in the pre-arbitration first market-data feed includes a respective sequence number. The arbitration module is further configured to receive, from the upstream device, one or more supplemental market-data feeds of order-book updates to respective ticker symbols in the plurality of ticker symbols. Each order-book update in each supplemental market-data feed includes a respective sequence number. Order-book updates having the same sequence numbers in both the pre-arbitration first market-data feed and a supplemental market-data feed represent the same updates to the same ticker symbols. The arbitration module being configured to receive the one or more supplemental market-data feeds includes the arbitration module being configured to receive a second market-data feed via a second communication path that is separate and distinct from the first communication path. The arbitration module is further configured to generate a post-arbitration first market-data feed at least in part by (i) including all order-book updates received in the pre-arbitration first market-data feed in the post-arbitration first market-data feed; (ii) identifying gaps of one or more order-book updates missing from the pre-arbitration first market-data feed; and (iii) patching, in the post-arbitration first market-data feed, one or more of the gaps identified as missing from the pre-arbitration first market-data feed with one or more matching-sequence-numbered order-book updates received in at least one of the supplemental market-data feeds. The arbitration module is further configured to output the post-arbitration first market-data feed to the feed-processing module. The feed-processing module is configured to receive the post-arbitration first market-data feed from the arbitration module. The feed-processing module is further configured to process the post-arbitration first market-data feed.

BRIEF DESCRIPTION OF THE DRAWINGS

FIG. 18A depicts a third example input feed, in accordance with at least one embodiment.

FIG. 18B depicts a third example output feed, in accordance with at least one embodiment.

FIG. 18C includes a plurality of example views of an example active order list that is based on the third example output feed of FIG. 18B, in accordance with at least one embodiment.

FIG. 18D depicts example input-feed-to-output-feed mapping data correlating the order-book updates of the third example input feed of FIG. 18A with the order-book updates of the third example output feed of FIG. 18B, in accordance with at least one embodiment.

FIG. 29 is a flowchart of an example method, in accordance with at least one embodiment.

FIG. 37A is the first of three parts of an example timetable that tracks an example handling by an example arbitration device of multiple example order-book updates received among multiple different market-data feeds, in accordance with at least one embodiment.

FIG. 37B is the second of the three parts of the example timetable that begins on FIG. 37A, in accordance with at least one embodiment.

FIG. 37C is the third of the three parts of the example timetable that begins on FIG. 37A, in accordance with at least one embodiment.

Figure 1:
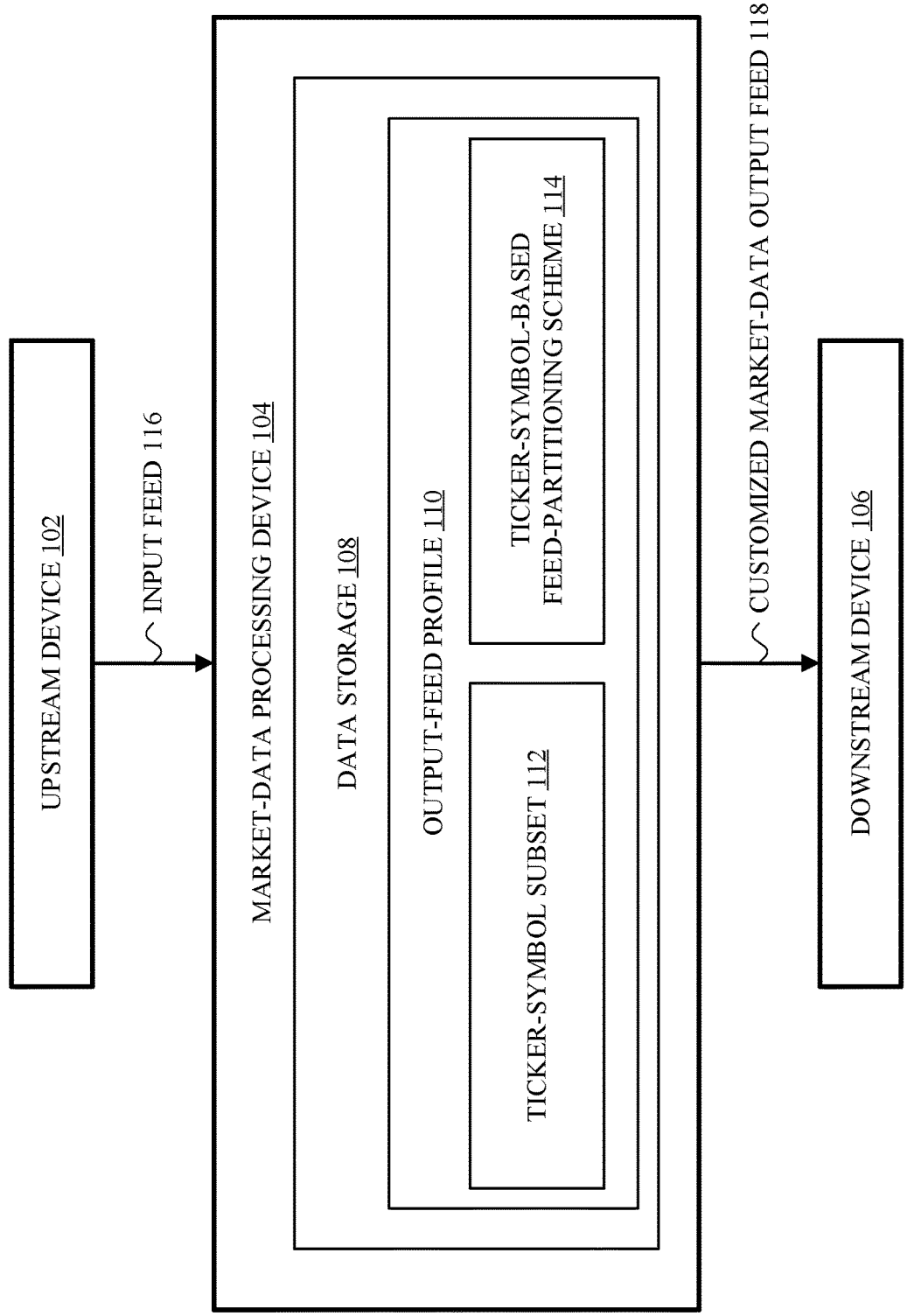
FIG. 1 is a first view of an example communication system that includes an example upstream device, an example market-data processing device (MDPD), and an example downstream device, in accordance with at least one embodiment.

Moreover, before proceeding with this disclosure, it is noted that the entities, connections, arrangements, and the like that are depicted in—and described in connection with—the various figures are presented by way of example and not by way of limitation. As such, any and all statements or other indications as to what a particular figure "depicts", what a particular element or entity in a particular figure "is" or "has", and any and all similar statements—that may in isolation and out of context be read as absolute and therefore limiting—can only properly be read as being constructively preceded by a clause such as "In at least one embodiment . . . ." And it is for reasons akin to brevity and clarity of presentation that this implied leading clause is not repeated ad nauseum in the below detailed description of the drawings.

Furthermore, in the present disclosure, one or more elements of one or more embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more PLCs (e.g., one or more field programmable gate arrays (FPGAs)), one or more memory devices, and/or the like) deemed suitable by those of skill in the relevant art for a given implementation. Each described module also includes instructions executable by the aforementioned hardware for carrying out the one or more functions described herein as being carried out by that module. Those instructions could take the form of or include hardware (i.e., hardwired) instructions, firmware instructions, software instructions, and/or the like, and may be stored in any suitable non-transitory computer-readable medium or media, such as those often referred to as random-access memory (RAM), read-only memory (ROM), and/or the like.

DETAILED DESCRIPTION

Market data that originates from an exchange (or other trading venue)—such as Nasdaq (which originally stood for "National Association of Securities Dealers Automated Quotations"), the New York Stock Exchange (NYSE), the Chicago Mercantile Exchange (CME), and/or the like—conveys current values of the frequently changing prices of the assets that are listed on the particular exchange. Such assets could include stocks, futures, derivative products, and/or the like. This market data conveys the cumulative ability and willingness of the exchange participants to buy and sell various quantities of the various assets at various different prices—i.e., to buy a specified quantity of shares of a specified asset for no more than a specified per-share bidding price or to sell a specified quantity of shares of a specified asset for no less than a specified per-share asking price. In typical exchange parlance, the difference between the lowest current per-share bidding price and the highest current per-share asking price for a given traded asset is known as "the spread" for that asset.

In most contexts, consumers of such market data consider it to be quite important that a given feed of market data to which they subscribe be conveyed to them reliably, with as little latency (i.e., delay) as possible, and with as much latency determinism (i.e., consistency and therefore predictability with respect to latency) as possible. Such consumer demands strain the computing and communication capacity of the industry due at least in part to the typically cumbersome nature of the market data in such feeds. This is largely for three reasons: (1) it is simply a great deal of information, (2) the amount of bandwidth (i.e., the capacity of a given medium to convey data at a certain effective rate (i.e., a certain quantum of data per a certain unit time)) that will be needed at any given time is unpredictable, and (3) the typical arrangement of market data makes it quite difficult to provide—and consequently to receive—only meaningful subsets of the vast amount of data that emanates from its respective exchange in these unpredictable fits and starts.

Moreover, market-data volumes (measured in, e.g., messages per second) are higher than ever and continue to increase. There are at least two reasons for this. First, the U.S. trading landscape is becoming increasingly fragmented for at least the reason that certain deregulation—that made permissible the trading of a single security on multiple venues—has led to the formation of new venues. Second, innovation has led to a proliferation of new and interesting financial products, almost all of which have a 'fair value' that is a derivative of other, existing products. As an illustrative example, there was a time when a move of the front-month Standard & Poor's (S&P) 500 futures contract at the CME would merely cause arbitrageurs to move the prices of the 500 stock constituents of that well-known index. In more recent times, however, such a move precipitates the immediate subsequent move of many hundreds or thousands of secondary and tertiary financial products. As trading participants arbitrage these secondary and tertiary financial products to reflect the instantaneous change in perceived fair value, the number of messages per second spikes enormously though only for a very brief period.

This is one reason that a market-data feed that is conveying this information can experience high volume even when relatively little trading is happening (i.e., even when market volatility is relatively low). And it will be appreciated by those of skill in the art with the benefit of this disclosure that communication links that may have sufficient bandwidth to handle this market-data traffic if it were sufficiently uniformly temporally distributed throughout the day often do not have sufficient bandwidth to handle these messaging spikes without significant buffering and even dropping of packets. Because market-data-feed packets are often sent using the unreliable User Datagram Protocol (UDP) as the transport-layer (i.e., layer 4) protocol, this can cause significant problems for consumers that are attempting to keep track of the changing asset prices of these securities in real-time.

As these trends—toward increased fragmentation of the trading landscape, increased pervasiveness of secondary and tertiary financial products, and corresponding increased messaging volume and messaging-spike severity—continue, it becomes ever more important to reduce the volume of market data before "putting it on the wire" (i.e., transmitting it) to the downstream consumer. The alternative—to endeavor to stay ahead of these trends by purchasing ever more powerful (and more expensive) equipment (e.g., servers, routers, switches, and the like) and ever bigger (and more expensive) "pipes" for data transmission—is becoming an ever more intractable solution in today's world. This is true for at least the reason that a meaningful upgrade requires an upgrade of every transmission link and every piece of link-termination equipment on a given communication path. A chain is truly only as strong as its weakest link.

One way to reduce the average amount of data per unit time—and the correlated magnitude of any message spikes—that a given communication link is asked to handle is to filter the market data down to a subset of the market-data feed according to one or more criteria prior to putting that market data on the wire. This is among the subject matter of U.S. Pat. No. 9,674,118, entitled "System and Method for Low-Latency Network Data Switching", which issued Jun. 6, 2017 to Applicant xCelor LLC of Chicago, Ill., and which is hereby incorporated herein by reference in its entirety. This pre-transmission filtering of course incurs a cost in terms of time (i.e., latency) prior to sending out the market-data feed, but that cost may well be worth it in light of the commensurate improvement in metrics such as (increasing) latency determinism and (decreasing) packet loss.

In cases where only a single physical link is available between a point A (i.e., a transmitter of a market-data feed) and a point B (i.e., a recipient of that market-data feed), a reduction in the overall amount of market data that is transferred from point A to point B may be the only option (outside of infrastructure upgrades) for achieving the aforementioned goals of sufficiently high latency determinism and sufficiently low packet loss while maintaining sufficiently low latency. This is simply the one-link base case, however, for the more general goal of having adequate per-link capacity to handle even message-spike data rates.

Thus, if multiple physical links between point A and point B are available, this goal can be achieved in some instances by segmenting the market-data feed across those multiple links—so as to acceptably reduce the overall and instantaneous demand on any one of them—and recombining the information at point B. The availability of this option depends of course on a network administrator having sufficient resources to establish the above-mentioned N separate communication links from point A to point B. Again, some latency will be incurred on the sender side in conducting the segmentation, and some latency will be incurred on the receiver side in conducting the recombination. But again, these costs may well be worth it to achieve high determinism and low packet loss with a still acceptably low level of latency.

The above-described segmentation of a market-data feed across separate physical communication links is one example mechanism for what is described herein as partitioning a market-data feed. As the term is used herein, to partition a market-data feed means to subdivide or channelize the feed by shunting the packets that make up the feed among N distinct channels for transmission from a given point A to a given point B. It is further noted that, as explained herein, there could be more than one point B (i.e., a point B1, a point B2, etc.) for a given customized market-data output feed according to the present systems and methods. Moreover, in this disclosure, N is an integer greater than 1. Accordingly, in the parlance of this disclosure, a partitioned market-data feed has 2 or more partitions; correspondingly, a non-partitioned feed is referred to as such (rather than being referred to as a one-partition feed or as a single-partition feed). This is for semantic consistency and clarity, and not by way of limitation.

Partitioning is a many-faceted subject along at least three dimensions. First, there are of course as many options for N as there are integers greater than one. Second, there are countless options for deciding which packets to shunt into which partitions. Third, there are numerous alternatives for partitioning mechanisms that one could use to actually realize the partitioning. Examples along each of these dimensions are discussed herein.

In cases where the partitioning mechanism is to use a separate physical medium on a per-partition basis, partitioning may be important in actually getting all of the required data from point A to point B in an acceptable timeframe. Some partitioning mechanisms, however, are agnostic to the number of physical transmission links that are utilized in a given implementation. Two such example partitioning mechanisms that are used herein are (i) partitioning by IP-multicast-destination addressing and (ii) partitioning by transmission in a repeating sequential position and/or timeslot. These sorts of partitioning mechanisms assist recipients to the extent the partitioning scheme is known to and useful to the recipient, such that the recipient can shunt received packets to different internal processes and/or other devices based on the partition in which the packets are received (i.e., without having to inspect packet-payload contents prior to making routing decisions). If partitioning is done in a way, however, that is either or both of not known to and not useful to the recipient, this partitioning will likely fall somewhere between being irrelevant to the recipient and being a burden on the recipient.

Modern switches and routers allow partitioning based on packet metadata such as IP multicast destination addresses and/or ports. Partitioning market-data feeds from modern exchanges, however, is easier said than done. As a general matter, partitioning with a generic network switch or router requires that the publisher of the data—i.e., the exchange itself—has 'packaged' it appropriately. Nasdaq does not partition its equity market data at all: all data is published on a single multicast channel—a consumer can receive all or none with no options in between. As another example, Bats Global Markets (Bats), which is a Chicago Board Options Exchange (CBOE) company, offers BZX equity data on 32 different multicast channels, each of which conveys updates for an alphabetically grouped set of ticker symbols. These groupings may be useful to some consumers but are arbitrary and limiting by nature for at least the reason that secondary and tertiary financial products are often traded under symbols that start with a different letter of the alphabet than the symbol of which they are derivative products. As another example, CME partitions its data by sector: financials, energy, metals, etc. This grouping is less arbitrary though still inflexible and therefore limiting.

In today's world, market-data feeds are constructed once by their associated exchange and delivered to all consumers according to an exchange-specific standard menu of (zero or more) choices. Moreover, current switches and routers can make decisions based on packet metadata such as multicast channel/port, source IP address, and the like, but by design are ignorant of the content of the messages themselves: they are built to be generic, able to be applied to any switching problem the world can throw at them. Embodiments of the present systems and methods spring from these observations and others, and for the first time offer consumers the ability to partition a market-data feed in a way that is useful specifically to them, and to change their mind at any time. Additionally, embodiments of the present systems and methods offer consumers the ability to filter and partition market-data feeds, and to receive those filtered-and-partitioned market-data feeds if they so desire formatted according to a market-data protocol of their choosing regardless of the market-data protocol in which the originating exchange formatted the same substantive data.

Moreover, any of the variations and permutations described in this disclosure can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and/or characterize such embodiments FIG. 1 is a first view of an example communication system involving an example upstream device, an example MDPD, and an example downstream device, in accordance with at least one embodiment. In particular, FIG. 1 depicts a view 100 that includes an upstream device 102, an MDPD 104, and a downstream device 106. As can be seen in FIG. 1, the MDPD 104 (i) receives an input feed 116 (e.g., the market-data feed available from Nasdaq) from the upstream device 102 (e.g., a Nasdaq server) and (ii) transmits a customized filtered-and-partitioned market-data output feed 118—which is also referred to hereinafter at times as "the customized market-data output feed 118", "the output feed 118", and/or the like—to the downstream device 106 (e.g., a client device arranged to consume the output feed 118). The particulars of how the MDPD 104 in various different embodiments generates the output feed 118 from the input feed 116 are described throughout this disclosure, as the view 100 is provided by way of a high-level overview.

The MDPD 104 includes data storage 108 that contains what is referred to herein as an output-feed profile 110. As shown in FIG. 1, the output-feed profile 110 contains (i.e., contains data defining) a ticker-symbol subset 112 and a ticker-symbol-based feed-partitioning scheme 114. As described further herein, the MDPD 104 uses the output-feed profile 110—including the ticker-symbol subset 112 and the ticker-symbol-based feed-partitioning scheme 114—in generating the output feed 118 from the input feed 116. In at least one embodiment, it is expected that the one-way traversal time of the MDPD 104 by a given order-book update from being received by the MDPD 104 in the input feed 116 to being retransmitted by the MDPD 104 in the output feed 118 to be on the order of 500 nanoseconds (ns) to 1 microsecond ($\mu$s), and typically closer to 500 ns.

In at least one embodiment, the upstream device 102 resides at a financial exchange from which the input feed 116 originates. In at least one embodiment, the upstream device 102 is an upstream MDPD—i.e., MDPDs can be daisy-chained together to accomplish even more powerful functionality than is possible with a single MDPD. In at least one embodiment, the downstream device 106 is a client device. In at least one embodiment, the downstream device 106 is a downstream MDPD as part of a daisy-chaining arrangement.

Among the benefits and advantages of the present systems and methods is that, in at least some embodiments, the MDPD 104 emulates an exchange such as Nasdaq, NYSE, CME, and/or the like. In various different embodiments, the MDPD 104 emulates an exchange in a number of ways.

First, in some embodiments, the MDPD 104 emulates an exchange at least in part by generating and transmitting one or more market-data feeds (such as the output feed 118) formatted according to a protocol (e.g., Nasdaq ITCH) used by an exchange, such that a downstream device (such as the downstream device 106) that is (assumed in this example to be) configured to handle Nasdaq ITCH data would be able to handle the data in the output feed 118.

Second, in some embodiments, the MDPD 104 emulates an exchange at least in part by providing gap-fill and/or late-join services to the downstream device 106 (and perhaps one or more additional downstream devices), such that the downstream device 106 need only ask the MDPD 104 for any of the downstream device 106's gap-fill and/or late-join needs, and in particular the downstream device 106 need not contact the actual exchange (e.g., the upstream device 102) with gap-fill or late-join requests.

Thus, in at least one embodiment, the MDPD 104 conducts intelligent switching, which is switching with knowledge of the data flowing through the "pipes". In an example scenario, the input feed 116 contains ticks (i.e., order-book updates) on 10,000 symbols and the output feed 118 filters that down to the updates that pertain to a certain 300-symbol subset of those 10,000 symbols. This has a significant impact on the amount of data conveyed: less bandwidth is required and microbursts (i.e., messaging spikes) are substantially smoothed. This in turn means that smaller pipes are needed. Indeed, it may even permit a downgrade in expensive infrastructure despite growing market-data volumes.

Figure 2:
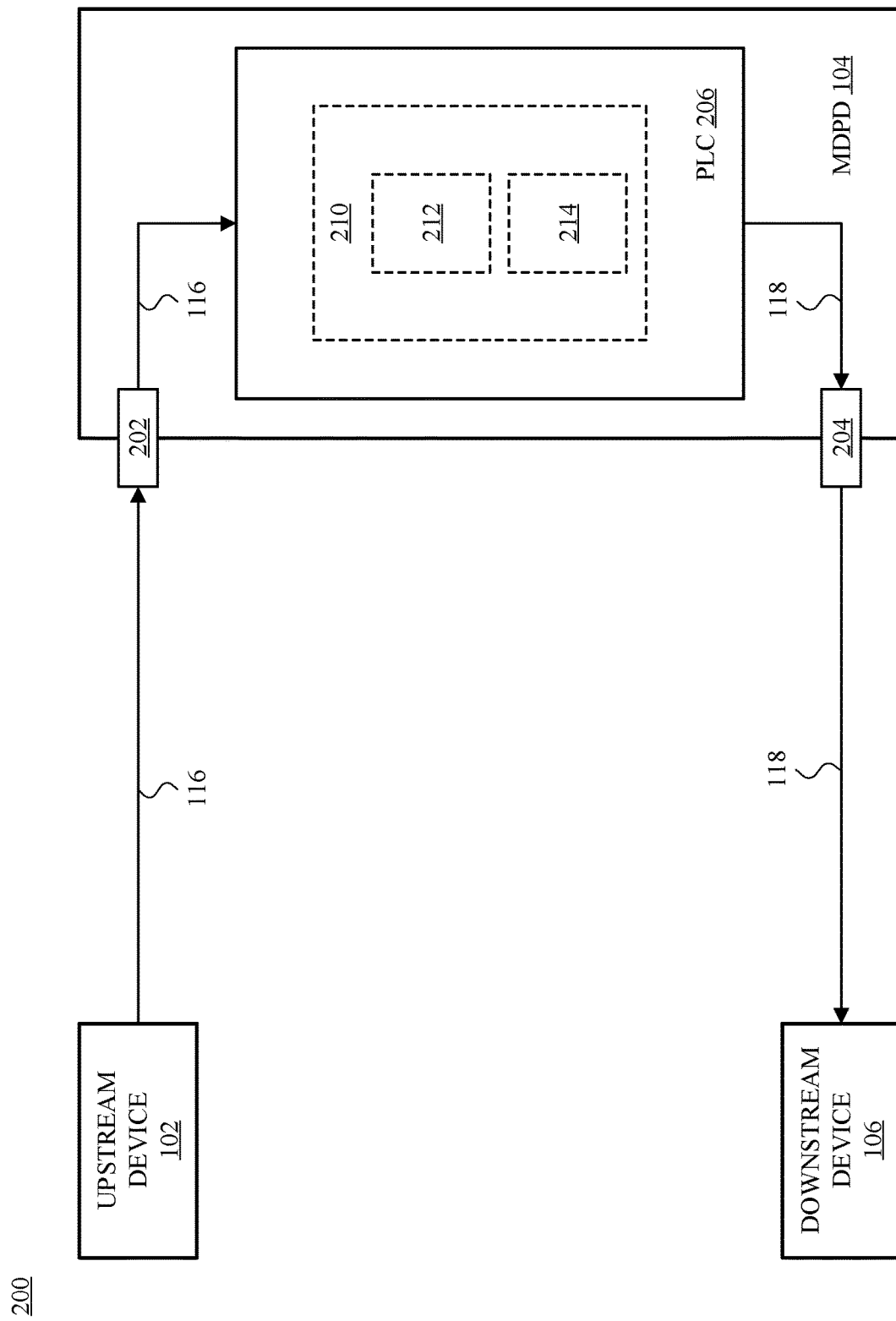
FIG. 2 is a second view of the example communication system of FIG. 1, in accordance with at least one embodiment.

FIG. 2 is a second view of the example communication system of FIG. 1, in accordance with at least one embodiment. In particular, FIG. 2 is a view 200 that, like the view 100 of FIG. 1, shows the upstream device 102, the MDPD 104, and the downstream device 106, as well as the input feed 116 and the output feed 118. In FIG. 2, the data storage 108 containing the output-feed profile 110 is not explicitly depicted. As is the case with FIG. 2, it is the case with a number of the figures in this disclosure that certain aspects are left out of certain figures for clarity of presentation, and also to demonstrate that the present systems and methods can be implemented using a wide array of various different hardware architectures.

The MDPD 104 may have a plurality of (e.g., more than two) external data ports, though only two are depicted in FIG. 2: an external data port 202 and an external data port 204. In the example shown in FIG. 2, the MDPD 104 is configured to receive the input feed 116 from the upstream device 102 via the external data port 202, and is configured to transmit the output feed 118 to the downstream device 106 via the external data port 204. The external data ports (including 202 and 204 and any others that may be present) of the MDPD 104 could be any suitable communication ports, such as small form-factor pluggable (SFP) data ports, enhanced small form-factor pluggable (SFP+) data ports, quad-small form-factor pluggable (QSFP) data ports, enhanced quad small form-factor pluggable (QSFP+) data ports, and/or the like.

It is noted that both the input feed 116 and the customized market-data output feed 118 are labeled at multiple places (in this case two each) in FIG. 2 in order to show that certain elements, such as the external data ports 202 and 204 in this case, are essentially pass-through elements that do not substantively change the data that passes through them. This convention is followed in ensuing figures as well.

As is known in the art, the input feed 116 may be (i.e., may be or at least include) a feed of order-book updates to respective ticker symbols in a plurality of ticker symbols, where that plurality of ticker symbols could be, for example, the full set of ticker symbols in the Nasdaq feed (i.e., the full set of ticker symbols that are potentially though not necessarily present in the Nasdaq feed at any given moment—i.e., the full set of ticker symbols that are traded on Nasdaq). The input feed 116 could be, for example, a feed from Nasdaq in the ITCH format, a feed from a financial exchange, a feed from an upstream MDPD, a feed from the NYSE in the XDP format, and/or another feed in another format from another financial exchange. In many implementations, a market-data feed is sent as a series of UDP packets. And certainly other possibilities could be listed here as well.

Thus an example order-book update in an incremental feed such as the input feed 116 might convey information such as "there is a new buyer offering to buy 1,000 shares of XYZ (an arbitrary stock symbol) for no more than $124.61 per share; this order shall henceforth be known as order number 11442". Of course the formatting of such an order-book update (referred henceforth as an "add-order" update) would tend to be in the form of codes and data delineated among predefined fields (rather than the conversational language used by way of example in the preceding sentence). Subsequent incremental order-book updates might modify (a "modify-order" update) and/or cancel (a "cancel-order" update) that order, add additional orders (to buy and/or sell), etc. In the context of "incremental" feeds, then, it is incumbent upon the recipient of such a feed to apply received incremental order-book updates to their own records (i.e., order books) in order to have up-to-date information on which to, e.g., make trading decisions.

An order is said to be "active" if it has been added through an add-order update, and has not yet been removed from consideration through a subsequent cancel-order update referring to the same order.

If a recipient determines at a certain point that they missed—or even may have missed—one or more messages, they can request "gap-fill" information to obtain missing messages, as is known in the relevant art. If they have missed too many messages or join trading activity sufficiently long after it has begun, they can request "late-join" information to be caught up to date with a current list of active orders (also known as an "order book") (to which they can then start applying incremental updates). And in some implementations, gap-fill requests that request too many messages and/or messages that are no longer archived by the responding party are responded to with late-join information rather than gap-fill information.

In the embodiment that is depicted in FIG. 2, the MDPD 104 also includes a PLC 206, which could be an FPGA. In FIG. 2, a portion of the PLC 206 is configured to be an operational copy 210 of the output-feed profile 110, referred to herein as the operational output-feed profile 210. The operational output-feed profile 210 is shown in FIG. 2 as including at least two digital-logic segments: a digital-logic segment 212 corresponds to the ticker-symbol subset 112 and is used to carry out the filtering step that is described herein at least in connection with step 1008 of the method 1000 of FIG. 10, and a digital-logic segment 214 corresponds to the ticker-symbol-based feed-partitioning scheme 114 and is used to carry out the partitioning step that is described herein at least in connection with step 1010 of the method 1000. In at least one embodiment, each digital-logic segment 212 and 214, and indeed the operational output-feed profile 210 as a whole, are operational to carry out at least the functions described herein in connection therewith by being a programmed set of digital-logic gates and the like that execute functions reflected in code written by those of skill in the art to perform said functions.

Figure 3:
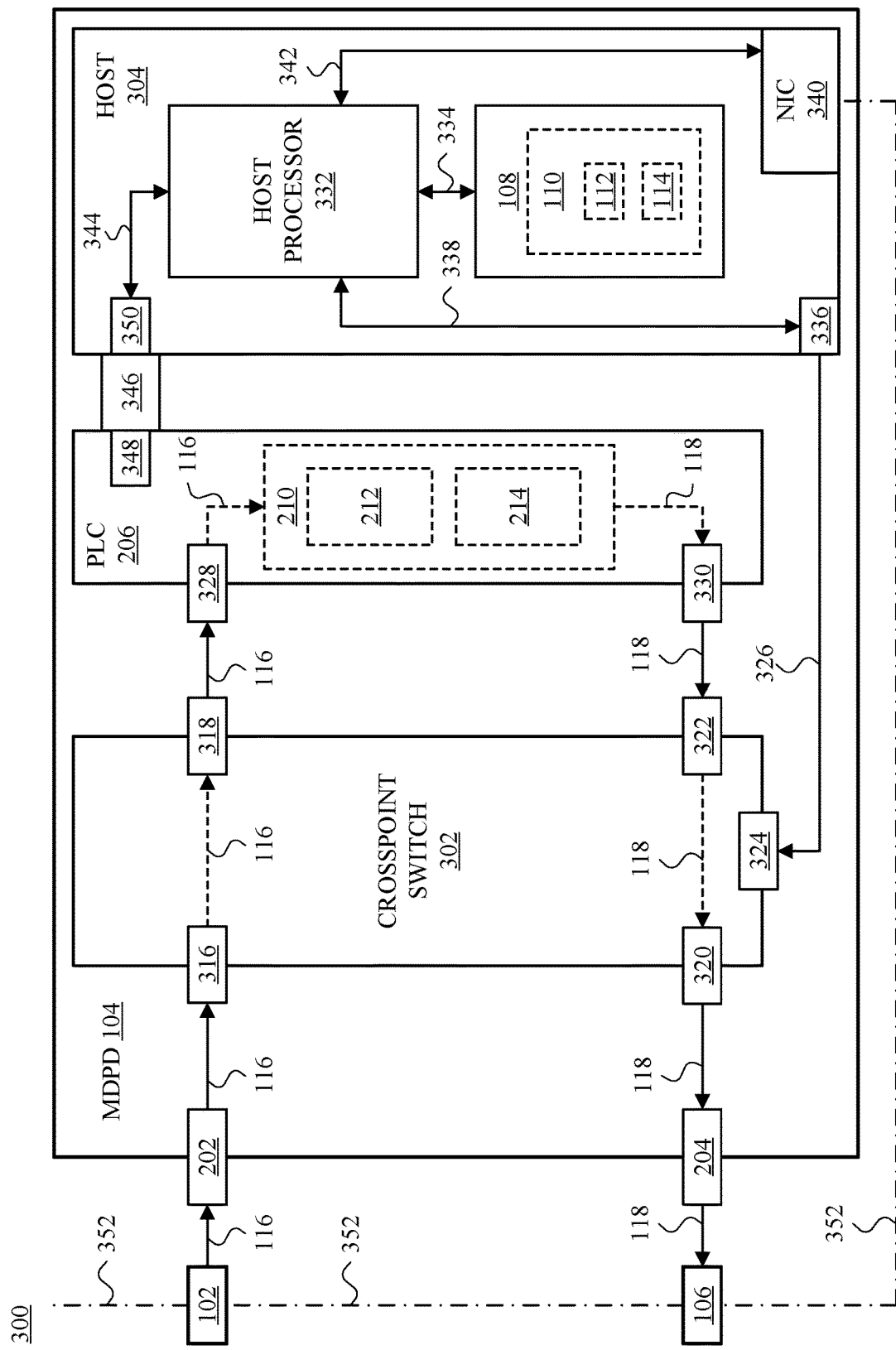
FIG. 3 is a third view of the example communication system of FIG. 1, in accordance with at least one embodiment.

FIG. 3 is a third view of the example communication system of FIG. 1, in accordance with at least one embodiment. In particular, FIG. 3 is a view 300 that, similar to the view 100 of FIG. 1 and the view 200 of FIG. 2, depicts the MDPD 104 (i) receiving the input feed 116 from the upstream device 102 and (ii) transmitting the output feed 118 to the downstream device 106. FIG. 3 includes the data storage 108 (that is depicted in FIG. 1 but not in FIG. 2) containing the output-feed profile 110 that includes the ticker-symbol subset 112 and the ticker-symbol-based feed-partitioning scheme 114. As a complement to the operational output-feed profile 210, the output-feed profile 110 is referred to herein at times as the management copy of the output-feed profile—i.e., as the management output-feed profile 110. FIG. 3 includes several elements that are depicted in FIG. 2 but not in FIG. 1, namely the external data port 202, the external data port 204, and the PLC 206 (including the operational output-feed profile 210 having the digital-logic segment 212 and the digital-logic segment 214).

It can be seen in FIG. 3 that the input feed 116 is received by the MDPD 104 from the upstream device 102 via the external data port 202, and that the input feed 116 traverses a crosspoint switch 302 on its way to the PLC 206, in which the input feed 116 is processed by the operational output-feed profile 210, including by the digital-logic segment 212 and the digital-logic segment 214. And it can further be seen in FIG. 3 that the output feed 118 is generated by the operational output-feed profile 210 (including by the digital-logic segment 212 and the digital-logic segment 214) of the PLC 206, and that the output feed 118 traverses the crosspoint switch 302 on its way to being sent to the downstream device 106 via the external data port 204. A suitable crosspoint switch 302 may be obtained from MACOM Technology Solutions, which is headquartered in Lowell, Mass., among other options known to those of skill in the art.

The major elements of the MDPD 104 that are newly appearing in the view 300 of FIG. 3—as compared with the views 100 and 200 of FIGS. 1 and 2, respectively—are the crosspoint switch 302 and a host 304. The crosspoint switch 302 is described more fully below in connection with FIGS. 7-9. Depicted in FIG. 3 with respect to the crosspoint switch 302 are four crosspoint data ports 316, 318, 320, and 322, as well as a crosspoint control port 324, which is also discussed below in connection with FIGS. 7-9.

In the depicted embodiment, the host 304 includes a host processor 332. The crosspoint control port 324 is accessible over a control bus 326 to allow the host processor 332 to configure the various connection mappings between crosspoint ports in the crosspoint switch 302. In at least one embodiment, the control bus 326 is or includes a Universal Serial Bus (USB) connection. The host processor 332 could be a software and/or firmware process executing on a hardware processor, or it could itself be a hardware element such as an FPGA, a microprocessor, or the like—such a design choice is left to those of skill in the art. In some embodiments, the host processor 332 is or includes an Intel Xeon processor. Alternatively, the host processor 332 may be or include another processor. The host processor 332 may include its own memory hardware. In some embodiments, the host processor 332 is configured to run a Linux Ubuntu kernel. And certainly other possibilities could be listed here as well.

The crosspoint switch 302 receives the input feed 116 from the external data port 202 via the crosspoint data port 316, which is internally mapped to the crosspoint data port 318, which in turn is connected to a PLC data port 328 of the PLC 206. The crosspoint switch 302 receives the customized market-data output feed 118 from a PLC data port 330 of the PLC 206 via the crosspoint data port 322, which is internally mapped to the crosspoint data port 320, via which the customized market-data output feed 118 is conveyed to the external data port 204.

In the depicted embodiment, the PLC 206 and the host processor 332 communicate with one another via a PCI Express (PCIe) bus (or other type of bus) 346, a data interface 348 (which is depicted herein in various different embodiments as being part of the PLC 206 or external to the PLC 206, either of which may be the case in a given embodiment), a data interface 350 of the host 304, and a data connection 344 of the host 304. This communication is two-way, as described herein. The host processor 332 can configure the PLC 206 (e.g., update the operational output-feed profile 210, perhaps to reflect user modifications) via the PCIe bus 346. In some embodiments, the data interface 348 is or includes a logic control interface via which the PLC 206 can be configured. Moreover, the PLC 206 can convey data (useful to the host 304 (e.g., the host processor 332) in, e.g., responding to gap-fill and late-join requests) to the host processor 332 via the PCIe bus 346. And certainly numerous other example types of data that could be communicated across the PCIe bus 346 could be listed here.

The host processor 332 of the host 304 can access the data storage 108 via a suitable data-storage interface 334. Moreover, the host processor 332 can configure the various possible crosspoint-switch-internal (i.e., internal to the crosspoint switch) connections of the crosspoint switch 302 via a control path 338, an interface 336, and the aforementioned control bus 326 and crosspoint control port 324. The interface 336 could be a relatively simple pass-through-type port, or could instead be a more complex crosspoint-control interface that presents a certain application programming interface (API) to the host processor 332 and translates between that API and whatever form of commands, instructions, and/or the like the crosspoint switch 302 is configured to receive via the crosspoint control port 324. And certainly other architectures could be used as well, including positioning such a crosspoint-control interface communicatively between the interface 336 and the crosspoint control port 324.

In the embodiment that is depicted in FIG. 3, the host 304 further includes a network interface controller (NIC) 340 that is communicatively connected to the host processor 332 via a data-and-control connection 342. The NIC 340 could be any NIC deemed suitable for a given implementation by those of skill in the art, and could be rated for data-transfer rates such as 1 gigabit per second (Gbps), 10 Gbps, 40 Gbps, 100 Gbps, and/or the like.

Moreover, it can be seen in the example arrangement that is depicted in FIG. 3 that the MDPD 104 has a connection to a data network 352 that is depicted in FIG. 3 using a dashed-and-dotted line. The host 304, and in particular the host processor 332, of the MDPD 104 is connected to the data network 352 by way of the NIC 340 and the data-and-control connection 342. As shown, the host 304 can communicate via the data network 352 with at least the downstream device 106 and the upstream device 102. Note that, even though it is depicted this way, it is not at all necessary and would likely not be the case that the host 304 would have to communicate with the upstream device 102 over the data network 352 via the downstream device 106. The purpose of depicting multiple devices—in this case the upstream device 102, the downstream device 106, and the MDPD 104 (by way of the NIC 340)—being in communicative connection with the data network 352 is simply to show that each of those devices could have a data connection to the data network 352, not that any particular order of communication via any particular sequence of devices would be necessary. This convention is followed in ensuing figures as well.

The data network 352 could be an Internet Protocol (IP) network such as the Internet, one or more other public IP networks, one or more private IP networks, and/or the like. Devices may communicate with one another via the data network 352 using static and/or dynamically assigned IP addresses, as is known in the art. Moreover, at the transport layer, a transport protocol such as UDP or the Transport Control Protocol (TCP) may be used, among other options known to those in the art.

Figure 4:
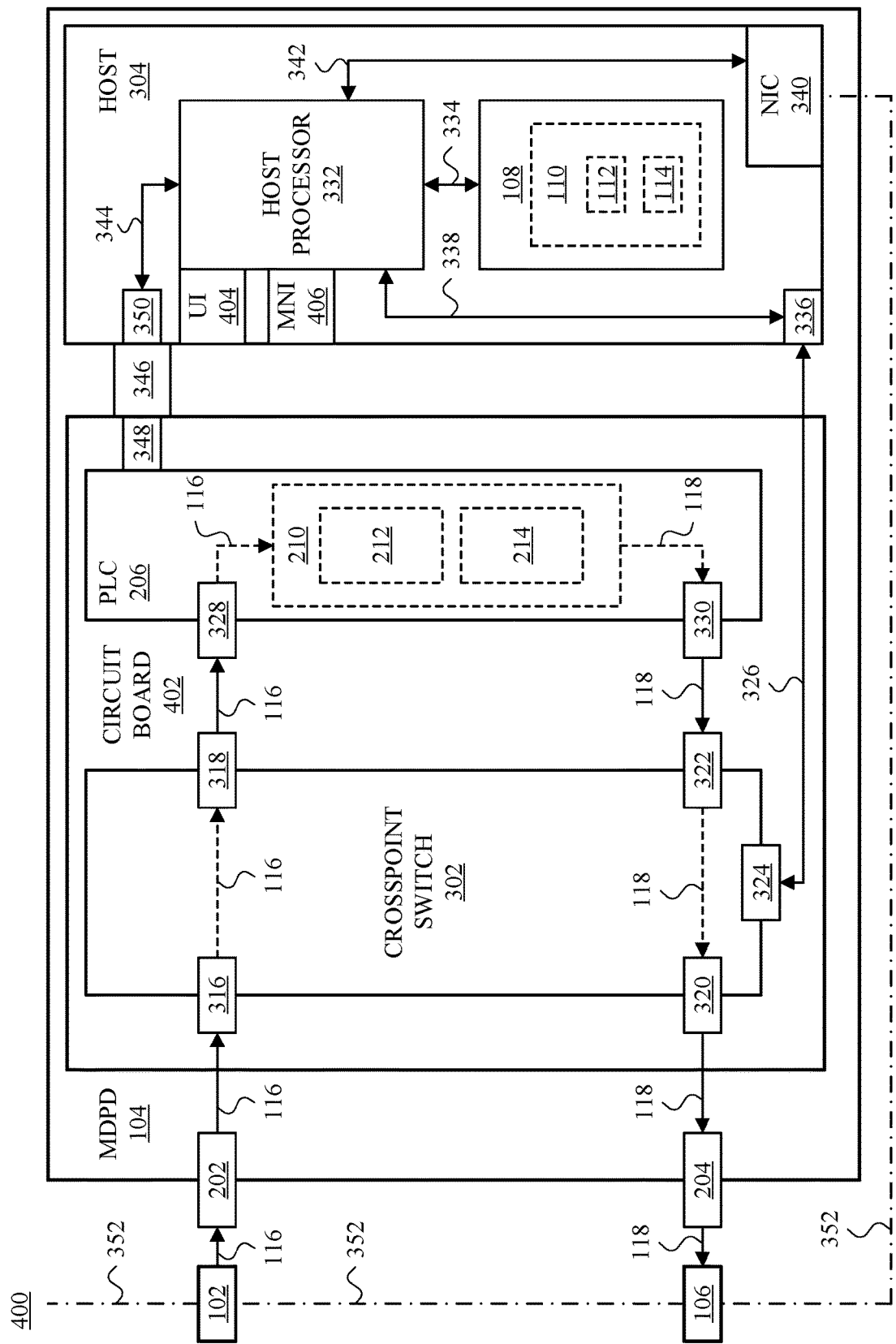
FIG. 4 is a fourth view of the example communication system of FIG. 1, in accordance with at least one embodiment.

FIG. 4 is a fourth view of the example communication system of FIG. 1, in accordance with at least one embodiment. In particular, FIG. 4 depicts a view 400 that is similar in many ways to the view 300 of FIG. 3. One notable difference is that, in the view 400, the crosspoint switch 302 and the PLC 206 are both deployed on a common circuit board 402. It is noted that the host 304 is still deployed on its own board (not individually numbered) and that the host 304 communicates with the circuit board 402—and therefore with at least the PLC 206 that is deployed thereon—via the PCIe bus 346.

Moreover, it is also noted that, in the embodiment that is depicted in FIG. 4, despite the deployment of the crosspoint switch 302 on the circuit board 402, the host 304 still communicates with the crosspoint switch via the control bus 326. In other embodiments, however, the deployment of the crosspoint switch 302 on the circuit board 402 obviates the need for the host 304 to communicate directly with the crosspoint switch via, e.g., the control bus 326. Indeed, in some embodiments (not depicted), the crosspoint control port 324 of the crosspoint switch 302 is communicatively connected to a circuit-board interface on the circuit board 402, and the host 304 can then configure the crosspoint switch 302 via a connection provided by the circuit board 402 to that circuit-board interface. And certainly other configurations could be implemented as well.

In the embodiment that is depicted in FIG. 4, the host 304 further includes a user interface (UI) 404 and a management network interface (MNI) 406. One or both of those may not be present in some embodiments. Moreover, one or both of the UI 404 and the MNI 406 that are depicted in FIG. 4 as being part of the host 304 could instead be separate from and communicatively connected to the host 304. And certainly other arrangements are possible.

The UI 404 may include a command-line interface (CLI) and/or a graphic user interface (GUI), as examples, configured to receive, from a user, instructions regarding the configuration of the MDPD 104. Similar configuration instructions may instead or in addition be received via the MNI 406. The host 304 may then configure the PLC 206 and/or the crosspoint switch 302 according to such instructions. A user may be able to log on remotely via the MNI 406. And certainly other arrangements are possible. In some embodiments, the circuit board 402 includes a pulse-per-second (PPS) input for use in one or more time-stamping functions, such as inclusion of a high-precision timestamp in the output feed 118.

Figure 5:
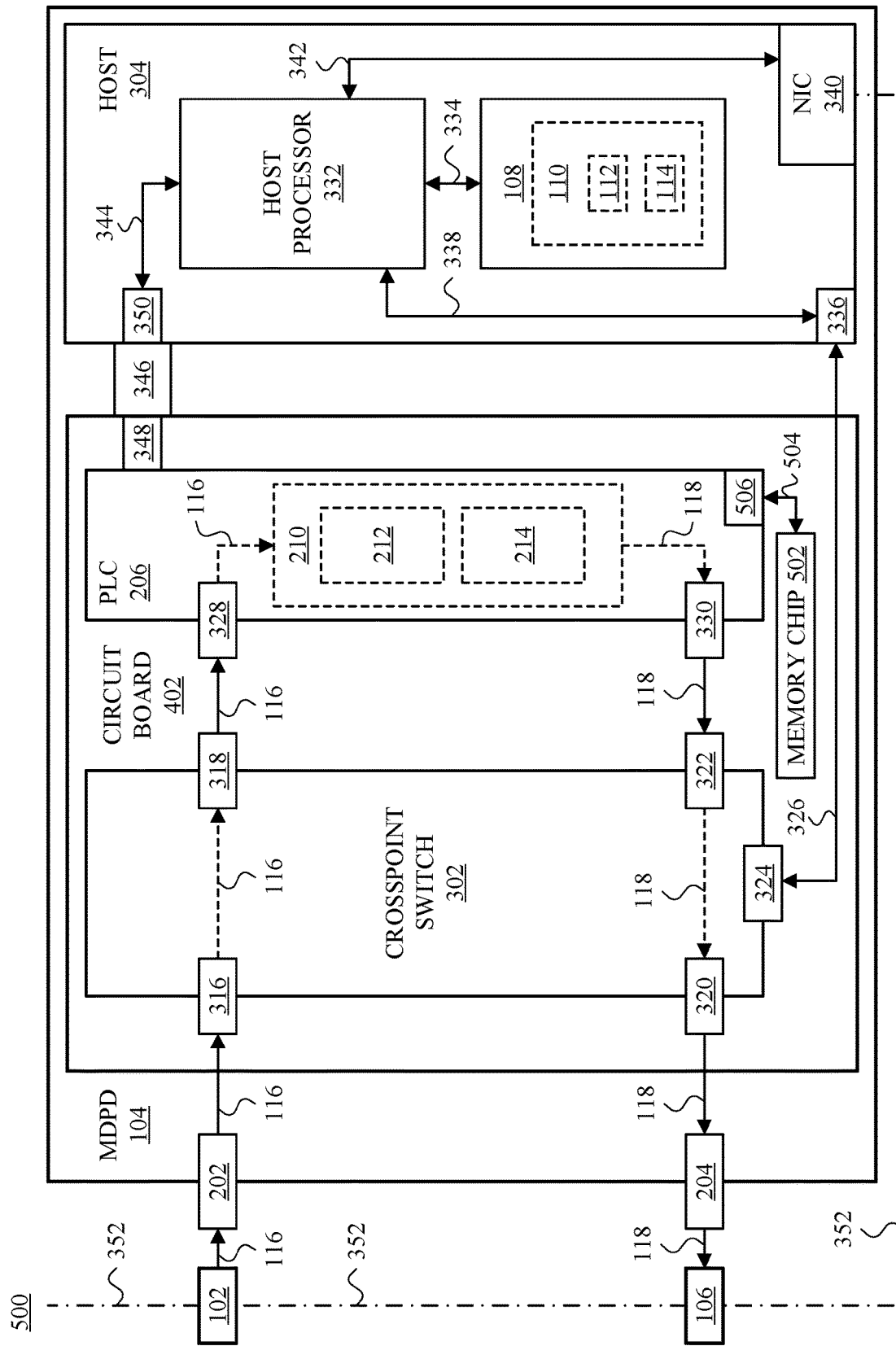
FIG. 5 is a fifth view of the example communication system of FIG. 1, in accordance with at least one embodiment.

FIG. 5 is a fifth view of the example communication system of FIG. 1, in accordance with at least one embodiment. In particular, FIG. 5 depicts a view 500 that is similar in many ways to the view 400 of FIG. 4. Newly appearing on FIG. 5 is a memory chip 502 that is also deployed on the circuit board 402. The memory chip 502 is depicted as being connected via a connection 504 to a port 506 on the PLC 206. The memory chip 502 may be any memory chip (or combination of memory chips) deemed suitable by those of skill in the art for a given implementation.

As one example of a way in which the PLC 206 may store data on and retrieve data from the memory chip 502, the MDPD 104 may, at a first time, receive an order-book update that is an add-order update that (i) pertains to a given ticker symbol in the ticker-symbol subset and (ii) includes a given order number, and responsively operate the PLC 206 to store an association in the memory chip 502 between the given order number and the given ticker symbol. The MDPD 104 may thereafter, at a second time, receive a subsequent order-book update that includes the given order number but does not include the given ticker symbol, and responsively (i) operate the PLC 206 to use the given order number from the subsequent order-book update to retrieve the given ticker symbol from the stored association in the memory chip 502, (ii) generate, at the PLC 206, a given customized-market-data-output-feed message that (a) pertains to (and indeed includes) the retrieved given ticker symbol and (b) conveys the subsequent order-book update, and (iii) transmit the given customized-market-data-output-feed message from the MDPD 104 to the downstream device 106. And certainly numerous other examples could be listed here as well.

Figure 6:
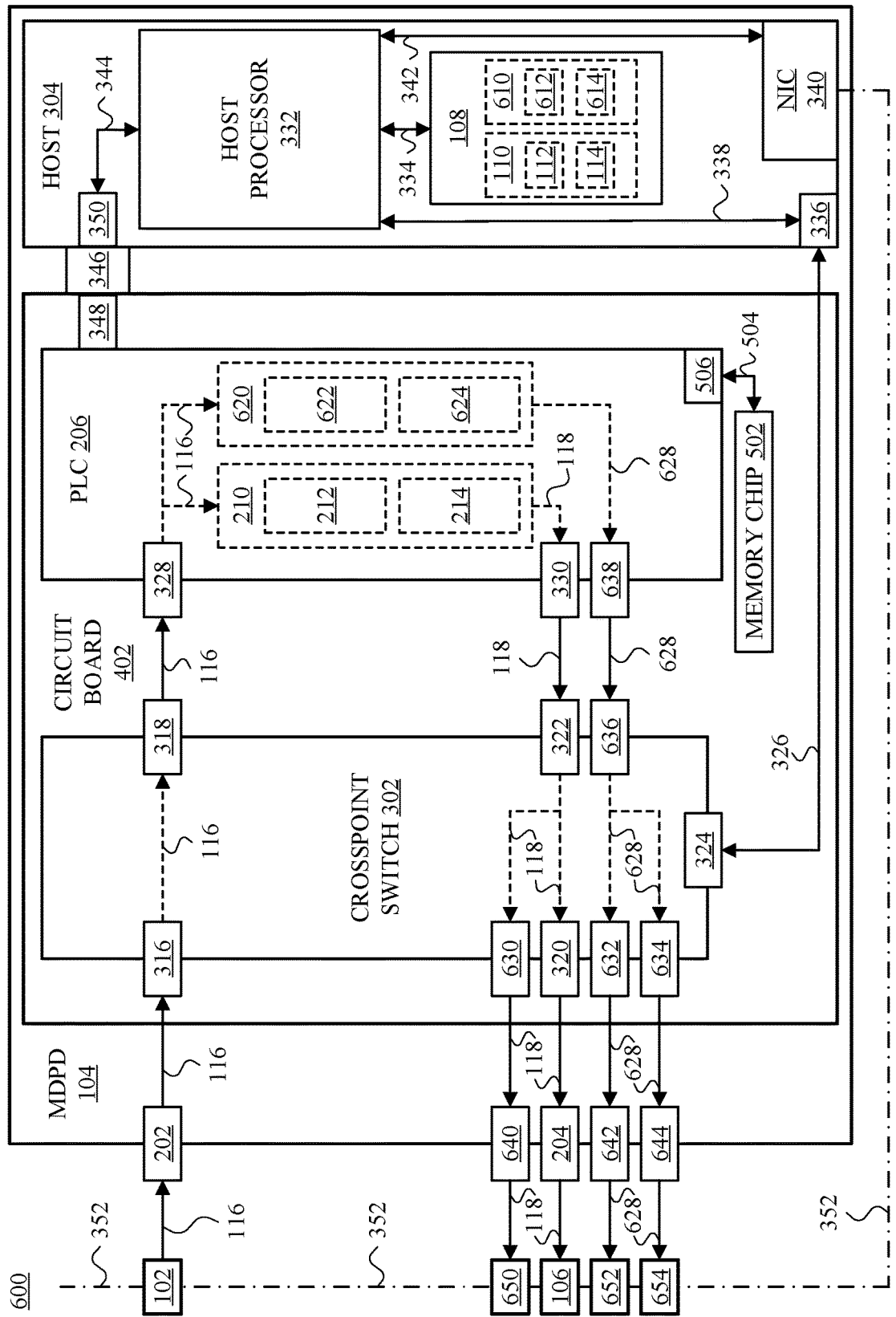
FIG. 6 is a sixth view of the example communication system of FIG. 1, in accordance with at least one embodiment.

FIG. 6 is a sixth view of the example communication system of FIG. 1, in accordance with at least one embodiment. In particular, FIG. 6 depicts a view 600 that is similar in many ways to the view 500 of FIG. 5. Some if not all of the elements that are depicted in FIG. 6—that are not also depicted in any of the FIGS. 1-5—pertain to demonstrating that the MDPD 104 can generate more than one customized filtered-and-partitioned market-data output feed. And while the MDPD 104 is shown in an arrangement for producing multiple output feeds based on a single input feed, the MDPD 104 could just as well produce multiple output feeds from various different respective input feeds. And certainly other possibilities could be listed here as well.

The intake of the input feed 116 is the same as in the previously described examples. In particular, the MDPD 104 receives the input feed 116 from the upstream device 102 via the external data port 202, crosspoint data ports 316 and 318 of the crosspoint switch 302, and the PLC data port 328. In the depicted embodiment, the PLC 206 generates a second copy of the input feed 116, feeding the first copy into the operational output-feed profile 210 as before, and feeding the second copy into an operational output-feed profile 620. It is noted that, in other embodiments, the crosspoint switch 302 may generate the second copy of the input feed 116 and separately transmit that second copy to a PLC data port of the PLC 206. Such design choices are within the skill of those in the relevant art.

In the embodiment that is depicted in FIG. 6, the data storage 108, as before, contains the management output-feed profile 110 that itself includes the ticker-symbol subset 112 and the ticker-symbol-based feed-partitioning scheme 114, but also contains a second management output-feed profile 610 that itself includes a ticker-symbol subset 612 and a ticker-symbol-based feed-partitioning scheme 614, which could (and likely would) be different from the ticker-symbol subset 112 and the ticker-symbol-based feed-partitioning scheme 114 of the management output-feed profile 110. As the reader might expect, the operational output-feed profile 620 corresponds to the management output-feed profile 610; accordingly, the digital-logic segment 622 corresponds to the ticker-symbol subset 612 and the digital-logic segment 624 corresponds to the ticker-symbol-based feed-partitioning scheme 614.

As can be seen in FIG. 6, the PLC 206, as before, generates the customized filtered-and-partitioned output feed 118 using the operational output-feed profile 210. It can further be seen in FIG. 6 that the PLC 206 also uses the operational output-feed profile 620 in parallel to generate a second customized filtered-and-partitioned output feed 628. In the depicted embodiment, the PLC 206 transmits the output feed 628 via a PLC data port 638 to a crosspoint data port 636 of the crosspoint switch 302.

Another interesting wrinkle that is implemented in some embodiments is depicted in FIG. 6, where it can be seen that the crosspoint switch 302 receives the output feed 118 from the PLC 206 via the crosspoint data port 322 and also receives the output feed 628 from the PLC 206 via the crosspoint data port 636. From there, pursuant to the configuration instructions that have been applied to the crosspoint switch 302 via the crosspoint control port 324, the crosspoint switch 302, as before, transmits the output feed 118 via the crosspoint data port 320 and via the external data port 204 to the downstream device 106, but also in parallel generates a second copy of the output feed 118 and transmits that second copy via a crosspoint data port 630 and via an external data port 640 to a downstream device 650. Also in parallel, the crosspoint switch 302 generates a second copy of the output feed 628, and proceeds to transmit the first copy of the output feed 628 via a crosspoint data port 632 and an external data port 642 to a downstream device 652, and also in parallel transmits the second copy of the output feed 628 via a crosspoint data port 634 and an external data port 644 to a downstream device 654.

Thus, the present systems and methods provide an approach that is scalable to as many unique output feeds as the PLC 206 can be configured to produce and to as many copies of said output feeds as the crosspoint switch 302 can be configured to generate. And what's more, PLCs and crosspoint switches of any suitable sizes can be used, as can multiple PLCs and/or multiple crosspoint switches. With respect to scale, in one embodiment, the MDPD 104 has 32 external data ports, each of which are of type SFP+, and each of which is rated to operate at a data-transfer rate of 10 Gbps. Such an architecture would facilitate having 32 crosspoint data ports that operate to receive and/or transmit data via those 32 external data ports, and in at least one embodiment 32 additional crosspoint data ports to face—and interface with, if utilized—the PLC 206; thus, in at least one embodiment, the crosspoint switch 302 has at least 64 total crosspoint data ports: 32 facing the outside world, the other 32 facing the PLC 206. And certainly numerous other example architectures could be described as well.

Figure 7:
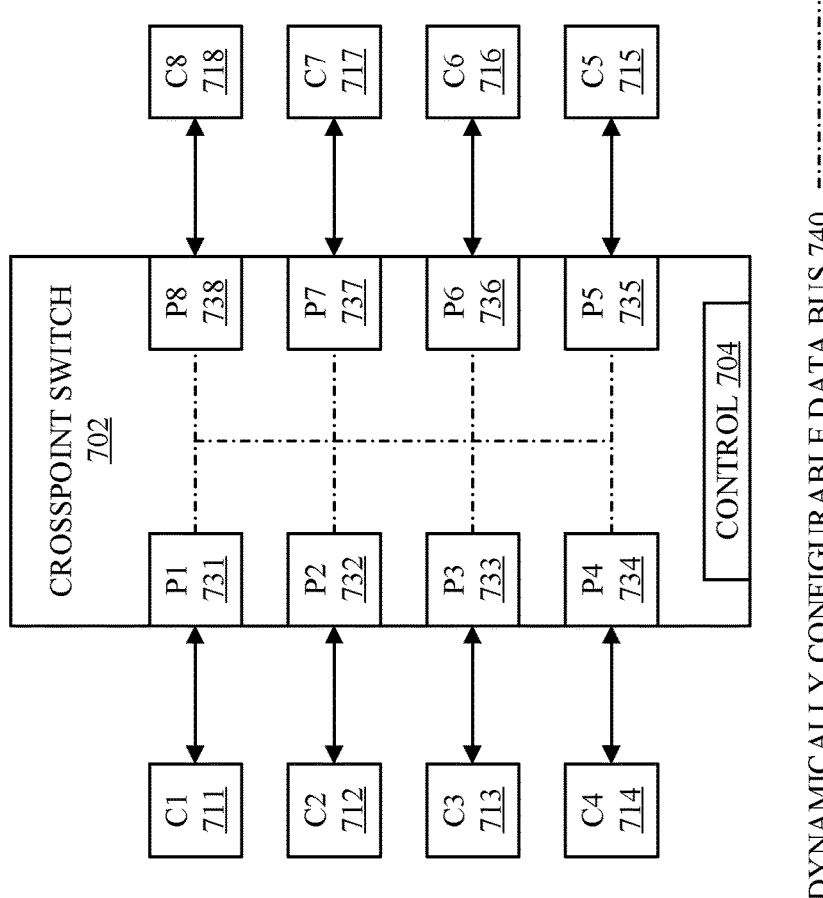
FIG. 7 depicts an example crosspoint switch, in accordance with at least one embodiment.

FIG. 7 depicts an example crosspoint switch, in accordance with at least one embodiment. As a general matter, a crosspoint switch is a hardware element that has a plurality of data ports—e.g., 64 data ports in the example described in the preceding paragraph—among which crosspoint-switch-internal connections can be dynamically mapped by transmitting configuration instructions (from, e.g., a host processor) to the crosspoint switch over an interface such as a USB connection. With respect to such crosspoint-switch-internal data connections, these connections can be one-to-one or one-to-many connections; in the case of one-to-many connections, whatever data stream is received via the "one" port (in the one-to-many mapping) is then copied a sufficient number of times such that an exact copy of that data stream is emitted from each of the "many" ports (in the same one-to-many mapping).

In particular, FIG. 7 is a view 700 of an example crosspoint switch 702, which could represent the crosspoint switch 302, but is shown in a more generic, not-yet-configured state in the view 700 of FIG. 7. As shown in FIG. 7, the crosspoint switch 702 has eight crosspoint data ports P1-P8 that are respectively numbered 731-738. The crosspoint switch 702 also has a control port 704 that is similar in function to the above-described crosspoint control port 324. The crosspoint switch 702 is further depicted in FIG. 7 as having a dynamically configurable data bus 740, along which crosspoint-switch-internal data connections can be dynamically mapped according to appropriate configuration commands being received via the crosspoint control port 704.

Moreover, and simply for illustration, each crosspoint data port 731-738 is shown as having two-way data communication with a respective connection C1-C8, respectively numbered 711-718. These connections 711-718 could be to external data ports, other devices, FPGA data ports, PLC data ports, and/or to any other suitable endpoints. Each such connection could include a suitable transceiver, though such are not depicted in FIG. 7 merely for clarity of presentation and not by way of limitation. As a general matter, it will be appreciated by those of skill in the art that the depicted-and-described architecture of the crosspoint switch 702 is presented here by way of example, and that other architectures could be implemented as deemed suitable by those of skill in the art. For example, any suitable number of crosspoint data ports could be present in a given implementation. As but one example, some embodiments involve crosspoint switches that each have on the order of 1000 (e.g., 1024 (i.e., $2^{10}$)) crosspoint data ports. And certainly numerous other examples could be listed here as well. Moreover, a crosspoint switch is sometimes referred to as a physical-layer cross connect.

Figure 8:
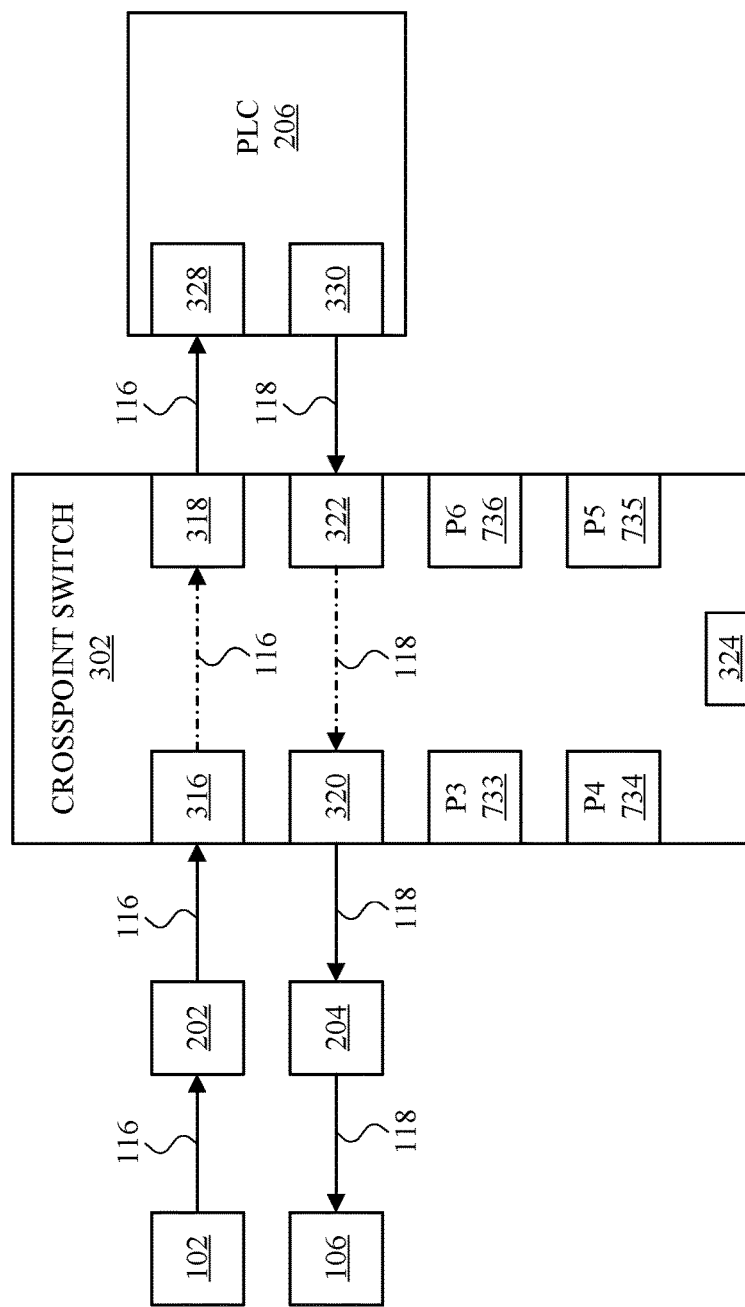
FIG. 8 depicts the example crosspoint switch of FIG. 7, configured with internally mapped connections consistent with FIG. 5, in accordance with at least one embodiment.

FIG. 8 depicts the example crosspoint switch of FIG. 7, configured with internally mapped connections consistent with FIG. 5, in accordance with at least one embodiment. In particular, FIG. 8 depicts a view 800 in which the example crosspoint switch 702 of FIG. 7 has been configured so as to function as the crosspoint switch 302 as it appears in the view 500 of FIG. 5. Thus, the view 800 is an alteration of the view 700 in which some reference numerals in the 700 series have been replaced with the appropriate reference numerals from FIG. 5.

In particular, the crosspoint data port 731 has been relabeled as the crosspoint data port 316, the crosspoint data port 738 has been relabeled as the crosspoint data port 318, the crosspoint data port 737 has been relabeled as the crosspoint data port 322, and the crosspoint data port 732 has been relabeled as the crosspoint data port 320. Additionally, the crosspoint control port 704 has been relabeled as the crosspoint control port 324. Moreover, the connection 711 has been relabeled as the external data port 202, which is receiving the input feed 116 from the upstream device 102. The connection 712 has been relabeled as the external data port 204, via which the output feed 118 is being transmitted to the downstream device 106.

The connection 718 has been relabeled as the PLC data port 328, and the connection 717 has been relabeled as the PLC data port 330. It can also be seen that the crosspoint data ports 733-736 have been left as they are in FIG. 7, and that the connections 713-716 have been removed from FIG. 8 due to there being no corresponding element from FIG. 5. Finally, and also consistent with FIG. 5, there is a (i) first one-way, one-to-one crosspoint-switch-internal data connection mapped from the crosspoint data port 316 to the crosspoint data port 318 and (ii) a second one-way, one-to-one crosspoint-switch-internal data connection mapped from the crosspoint data port 322 to the crosspoint data port 320.

Figure 9:
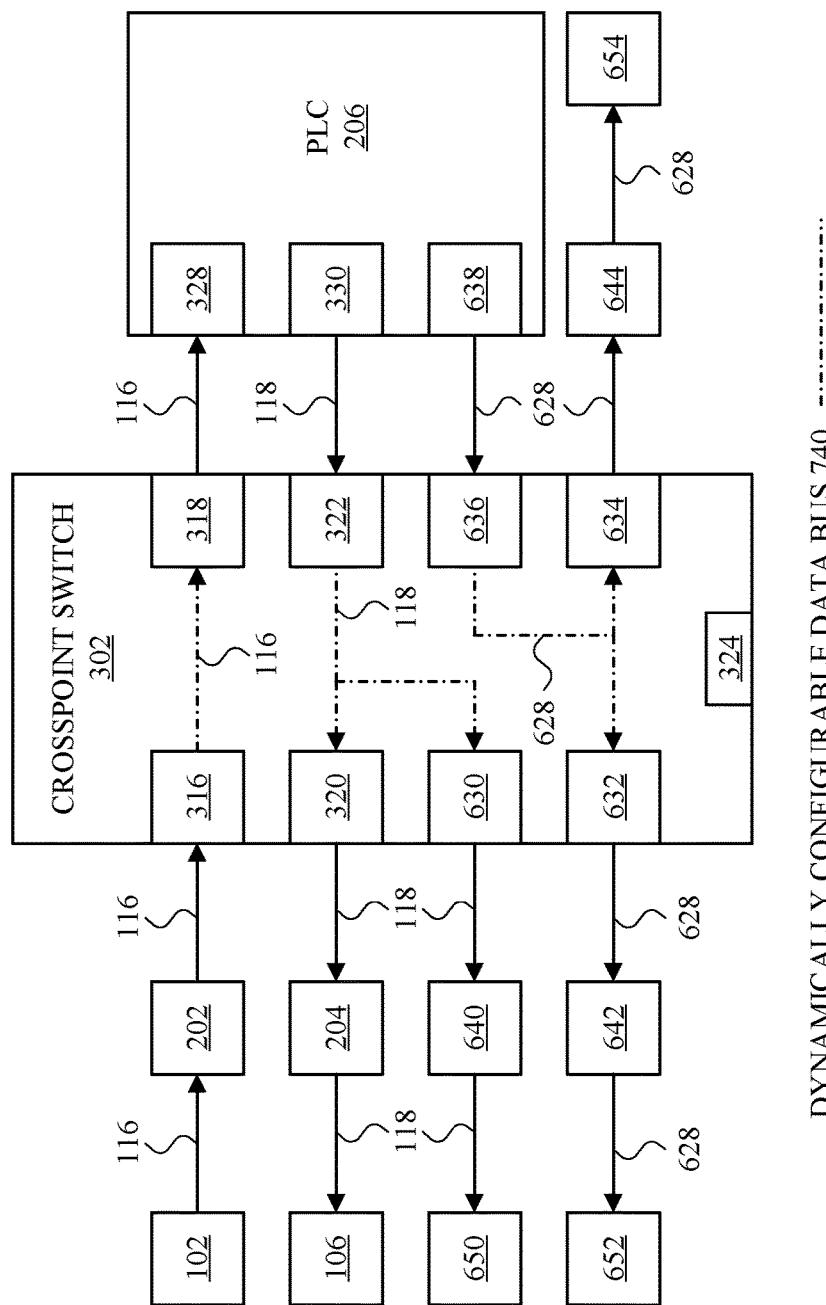
FIG. 9 depicts the example crosspoint switch of FIG. 7, configured with internally mapped connections consistent with FIG. 6, in accordance with at least one embodiment.

FIG. 9 depicts the example crosspoint switch of FIG. 7, configured with internally mapped connections consistent with FIG. 6, in accordance with at least one embodiment. In particular, FIG. 9 depicts a view 900 in which the example crosspoint switch 702 of FIG. 7 has been configured so as to function as the crosspoint switch 302 as it appears in the view 600 of FIG. 6. Thus, the view 900 is an alteration of the view 700 in which some reference numerals in the 700 series have been replaced with the appropriate reference numerals from FIG. 6. Equivalently, the view 900 is an alteration of the view 800 of FIG. 8 in which certain elements have been added.

Indeed, the view 900 of FIG. 9 is a superset of the view 800 of FIG. 8, and thus it is the additional elements that are focused on here. First, it can be seen that the crosspoint data port 733 has been relabeled as the crosspoint data port 630, the crosspoint data port 734 has been relabeled as the crosspoint data port 632, the crosspoint data port 735 has been relabeled as the crosspoint data port 634, and the crosspoint data port 736 has been relabeled as the crosspoint data port 636. Moreover, the connection 713 has been relabeled as the external data port 640, via which the second copy of the output feed 118 is transmitted to the downstream device 650. The connection 714 has been relabeled as the external data port 642, via which the first copy of the output feed 628 is transmitted to the downstream device 652. The connection 715 has been relabeled as the external data port 644, via which the second copy of the output feed 628 is transmitted to the downstream device 654. Lastly, the connection 716 has been relabeled as the PLC data port 638 from which the crosspoint switch 302 is receiving the output feed 628 from the PLC 206. Finally, and also consistent with FIG. 6, there is (i) a one-way, one-to-one crosspoint-switchinternal data connection mapped from the crosspoint data port 316 to the crosspoint data port 318, (ii) a first one-way, one-to-many (one-to-two in this case) crosspoint-switch-internal data connection mapped from the crosspoint data port 322 to both the crosspoint data port 320 and the crosspoint data port 630, and (iii) a second one-way, one-to-many (one-to-two in this case) crosspoint-switch-internal data connection mapped from the crosspoint data port 636 to both the crosspoint data port 632 and the crosspoint data port 634.

Figure 10:
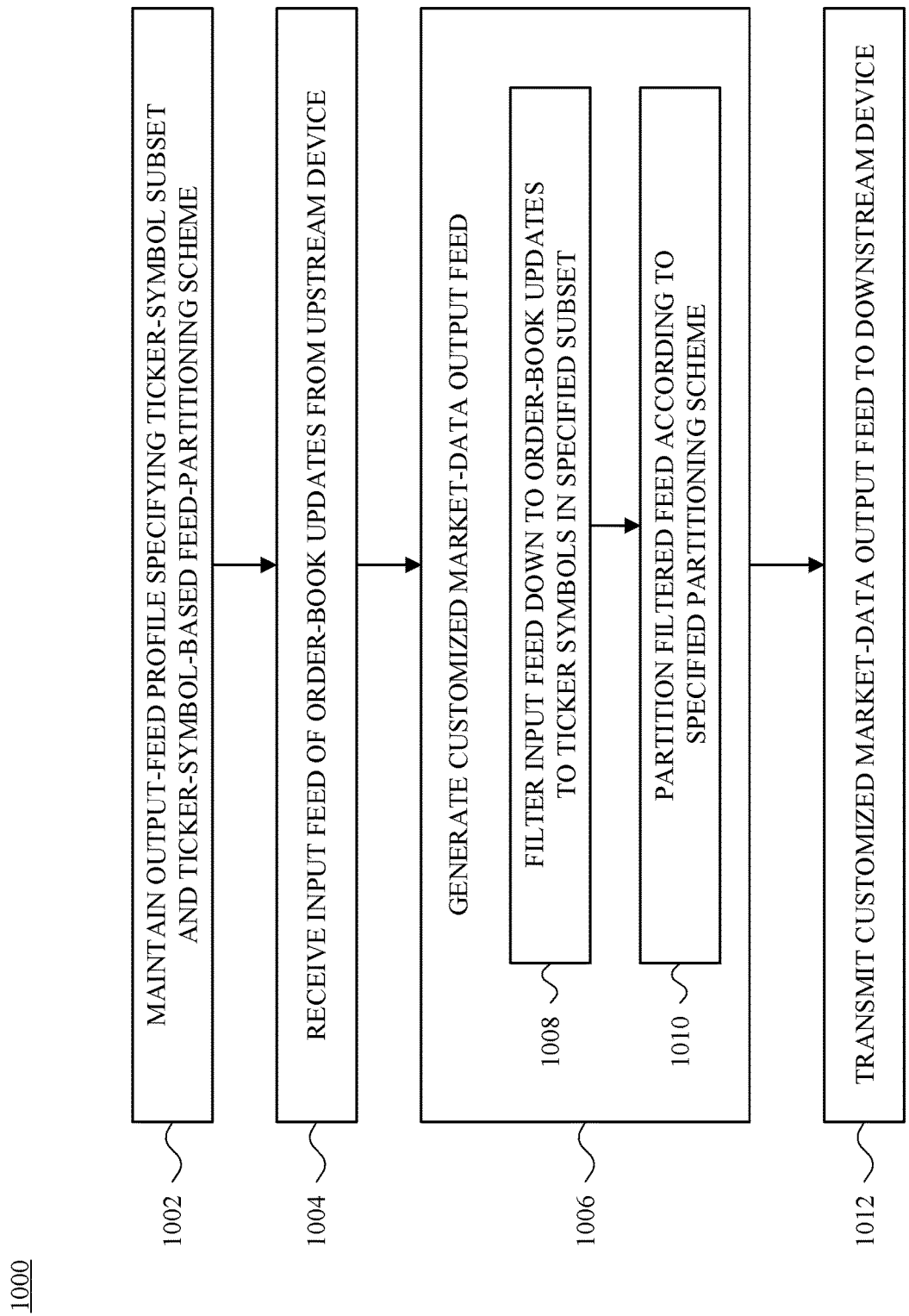
FIG. 10 is a flowchart of an example method, in accordance with at least one embodiment.

FIG. 10 is a flowchart of an example method, in accordance with at least one embodiment. In particular, FIG. 10 depicts an example method 1000 that may be carried out by an MDPD such as the herein-described MDPD 104.

At step 1002, the MDPD 104 maintains the management output-feed profile 110 in data storage 108. As described above, the management output-feed profile 110 specifies a ticker-symbol subset 112 and a ticker-symbol-based feed-partitioning scheme 114. The ticker-symbol subset 112 is (a set of) one or more ticker symbols from among a plurality of ticker symbols (e.g., from among the full set of symbols included in the market-data feed from Nasdaq (or available to be included in the market-data feed by (e.g., traded on) Nasdaq)).

In at least one embodiment, the MDPD 104 receives revision input with respect to the management output-feed profile 110, and responsively generates a revised management output-feed profile 110 accordingly, and further uses that revised management output-feed profile 110 to update the operational output-feed profile 210. This revision input could be received via a user interface, such as a CLI and/or a GUI and/or an API, as examples.

At step 1004, the MDPD 104 receives, from the upstream device 102, the input feed 116 of order-book updates to respective ticker symbols in the plurality of ticker symbols. As stated, the received input feed 116 could be an incremental input feed and therefore contain incremental order-book updates such as add-order updates, modify-order updates, cancel-order updates, and the like.

At step 1006, the MDPD 104 generates, according to the maintained output-feed profile 110, the customized market-data output feed 118. In at least one embodiment, the MDPD 104 carries out the step 1006 at least in part by carrying out the substeps 1008 and 1010, each of which is described in turn below. In at least one embodiment, the output-feed profile 110 further includes data that specifies a market-data protocol, and step 1006 includes formatting the customized market-data output feed 118 according to the specified market-data protocol, which could be a standard market-data protocol known in the industry such as Nasdaq ITCH or BATS PITCH, or could instead be a custom-designed (e.g., proprietary) market-data protocol.

At substep 1008, the MDPD 104 filters the received input feed 116 down to a filtered feed of the order-book updates to respective ticker symbols in the ticker-symbol subset 112. In at least one embodiment, substep 1008 is carried out by the digital-logic segment 212 of the operational output-feed profile 210. The digital logic segment 212 may inspect each order-book update in the input feed 116, check whether the current order-book update pertains to a ticker symbol that is in the ticker-symbol subset 112, keep those that do, and silently discard those that do not. Certainly other filtering approaches could be used.

At substep 1010, the MDPD 104 partitions the filtered feed (that is produced in substep 1008) according to the ticker-symbol-based feed-partitioning scheme 114. In at least one embodiment, substep 1010 is carried out by the digital-logic segment 214 of the operational output-feed profile 210. Other approaches could be used as well, including any number of hardware and/or software approaches.

At step 1012, the MDPD 104 transmits the customized filtered-and-partitioned market-data feed 118 to the downstream device 106. Two different ways that the downstream device 106 could handle processing the received output feed 118 are depicted in—and described below in connection with—FIGS. 11 and 12, though many other examples could be provided as well.

Figure 11:
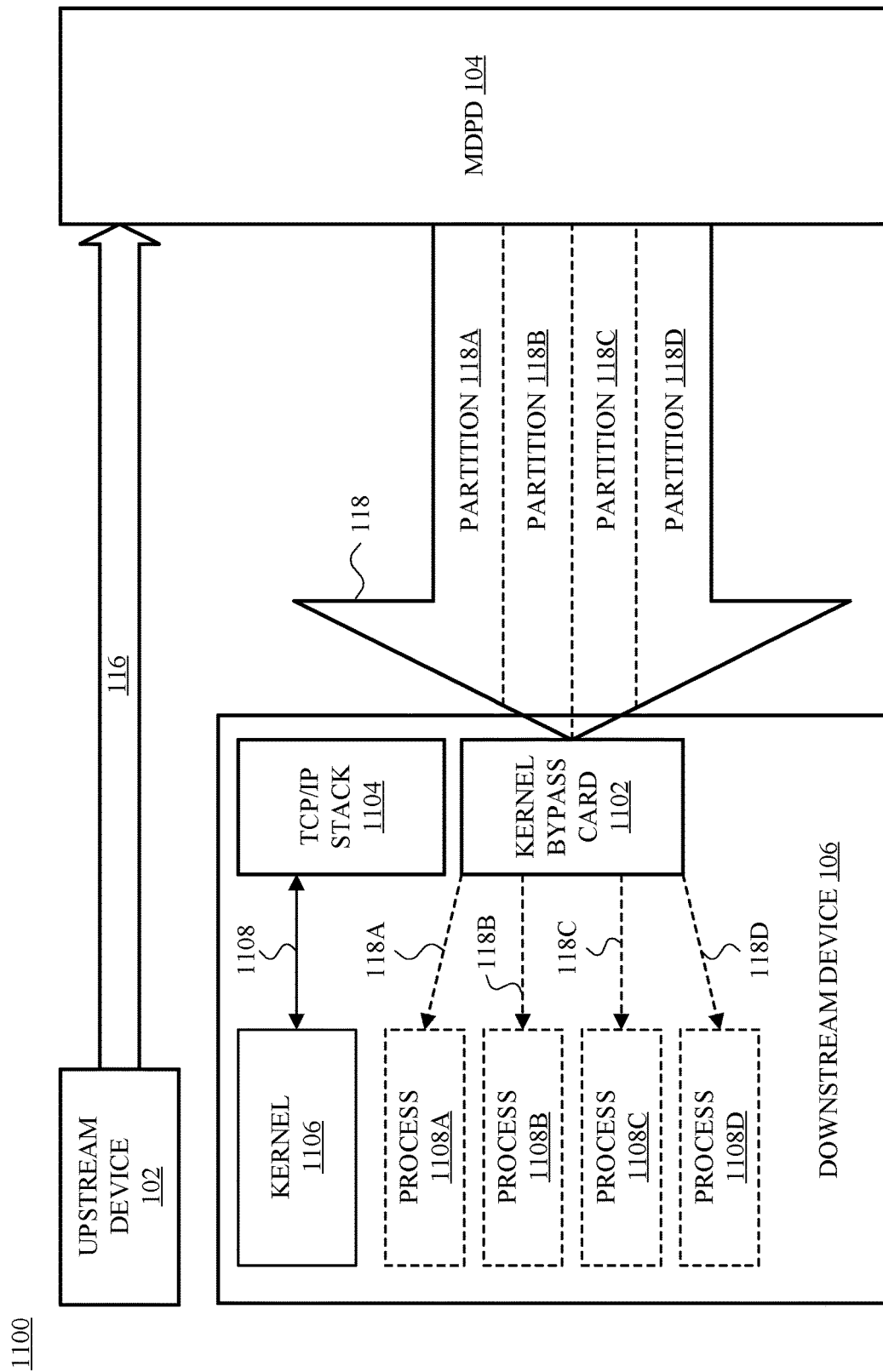
FIG. 11 is a seventh view of the example communication system of FIG. 1, in accordance with at least one embodiment.

FIG. 11 is a seventh view of the example communication system of FIG. 1, in accordance with at least one embodiment. In particular, FIG. 11 is a view 1100 that depicts the upstream device 102, the input feed 116, the MDPD 104 (with no example internal detail), the output feed 118, and the downstream device 106. The output feed 118 is depicted with an arbitrary number (in this case, 4) of partitions 118A-D. The downstream device 106 is depicted as including a kernel bypass card 1102, a TCP/IP stack 1104, a kernel 1106, and a communication link 1108 between the TCP/IP stack 1104 and the kernel 1106. Among the benefits of the feed-filtering aspects of the present methods and systems is that a receiving device such as the downstream device 106 need not employ a costly FPGA to carry out such filtering since that filtering has already been done pre-transmission by the MDPD 104.

Among the benefits of the feed-partitioning aspects of the present systems and methods is that a receiving device such as the downstream device 106 can direct the packets in each defined partition to different destinations without the downstream device 106 having to examine for itself which ticker symbols are being updated by the contents of the various packets. In FIG. 11, this takes the form of—or at least includes—the packets of the output feed 118 not having to go through the TCP/IP stack 1104 or the kernel 1106 of the downstream device 106. Rather, assuming the use of the below-described approach of partitioning using IP-multicast addresses, the downstream device 106 can simply direct the packets in the partition 118A to a process 1108A, the partition 118B to a process 1108B, the partition 118C to a process 1108C, and the partition 118D to a process 1108D. Any one or more of those processes 1108A-D could be configured to actually process the data and/or convey that data to some other process and/or device or devices, as deemed suitable by those of skill in the art for a given implementation.

Figure 12:
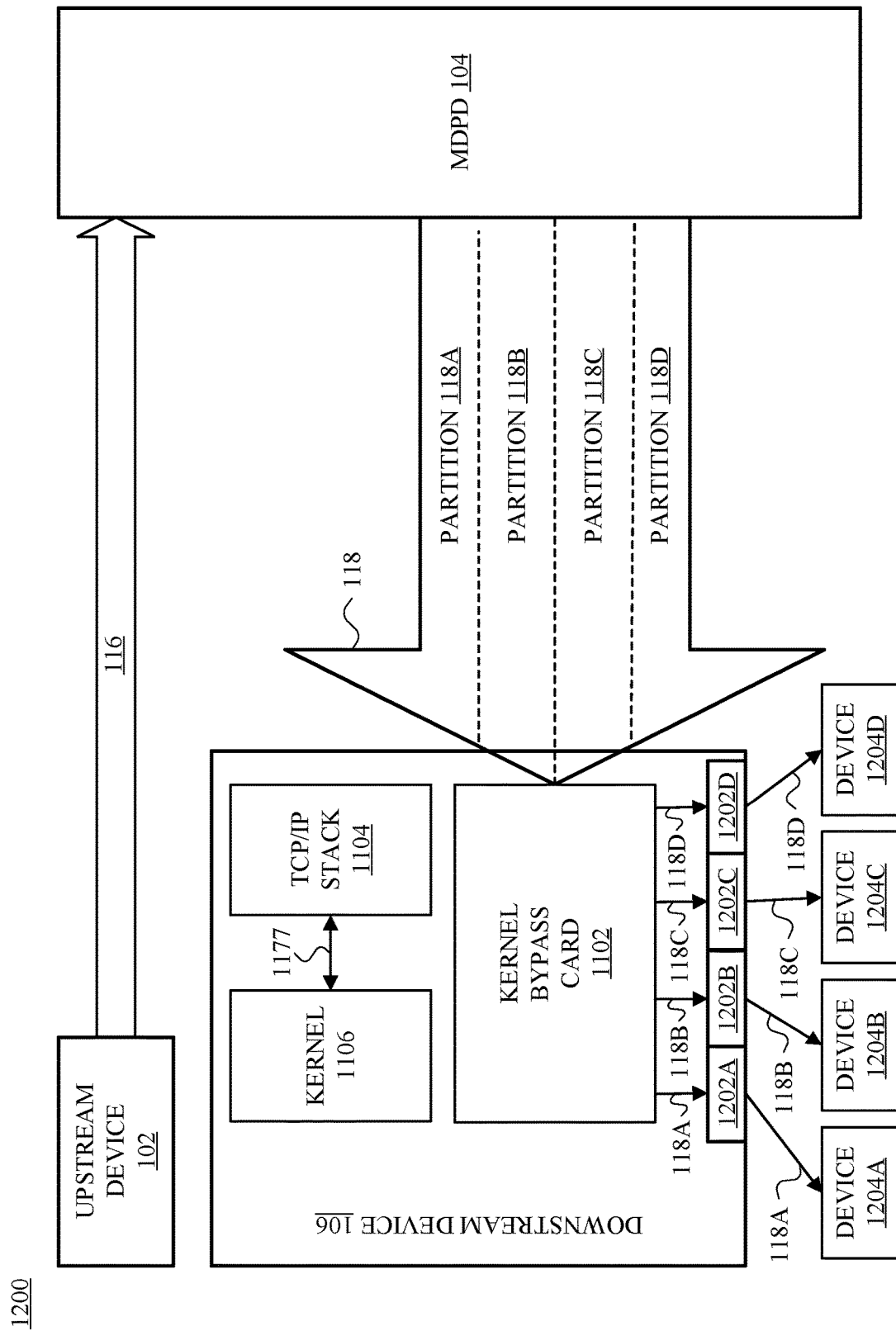
FIG. 12 is an eighth view of the example communication system of FIG. 1, in accordance with at least one embodiment.

FIG. 12 is an eighth view of the example communication system of FIG. 1, in accordance with at least one embodiment. In particular, FIG. 12 depicts a view 1200 that is similar in many ways to the view 1100 of FIG. 11. In the view 1200, however, the downstream device 1206, instead of shunting each partition to a respective process that is executing on the downstream device 106, shunts the partition 118A via a data interface 1202A to a device 1204A, shunts the partition 1188 via a data interface 1202B to a device 1204B, shunts the partition 118C via a data interface 1202C to a device 1204C, and shunts the partition 118D via a data interface 1202D to a device 1204D. Any one or more of the devices 1204A-D could be a further downstream MDPD, a client device, and/or any other output-feed-consuming device deemed suitable by those of skill in the art for a given implementation or in a given context. In at least one embodiment, downstream device 1206 is a network router.

Returning to the topic of partitioning, the MDPD 104 may carry out substep 1010 of the example method 1000 of FIG. 10 in a variety of different ways. In at least one embodiment, the specified ticker-symbol-based feed-partitioning scheme 114 includes (i) partition-definition data that defines one or more ticker-symbol-based partitions and (ii) partition-channel data that assigns each defined partition to a respective output-feed channel among a plurality of mutually exclusive output-feed channels.

In at least one such embodiment, substep 1010 involves generating customized-market-data-output-feed packets that each includes one or more order-book updates, each of which is an order-book update to a ticker symbol within a single one of the defined partitions. In an embodiment, transmitting the customized market-data output feed 118 from the MDPD 104 to the downstream device 106 (i.e., step 1012) includes transmitting the generated customized-market-data-output-feed packets from the MDPD 104 to the downstream device 106 in the output-feed channels to which the defined partitions containing the respective packets are assigned by the partition-channel data. In at least one embodiment, every generated customized-market-data-output-feed packet includes exactly one order-book update. In at least one embodiment, at least one of the generated customized-market-data-output-feed packets includes more than one order-book update.

It is noted that ticker-symbol subsets and ticker-symbol-based partitioning schemes could be defined by suitable data files, via various different types of user interfaces, and that specifying subsets of larger sets of items, as well as further dividing those specified subsets into specified partitions (i.e., further subsets) is within the user-interface and machine-interface programming skills of those in the art.

In at least one embodiment, at least one of the defined partitions consists of a single ticker symbol that is specified in the partition-definition data. In at least one embodiment, at least one of the defined partitions consists of multiple ticker symbols, each of which is specified in the partition-definition data. In at least one embodiment, the partition-definition data specifies that at least one of the defined partitions corresponds with an alphanumeric range of ticker symbols. In at least one embodiment, the partition-definition data defines at least one partition using at least one wildcard character.

As stated above, the specified ticker-symbol-based feed-partitioning scheme 114 in the output-feed profile 110 may define multiple ticker-symbol-based partitions and may also assign each such defined partition to a respective different output-feed channel. As also mentioned above, this assignment serves at least the purpose of conveniently packaging the different ticker-symbol-based partitions into output channels that receiving devices (e.g., the downstream device 106) can sort (by partition, naturally) without having to themselves figure out which ticker symbol is updated by every particular order-book update in the filtered-and-partitioned customized market-data output feed 118. As such, in at least one embodiment, the output-feed channels are selected so as to be sortable by the downstream device according to their respective defined partitions without symbol-content-level inspection. In at least one embodiment, the output-feed channels are selected so as to be sortable by the downstream device according to their respective defined partitions using no higher than network-layer (i.e., layer-3) inspection. In at least one embodiment, the output-feed channels are selected so as to be sortable by the downstream device according to their respective defined partitions using no higher than transport-layer (i.e., layer-4) inspection.

Several different example partitioning mechanisms are discussed below.

As a first example partitioning mechanism, in at least one embodiment, the output-feed channels are defined by respective different IP-multicast destinations. In at least one embodiment, each such IP-multicast destination includes an IP-multicast address; in at least one such embodiment, each IP-multicast destination further includes a port number.

In at least one embodiment, generating the customized-market-data-output-feed packets involves addressing the generated customized-market-data-output-feed packets to the IP-multicast destination specified by the partition-channel data; and transmitting the generated customized-market-data-output-feed packets from the MDPD to the downstream device in the assigned output-feed channels includes transmitting the IP-multicast-destination-addressed customized-market-data-output-feed packets from the MDPD to the downstream device. This choice of partitioning mechanism enables client devices to quickly sort the output feed 118 by partition using a kernel-bypass card (e.g., the kernel-bypass card 1102) and avoiding the more time-consuming protocol stack (e.g., the TCP/IP stack 1104).

In at least one such embodiment, generating the above-described customized-market-data-output-feed packets involves including, in each such packet, a partition-level sequence number indicating the sequential position of that packet among the packets in the customized market-data output feed that are addressed to the particular IP-multicast destination to which that packet is addressed, and the MDPD 104 provides, to the downstream device 106, a gap-fill service that is based on at least the partition-level sequence numbers.

As a second example partitioning mechanism, in at least one embodiment, the output-feed channels are defined by respective different non-overlapping timeslots; and transmitting the generated customized-market-data-output-feed packets from the MDPD to the downstream device in the assigned output-feed channels involves transmitting the generated customized-market-data-output-feed packets from the MDPD to the downstream device according to the assigned non-overlapping timeslots.

As a third example partitioning mechanism, in at least one embodiment, the output-feed channels are defined by respective different external data ports that interface with respective different physical transmission media; and transmitting the generated customized-market-data-output-feed packets from the MDPD to the downstream device in the assigned output-feed channels involves transmitting the generated customized-market-data-output-feed packets from the MDPD to the downstream device via the assigned external data ports.

Output Feed Design: Content, Packaging, and Protocol

As described above, in at least one embodiment, the MDPD 104 receives the input feed 116 from the upstream device 102, processes the input feed 116 as described herein, and outputs multiple customized market-data output feeds (e.g., the output feeds 118 and 628), each (perhaps) representing a different subset of the input-feed-116 data, (perhaps) partitioned differently from one another, and/or (perhaps) in different formats (i.e., protocols) (from one another and/or from the format of the input feed 116). In at least one embodiment, when designing a given output feed, a user of the MDPD 104 can make independent decisions about at least those three aspects of the feed—i.e., the content (i.e., the herein-described ticker-symbol subset), the packaging (i.e., the herein-described partitioning scheme), and the (market-data) protocol. Some example implementation options (and in particular, some example CLI implementation options) for effecting such decisions are discussed below, along with some example programming constructs that are utilized via the CLI in the described examples. These implementation options and associated programming constructs are provided by way of example and not limitation.

Content

As discussed herein, in at least one embodiment, the MDPD 104 allows its user to restrict any given output feed to a subset of the messages (e.g., the order-book updates) from the associated input feed. This restriction is based on the symbol that a given inbound message concerns—i.e., the ticker symbol that is updated by a given order-book update. In at least one embodiment, the MDPD 104 allows its users to define symbols of interest using a programming construct known herein as a "symbolgroup".

Symbolgroups

As the name suggests, the symbolgroup is a construct that allows a user of the MDPD 104 to create logical sets of one or more ticker symbols. As described below in the "Packaging" subsection, in at least one embodiment, once defined, a symbolgroup can be assigned to one or more output feeds. Indeed, in at least one embodiment, it is that assignment that actually (at least partially) defines the content (i.e., the ticker-symbol subset) of a given output feed: a symbolgroup could be created and never assigned to an output feed; moreover, a symbolgroup could be created and assigned to more than one output feed.

In at least one embodiment, a given output feed can have zero, one, or more symbolgroups assigned to it. In an embodiment, if an output feed has at least one symbolgroup assigned to it, the MDPD 104 will restrict outbound messages on that given output feed to only those messages that concern symbols listed in the union of the one or more symbolgroups that have been assigned to that output feed. In an embodiment, if an output feed does not have any symbolgroups assigned, all messages from the associated input feed will be included in that output feed regardless of the symbol concerned.

In the following CLI example and in all ensuing CLI examples in this disclosure, the non-bolded characters are those that are presented by the MDPD 104 on the CLI, whereas the bolded characters are those that are entered by an example user. Moreover, the leading portion (from the left) of each line that includes the ">" symbol is a prompt from the MDPD 104 to the user for text entry (where the prompt is made up of all characters, starting from the left margin and proceeding to the right, up to and including the ">" symbol), while each line that is shown as being indented from the left—and by design do not include an ">" symbol—is a line of example textual output presented on the CLI to the user by the MDPD 104.

Consider the ensuing example in which a symbolgroup named "es_complex" is created such that it includes exchange-traded funds (ETFs) that have a high correlation to the S&P 500 (ES) futures contract.

```
>symbolgroup es_complex
es_complex>add SPY
es_complex>add VOO
es_complex>add SSO
es_complex>add XLF
es_complex>show
        {SPY, SSO, VOO, XLF}
es_complex>del XLF
es_complex>show
        {SPY,SSO,VOO}
es_complex>exit
>
```

Tracking through the above example, on the first line, at the most basic (i.e., top-level) prompt (i.e., simply the '>' at the left margin), the text entry of 'symbolgroup es_complex' creates (and enters) that symbolgroup if it did not already exist, or instead just enters that symbolgroup if it did already exist. Each ensuing prompt other than the last one reads 'es_complex>', indicating that the user is 'in' that symbolgroup for editing its contents, displaying its contents, and/or the like. The next four lines each 'add' a ticker symbol to what in this example was an empty symbolgroup. The first 'show' command displays the then-current contents of the symbolgroup 'es_complex'. The 'del' command removes the ensuing symbol 'XLF' from the symbolgroup. The second 'show' command again displays the then-current (i.e., updated) contents of the symbolgroup, and the 'exit' command backs the user out to the top-level '>' prompt.

What follows is a second example, showing the creation and defining of a symbolgroup called 'mygroup', which is referenced below in the "Packaging" subsection.

```
>symbolgroup mygroup
mygroup>add SPY
mygroup>add ABC
mygroup>add DEF
mygroup>add GHI
mygroup>add JKL
mygroup>show
        {SPY,ABC,DEF,GHI,JKL}
mygroup>exit
>
```

It is noted that the ticker symbol SPY appears in both the symbolgroup 'es_complex' and the symbolgroup 'mygroup'. In at least one embodiment, the present systems and methods are agnostic as to whether multiple symbolgroups overlap with respect to the ticker symbols contained therein.

What follows is a third example, showing the creation and defining of a symbolgroup called 'mygroup2', which is also referenced below in the "Packaging" subsection.

```
>symbolgroup mygroup2
mygroup2>add MNO
mygroup2>add PQR
mygroup2>add STU
mygroup2>show
        {MNO,PQR,STU}
mygroup>exit
>
```

What follows is a fourth example, showing the creation and defining of a symbolgroup called 'mygroup3', which is also referenced below in the "Packaging" subsection.

```
>symbolgroup mygroup3
mygroup3>add ABC
mygroup3>add MNO
mygroup3>add XYZ
mygroup3>show
        {ABC,MNO,XYZ}
mygroup>exit
>
```

In various different embodiments, users are able to define symbol groups using criteria such as first character of symbol name, an alphanumeric range of symbol names, an initial number of characters from several symbol names followed by a wildcard character, and/or one or more other ticker-symbol-name character-matching criteria.

Packaging

As mentioned above, in many implementations, a market-data feed is sent as a series of UDP packets; and it is further the case that, in many of those implementations, IP-multicast addressing is used. These two choices together are typically made for reasons of performance: UDP is a low-overhead protocol that allows packets to be routed, while the use of IP-multicast addressing allows for efficient distribution: if multiple consumers are interested in the same traffic, only one copy need be sent.

In a typical implementation, a UDP multicast message specifies its sender (as an IP address), its receiver (as an IP address in the multicast range—also known as a multicast address), and a 'port' (a numeric value often used, perhaps among other purposes, simply to disambiguate different types of data). The multicast address and port may be used by a downstream consumer to effect interest in receiving certain data. The sender, multicast address, and port can all be used by general-purpose routers to make routing decisions. This metadata (IP addresses and port) is what is meant in some embodiments by "packaging". In at least one embodiment, the MDPD 104 facilitates its users making packaging decisions about output feeds using a construct referred to herein as a "feedpackage".

Feedpackages

In at least one embodiment, feedpackages describe particular packaging schemes. Once defined, a feedpackage can be assigned to one or more output feeds. The output feed will then use the packaging as described by the assigned feedpackage. In at least one embodiment, the reason that a feedpackage can be assigned to multiple output feeds is that these different output feeds are sent along different physical links, so there is no ambiguity caused by the reuse of the same IP address and ports across multiple output feeds.

Building on the discussion above in the "Content" subsection, the reader will recall that, in the described embodiments, simply creating a symbolgroup does not shape the ticker-symbol subset for a given output feed; rather, in an embodiment, in order to at least partially define the ticker-symbol subset of a given output feed, a user would create a symbolgroup and then, as described below: create a feedpackage, assign the created symbolgroup to the created feedpackage, create an output feed, and assign the created feedpackage to the created output feed. As is more fully described below, in some embodiments, a user can also assign an individual symbol to a created feedpackage (i.e., without first going through the formality of creating a one-symbol symbolgroup, although that is an option as well).

First, some example CLI implementations for creating a feedpackage called "mc1":

```
>feedpackage mc1
mc1>auto-base 224.0.130.128/30001
mc1>auto-incr port 1
mc1>add auto symbolgroup es_complex
mc1>exit
>
```

The above example assumes that there had been no prior creation of a feedpackage called "mc1". In the above example, then, the first command, 'feedpackage mc1', creates that feedpackage and places the user "in" that feedpackage for editing and the like with the prompt 'mc1>'.

The next line, 'auto-base 224.0.130.128/30001', sets two parameters for this feedpackage. First, it sets the IP-multicast address '224.0.130.128' as being what is referred to herein as the "automatic-assignment base address" for this feedpackage, and thus as the automatic-assignment base address for the partitioning of any output feed to which this feedpackage is assigned. Second, it sets '30001' as being what is referred to herein as the "automatic-assignment base port" for this feedpackage (and similarly as the automatic-assignment base port for the partitioning of any output feed to which this feedpackage is assigned).

The next line, 'auto-incr port 1', sets for this feedpackage a parameter that is referred to herein as the "automatic-assignment incrementing scheme". Together with the prior command, the effect of this command in at least one embodiment is that the first symbol or symbolgroup for which a user requests an automatic (or auto, for short) assignment of a multicast-IP-address-and-port combination will be assigned 224.0.130.128:30001. And because the automatic-assignment incrementing scheme for the created feedpackage in this example is to increment the port number by 1, the second symbol or symbolgroup for which a user requests an auto assignment of a multicast-IP-address-and-port combination will be assigned 224.0.130.128:30002. The third will be assigned 224.0.130.128:30003, and so forth. Moreover, an increment value greater than 1 can be specified.

In at least one embodiment, a user may enter an 'auto-incr . . . ' command that specifies an automatic-assignment incrementing scheme to one or more of the port number and any one or more of the portions of the IP-multicast address. As is known in the art, an IPv4 address is made up of four integers, each in the range of 0-255, inclusive, delineated by three periods (or "dots" as they are typically called in the art). The above IP-multicast address (i.e., 224.0.130.128) is an example of just such an address. In the art, starting from the left and proceeding right, the integers are respectively known as the "A", "B", "C", and "D" portions of the address. Sometimes the lower-case letters "a", "b", "c", and "d" are used instead.

Thus, in at least one embodiment, a user may enter an 'auto-incr . . . ' command that specifies an automatic-assignment increment to one or more of (i) the "A" portion of the IP-multicast address, (ii) the "B" portion of the IP-multicast address, (iii) the "C" portion of the IP-multicast address, (iv) the "D" portion of the IP-multicast address, and (v) the port number. Indeed, the command line example above that reads:

mc1>auto-incr port 1 can be thought of as specifying that the automatic-assignment incrementing scheme for this feedpackage is (i) an increment equal to 0 for each portion of the IP-multicast address and (ii) an increment equal to 1 for the port number. In some cases this could be made explicit using the following syntax:

mc1>auto-incr ip-a 0 ip-b 0 ip-c 0 ip-d 0 port 1

Some implementations interpret the absence on a given command line of any one or more of these incrementable values as specifying a default increment (e.g., 0) for those one or more absent incrementable values. Moreover, some implementations interpret 'ip' (i.e., without an ensuing letter-portion qualifier) as 'ip-d'. And though the above example shows four increments having a value of 0 and one increment having a value of 1, each such value that is specified to be part of the automatic-assignment incrementing scheme for a given feedpackage can be specified to increment (with each successive assignment of an IP-multicast-address-and-port combination to a given symbol or symbolgroup) by any amount (i.e., 1 or more) deemed suitable by one of skill in the art for a given implementation.

In at least one embodiment, if a given increment causes an overflow in a certain place value, that condition is handled by carrying that increment into the next place value; for example, if it is specified by an 'auto-incr . . . ' command that the address 224.0.130.128 should be incremented by 128 in the "D" portion of the address, this would be reflected as an incremented value of 224.0.131.001, as the upper limit of 255 for the "D" portion would have been exceeded by 1. And certainly numerous other examples and manners of handling such conditions could be presented here.

Returning to the above example, the fourth line, 'add auto symbolgroup es_complex', adds the earlier-created symbolgroup 'es_complex' to the feedpackage 'mc1' and requests—using the 'auto' portion of the command line, an automatic assignment of an IP-multicast-address-and-port combination to the symbolgroup 'es_complex'. In this example, this requested automatic assignment will be carried out based on the earlier-specified (i) automatic-assignment base address of 224.0.130.128, (ii) automatic-assignment base port of 30001, and (iii) automatic-assignment incrementing scheme of incrementing the port number by 1 with each successive assignment (after the first)).

Because this is the first requested automatic assignment for the feedpackage 'mc1', the automatic-assignment incrementing scheme does not yet come into play, and the symbolgroup 'es_complex' is accordingly assigned the automatic-assignment-base-address: automatic-assignment-base-port combination of 224.0.130.128:30001. Thus, pending further modifications to the feedpackage 'mc1' of course, 'mc1' is currently configured to include all order-book updates to the ticker symbols in the set '{SPY,SSO,VOO}' in a partition addressed to 224.0.130.128:30001. As such, a recipient of an output feed to which 'mc1' has been assigned could confidently shunt any packets in the output feed that are addressed to that address:port combination to a process, device, or the like that is expecting only order-book updates to those particular ticker symbols.

The fifth and final command line on which an example command is shown as having been entered in the above example contains simply the command 'exit'. This causes the CLI to return to presenting the top-level prompt (i.e., '>'). Below is a further CLI example in which a hypothetical user reenters the now-existing feedpackage 'mc1' (by way of the first line), makes some edits to that feedpackage, and thereafter exits back out to the top-level prompt (by way of the 'exit' line). The further CLI example below also illustrates some additional types of feedpackage modifications that are available in at least some embodiments.

```
>feedpackage mc1
mc1>add auto symbolgroup mygroup
mc1>add auto symbolgroup mygroup2 flatten
mc1>add manual 224.1.100.100/20000 symbolgroup mygroup3
mc1>add manual 224.1.100.100/20020 symbol SPY
mc1>exit
>
```

The second line ('add auto symbolgroup mygroup') requests in an automatic address:port combination to the above-defined symbolgroup 'mygroup', and would result in the assignment of 224.0.130.128:30002 to 'mygroup' since this is the second requested assignment, the first was 224.0.130.128:30001, and the automatic-assignment incrementing scheme specifies a port-number increment of 1.

The third line ('add auto symbolgroup mygroup2 flatten') introduces a new command—i.e., the 'flatten' command. In at least one embodiment, the inclusion of this command results in an automatic address:port assignment (according to the above-specified parameters) to each individual symbol in the named symbolgroup (here, 'mygroup2') rather than to the symbolgroup as a whole. Thus, the 'flatten' command creates a partition for each such individual symbol in the named symbolgroup 'mygroup2', which the reader will recall is defined above as being the ticker-symbol set {MNO, PQR,STU}. In this example, the result would be (i) the assignment of 224.0.130.128:30003 to the symbol MNO, (ii) the assignment of 224.0.130.128:30004 to the symbol PQR, and (iii) the assignment of 224.0.130.128:30005 to the symbol STU.

The fourth line ('add manual 224.1.100.100120000 symbolgroup mygroup3') introduces the 'manual' command, which in at least one embodiment is available for effecting a manual assignment of a address:port combination that is explicitly specified in that same command line to either a symbolgroup or a symbol that is also explicitly specified in that same command line. Thus, the fourth line would have the effect of manually assigning 224.1.100.100:20000 to the symbolgroup 'mygroup3'. Similarly, the fifth line ('add manual 224.1.100.100/20020 symbol SPY') would have the effect of manually assigning 224.1.100.100:20020 to the individual symbol SPY.

Moreover, in various different embodiments, users are able to specify what happens in output feeds to which a given feedpackage has been assigned with respect to order-book updates to symbols that do not match any of the manual or automatic address:port assignments that have been made as part of defining the given feedpackage. These non-matching symbols could be denoted using a wildcard symbol such as the '*'. In some embodiments, an automatic or manual assignment of an address:port pair to '*' results in order-book updates to all non-matching symbols being placed on that particular address:port pair. In some embodiments, not making an assignment of '*' to an address:port pair results in order-book updates to all non-matching symbols being silently discarded (i.e., not included in the given output feed). And certainly other example implementations could be listed here as well.

With the benefit of the above descriptions of symbolgroups and feedpackages, this disclosure now revisits the above-made statements that, in at least one embodiment, (i) an output-feed profile includes a ticker-symbol subset and a ticker-symbol-based feed-partitioning scheme and (ii) a ticker-symbol-based feed-partitioning scheme includes (a) partition-definition data that defines one or more ticker-symbol based partitions and (b) partition-channel data that assigns each such defined partition to a respective output-feed channel among a plurality of mutually exclusive output-feed channels. In embodiments that make use of the symbolgroup and feedpackage constructs as described herein, and considering an example in which a given feedpackage has been assigned to a given output feed, the ticker-symbol subset in the output-feed profile for that given output feed would be the set union of all symbols and symbolgroups (perhaps including a '*' symbolgroup) that have been assigned an address:port combination in the given feedpackage. With respect to the ticker-symbol-based feed-partitioning scheme in the output-feed profile for that given output feed, the partition-definition data would include an itemized list of each individual symbol or symbolgroup that received its own assignment of an address:port combination, and the partition-channel data would include both an itemized list of each address:port combination that was so assigned, along with data that associates each such assigned address:port combination with its corresponding symbol or symbolgroup in the partition-definition data. And certainly other example embodiments could be listed here as well.

Protocol

While market data feeds published by trading venues all have similar semantics, different trading venues typically publish messages using syntax unique to that venue. In technical terms, such syntax is known as a protocol.

For any given output feed, the MDPD 104 enables its users to specify the protocol that the feed should be delivered in. This protocol could be the same of the associated input feed, or it can be different. If different, the MDPD 104 is effectively 'translating' the feed—for example, taking a feed in BATS PITCH and republishing the same information as Nasdaq ITCH. In various different embodiments, the MDPD 104 supports one, some, or all of the following protocols for outbound feeds:

Nasdaq TotalView ITCH 5.018
BATS PITCH 2.220.419
NYSE XDP Integrated Feed 1.13b20
CME MDP 3.021; and
one or more proprietary incremental-feed protocols.

Exchange Emulation: Further Description and Examples

It is the provision by the MDPD 104 of downstream gap-fill and/or late-join services, as well as the supporting functions that the MDPD 104 carries out in order to be able to provide such services, that is the focus of FIGS. 13-18D and their accompanying descriptions.

Figure 13:
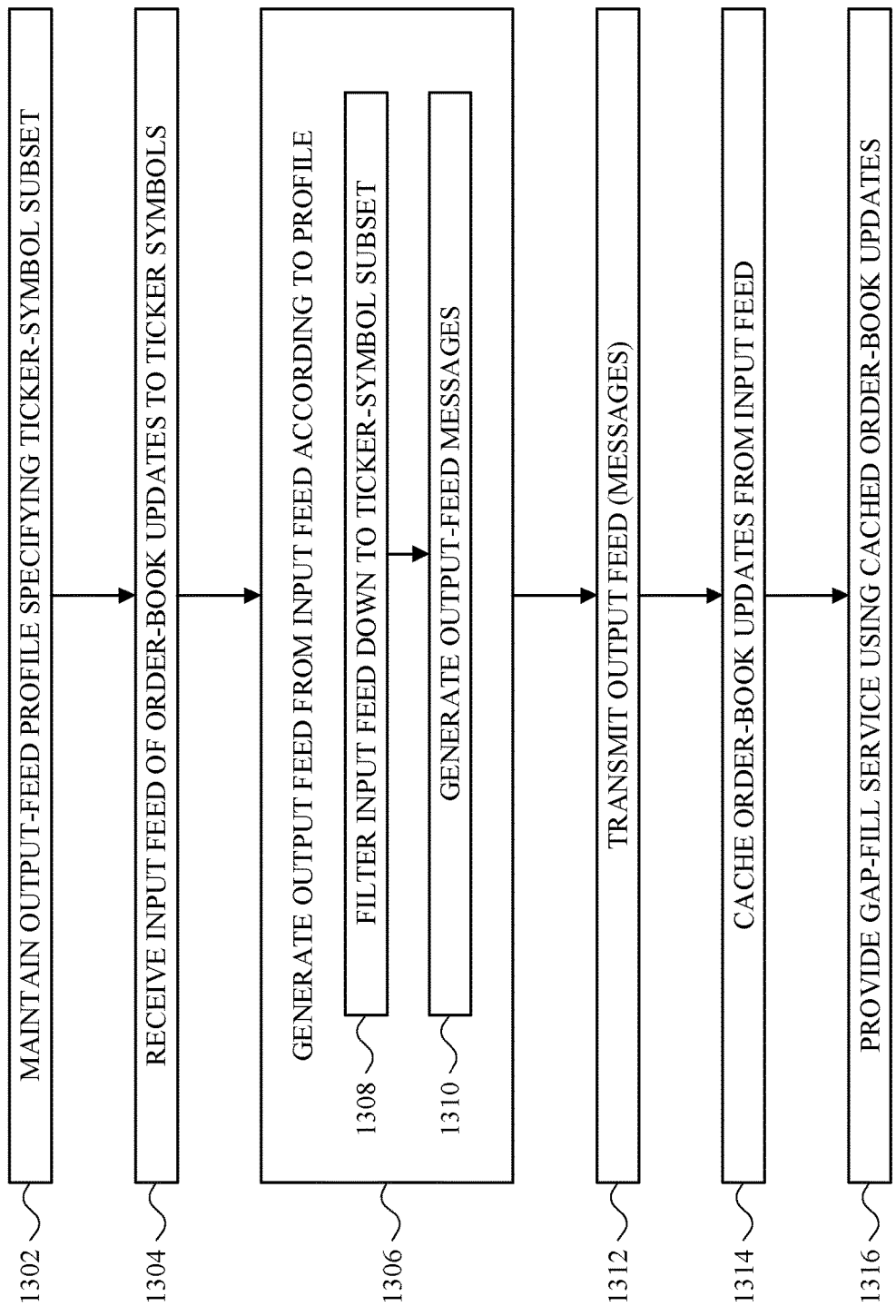
FIG. 13 is a flowchart of an example method, in accordance with at least one embodiment.

FIG. 13 is a flowchart of an example method, in accordance with at least one embodiment. In particular, FIG. 13 depicts an example method 1300 that may be carried out by an MDPD such as the herein-described MDPD 104.

At step 1302, the MDPD 104 maintains the output-feed profile 210, which specifies a ticker-symbol subset 212 from among a plurality of ticker symbols. The plurality of ticker symbols could be the full set of symbols in the market-data feed offered by Nasdaq or some other exchange, as examples. The MDPD 104 may carry out step 1302 substantially as described above with respect to step 1002 of the method 1000, though it is noted that step 1302 does not specify whether the maintained output-feed profile 210 includes a partitioning scheme; in some embodiments it does, in others it does not.

In at least one embodiment, the ticker-symbol subset 212 includes all of the ticker symbols in the plurality of ticker symbols. In at least one embodiment, the ticker-symbol subset 210 does not include all of the ticker symbols in the plurality of ticker symbols.

In at least one embodiment, the MDPD 104 includes the PLC 206, and step 1302 involves the PLC 206 maintaining the output-feed profile 210 as the operational copy of the output-feed profile 110; in at least one such embodiment, the MDPD 104 also includes the host data storage 108, and step 1302 also involves the MDPD 104 maintaining the management copy 110 of the output-feed profile in the host data storage 108.

At step 1304, the MDPD 104 receives, from the upstream device 102, the input feed 116. The MDPD 104 may carry out step 1304 substantially as described above with respect to step 1004 of the method 1000. As stated, the received input feed 116 could be an incremental input feed and therefore contain incremental order-book updates such as add-order updates, modify-order updates, cancel-order updates, and the like.

At step 1306, the MDPD 104 generates the output feed 118 from the received input feed 116. In this described embodiment, the MDPD 104 carries out step 1306 at least in part by carrying out the below-described substeps 1308 and 1310. In at least one embodiment, the MDPD 104 includes the PLC 206 configured to carry out step 1306.

At substep 1308, the MDPD 104 filters the received input feed 116 down to a filtered feed of the order-book updates to the respective ticker symbols in the ticker-symbol subset 212. The MDPD 104 may carry out substep 1308 substantially as described above with respect to substep 1008 of step 1006 of the method 1000.

At substep 1310, the MDPD 104 generates market-data-output-feed messages that respectively convey the order-book updates in the filtered feed that the MDPD 104 generated at substep 1308. After introducing steps 1312, 1314, and 1316 below, this description returns to substep 1310 to provide detail pertaining to that substep in various different embodiments.

At step 1312, the MDPD 104 transmits the generated market-data output feed 118 to the downstream device 106 at least in part by transmitting the market-data-output-feed messages—that the MDPD 104 generated at substep 1310— to the downstream device 106. The MDPD 104 may carry out step 1312 substantially as described above with respect to step 1012 of the method 1000. As described herein, the output feed 118 could be an incremental feed, and be formatted in any suitable market-data protocol, independent of the market-data protocol in which the input feed 116 is formatted.

Figure 14:
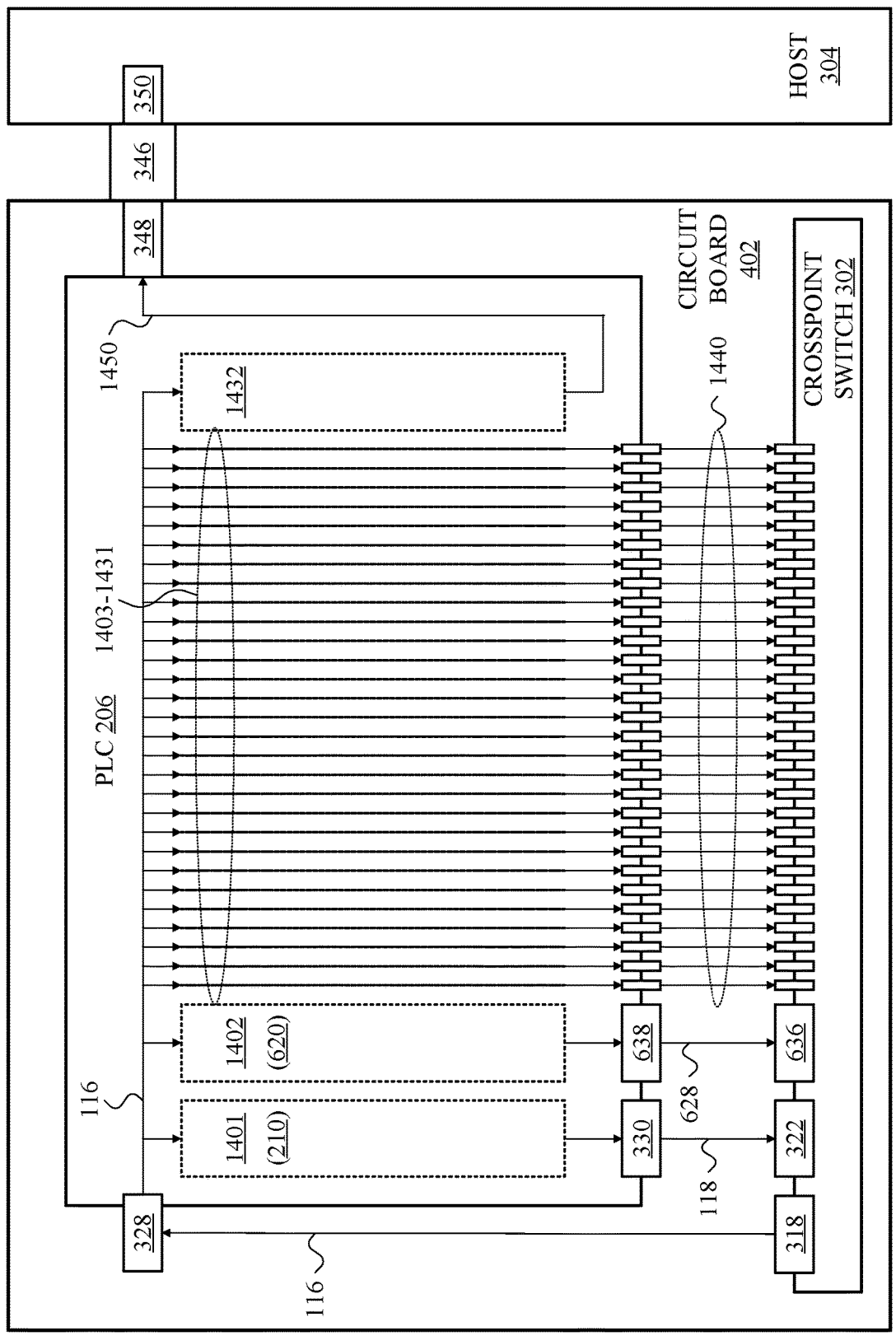
FIG. 14 is a partial view of an example architecture of the MDPD of FIG. 1, in accordance with at least one embodiment.

At step 1314, the MDPD 104 stores cached copies of at least the order-book updates from the input feed 116 that respectively correspond with market-data-output-feed messages in the generated market-data output feed 118. A partial view of an example architecture of the MDPD 104 that facilitates the MDPD 104 carrying out step 1314 in at least one embodiment is depicted by way of example in FIG. 14. In particular, FIG. 14 depicts a partial view 1400 of the MDPD 104. The partial view 1400 includes the circuit board 402 communicatively connected to the host 304 by the data interface 348, the PCI express bus 346, and the data interface 350. A highly simplified view of the host 304 is depicted in FIG. 14, not to imply that the other components that appear in other figures are not present in this embodiment, only to simplify the presentation of FIG. 14 to allow for more detailed description of certain aspects of the circuit board 402 (and in particular the PLC 206) in certain embodiments.

In the partial view 1400, the PLC 206 still receives the input feed 116 via PLC data port 328 from the crosspoint data port 318 of the crosspoint switch 302. In the embodiment that is depicted in FIG. 14, the PLC 206 includes 32 operational "digital-logic assembly lines" 1401-1432, each of which implements in digital logic a (potentially) different operational copy of an output-feed profile. In some embodiments, including the embodiment that is depicted in FIG. 14, all but one (i.e., the first 31 and not the 32nd) of the digital-logic assembly lines 1401-1432 are available to implement (potentially) different output-feed profiles, thus making the MDPD 104 capable of sending out one or more copies of each of 31 different output feeds, all based on a single input feed 116 (or multiple different input feeds in some embodiments). And clearly all of these numbers are examples, as any suitable number of each component could be implemented in various different embodiments.

In the depicted embodiment, the digital-logic assembly line 1401 and the digital-logic assembly line 1402 implement the operational output-feed profile 210 and the operational output-feed profile 620, respectively, that are mentioned above. For space concerns in FIG. 14, the digital-logic assembly lines 1403-1431 are depicted only having the width of a single line, but it is to be understood that each of these could be configured to implement its own respective operational output-feed profile as well. It can further be seen that, as is the case in prior figures, the PLC 206 transmits the output feed 118 from the PLC data port 330 to the crosspoint data port 322, and the PLC 206 also transmits the output feed 628 from the PLC data port 638 to the crosspoint data port 636. Moreover, the digital-logic assembly lines are shown as having their respective output feeds (if configured to be operable) transmitted via respective (though not individually numbered in FIG. 14) PLC data ports of the PLC 206 to respective (though not individually numbered in FIG. 14) crosspoint data ports of the crosspoint switch 302 via respective (though not individually numbered in FIG. 14) data connections 1440.

Moreover, the digital-logic assembly line 1432 is depicted in FIG. 14 as having its output transmitted to the host 304 via a data connection 1450, the data interface 348, the PCI express bus 346, and the data interface 350. It can further be seen that, in the embodiment that is depicted in FIG. 14, the PLC 206 delivers a copy of the input feed 116 to the start of each respective digital-logic assembly line 1401-1432. With its respective copy of the input feed 116, the digital-logic assembly line 1432 may simply pass every tick (i.e., order-book update) in the input feed 116 to the host 304, or the digital-logic assembly line 1432 may be configured so as to pass a subset of the input feed 116 to the host 304, where that subset could be the set union of all of the ticker symbols that are part of the respective ticker-symbol subsets being implemented by the digital-logic assembly lines 1401-1431. In the example that is described herein, the digital-logic assembly line 1432 passes a copy of every order-book update in the input feed 116 to the host 304, but this is by way of example. That copy is referred to herein at times as being an archival copy of the input feed 116.

In at least one embodiment, the host 304 stores some number of the most recent order-book updates from the input feed 116, to enable the host 304 to respond to gap-fill requests from various downstream devices. In at least one embodiment, the host 304 maintains current local (i.e., stored on the MDPD 104) lists of active orders, one list for each of at least the symbols that appear in at least one ticker-symbol subset of at least one output feed that is being implemented by a digital-logic assembly line 1401-1431. In at least one embodiment, the host 304 maintains a current local list of active orders for every ticker symbol in the input feed 116, to better serve late-join requests—which may occur when, e.g., ticker symbols are added to output feeds during a given trading period (e.g., day), or when a downstream device subscribes late to an incremental output feed and needs to catch up.

In some embodiments, one or both of step 1312 of FIG. 13 and step 1012 of FIG. 10 involves transmitting multiple (e.g., two) instances of each order-book update in the output feed 118 to the downstream device 106. A first instance of the output feed 118 may be transmitted at the time it is generated, as disclosed herein. A second instance of the output feed 118, which may be referred to as a time-delayed output feed 118, is transmitted after a time delay via the same communication path as the first instance of the output feed 118.

For example, in the view 1400 of FIG. 14, the digital-logic assembly line 1401 may be configured to generate both the output feed 118 and a time-delayed duplicate instance of the output feed 118. Both instances of the output feed 118 are provided to the crosspoint data port 322, for forwarding to the downstream device 106. The digital-logic assembly line 1401 may be configured to generate the time-delayed output feed 118 with a predetermined time delay on an update-by-update basis. In some embodiments, a time delay on the order of 50 μs is used for the time-delayed output feed 118, although other time delays may certainly be used. Thus, the digital-logic assembly line 1401 may transmit a first instance of a given order-book update having a sequence number such as 12345, and then transmit a second copy of order-book update #12345 50 μs later (or whatever the selected time delay may be). Such would also be the case with order-book update #12346, #12347, and so forth.

In at least one embodiment, the downstream device 106 is correspondingly configured to receive both instances of the output feed 118 (i.e., the original instance and the time-delayed second instance). The downstream device 106 may maintain current local lists of active orders associated with the output feed 118's updates. In the event that the first instance of a given update is not received by the downstream device 106, the current local list of active orders may be updated when the time-delayed instance of that given update is received. Thus, a gap-fill request from the downstream device 106 and a subsequent gap-fill response from the MDPD 104 may be avoided in the event that the first instance of the given update is not successfully received but the time-delayed instance of the given update is successfully received. In the event that a first instance of a given update is successfully received by the downstream device 106, the downstream device 106 may simply discard the time-delayed copy of that given update (in the event the time-delayed copy is itself successfully received, of course; if it isn't, no harm done and nothing to discard). Variations of ways in which a device such as the downstream device 106 could handle the receipt of multiple copies of various updates at different times are further described below in the section that relates to arbitration among multiple market-data feeds.

In some embodiments, the output-feed transmission step 1012 includes transmitting an output feed that includes both incremental order-book updates and periodic "snapshots"; such a snapshot which, for purposes of this disclosure includes a list of current active orders, the list of current active orders can also be referred to as "order books". In such embodiments, the incremental order-book updates are transmitted as a part of the output feed 118 as disclosed herein, with each incremental output-feed update being associated with a corresponding update from the input feed 116. Additionally, perhaps on a periodic basis, or perhaps based on some other trigger or condition such as available bandwidth, the MDPD 104 transmits one or more snapshots, each indicating the current list of active orders, which can also be referred to as "order books", being maintained by the MDPD 104 in connection with a particular ticker symbol.

As described herein, the host side of a given MDPD such as the MDPD 104 may maintain such lists of active orders, and may thus be the MDPD entity responsible for transmitting periodic and/or occasional snapshots to supplement an incremental feed being sent by the PLC side of the same MDPD 104. The MDPD host may send such snapshots via the PLC 206 and thus the same communication path traversed by the output feed 118, or may instead send the snapshots via a different communication path, such as the communication paths described herein for use in sending gap-fill and late-join responses. The transmission of these unsolicited snapshots may advantageously obviate the need for the downstream device 106 to send one or more gap-fill requests and/or one or more late-join requests. Other possible trigger conditions for sending these supplemental snapshots are the frequency and/or raw number of incremental messages in the input feed 116 (and correspondingly in the output feed 118) overall and/or for a given ticker symbol, among many other possible examples that could be listed here.

Figure 15A:
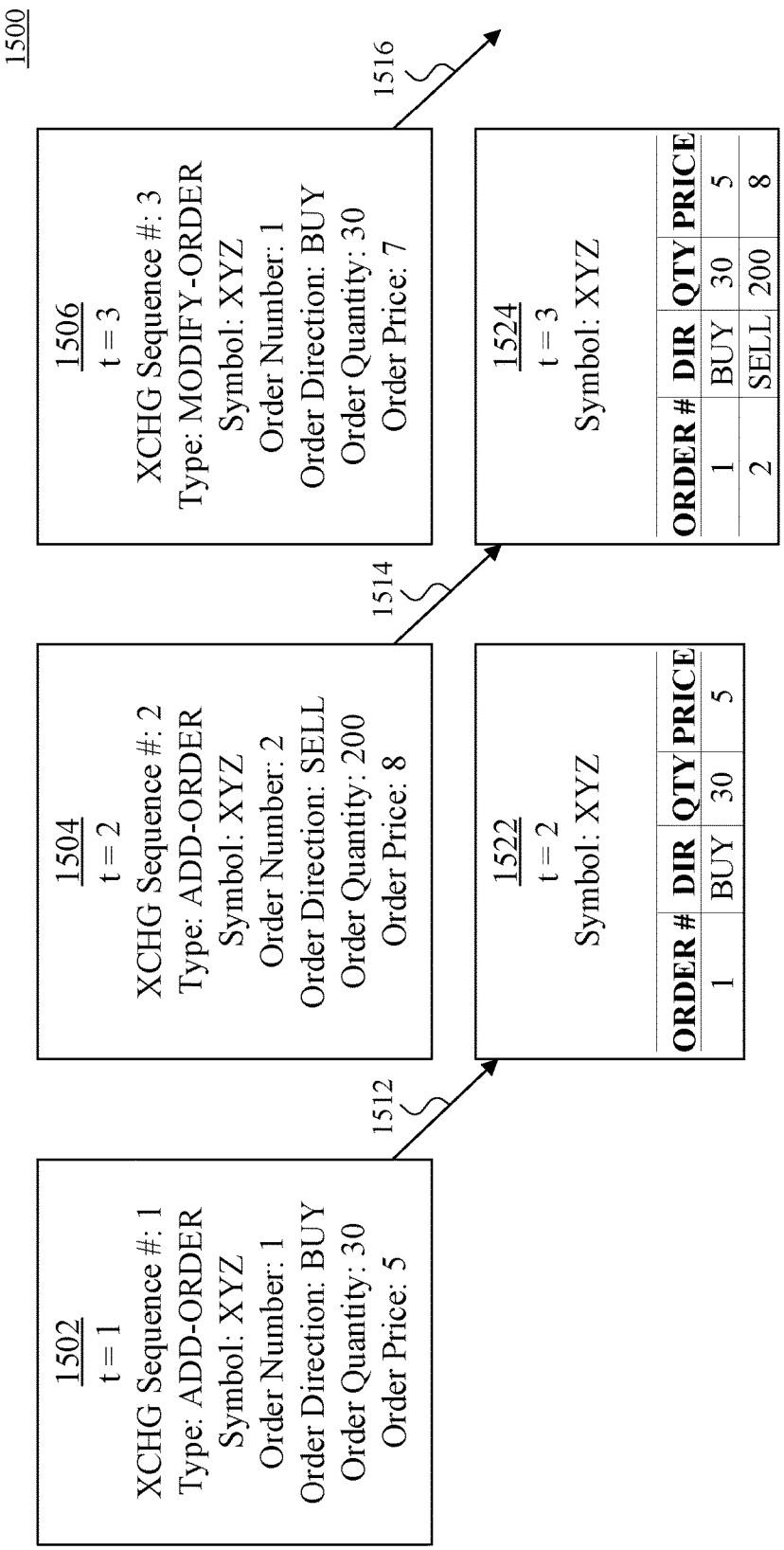
FIG. 15A depicts the first of two parts of an example of active order list maintenance based on an example input feed, in accordance with at least one embodiment.
Figure 15B:
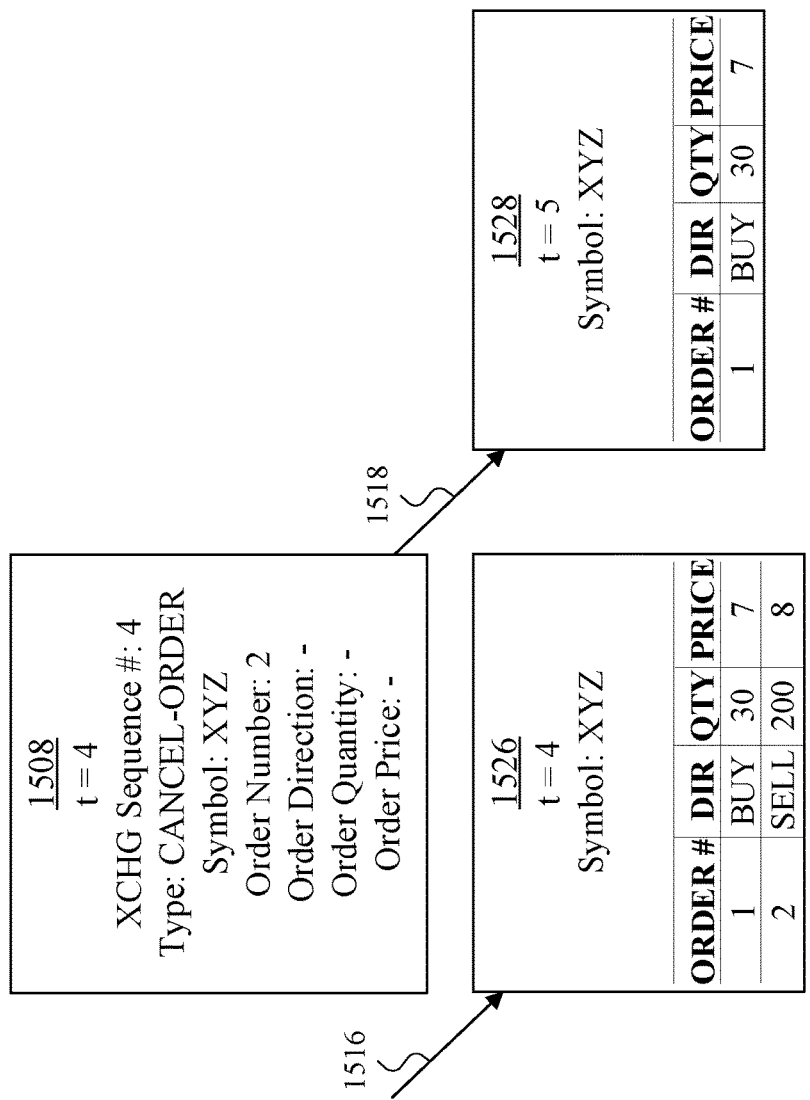
FIG. 15B depicts the second of the two parts of the example of active order list maintenance that begins on FIG. 15A, in accordance with at least one embodiment.

FIG. 15A and FIG. 15B respectively depict the first and second of two parts of an example of active order list maintenance based on an example input feed, in accordance with at least one embodiment. In particular, FIGS. 15A and 15B respectively present views 1500 and 1550 that collectively demonstrate an example in which the MDPD 104 receives an order-book update 1502 at a time t=1, an order-book update 1504 at t=2, an order-book update 1506 at t=3, and an order-book update 1508 at t=4. The views 1500 and 1550 also collectively show an active order list state 1522 at t=2 (after applying the order-book update 1502 at 1512), an active order list state 1524 at t=3 (after applying the order-book update 1504 at 1514), an active order list state 1526 at t=4 (after applying the order-book update 1506 at 1516), and an active order list state 1528 at t=5 (after applying the order-book update 1508 at 1518). The staggered nature of, e.g., receiving an order-book update at t=1 and having the updated active order list state reflect that update at t=2 (at the same time that the order-book update 1504 is received) is purely an illustrative example and not meant to be limiting in any way. These examples could be presented with no example times (just sequences); they could be presented with order-book updates being received and reflected in the same "time period" as far as the figures are concerned; and numerous other options are possible as well.

The order-book update 1502 is received at t=1, has an exchange (e.g., Nasdaq) sequence number of 1, is of type ADD-ORDER (among the possible ADD-ORDER, MODIFY-ORDER, and CANCEL-ORDER in this example of an incremental feed), pertains to (example) ticker symbol XYZ, conveys an order number of 1, the order direction is BUY (among the possible BUY and SELL in this example), the order quantity is 30, and the order price is 5 (dollars in this example). Accordingly, the list of active orders (for ticker symbol XYZ) is shown at t=2 with an initial state 1522 of having just a single order to buy 30 shares of XYZ for $5 per share.

Also at t=2, the order-book update 1504 is received, having an exchange sequence number of 2, type ADD-ORDER, symbol XYZ, order number 2, order direction SELL, order quantity 200, and order price $8. This order has been added to the active order list as shown at t=3 in active order list state 1524. Also at t=3, the order-book update 1506 is received, having an exchange sequence number of 3, type MODIFY-ORDER, symbol XYZ, order number 1, order direction BUY, order quantity 30, and order price $7. The effect of this MODIFY-ORDER update is to modify the order price of previously-added order number 1 from $5 to $7 (the direction on the MODIFY-ORDER update remaining the same i.e. BUY, and the quantity remaining the same i.e. 30). The active order list state 1526 at t=4 reflects the application of this order-book update 1506.

Also at t=4, the order-book update 1508 is received, having an exchange sequence number of 4, type CANCEL-ORDER, symbol XYZ and order number 2. Being an ORDER-CANCEL update, no direction, quantity or price is necessary and neither are they provided. The effect of this CANCEL-ORDER update is to remove order number 2 from the list of active orders. This update is reflected at t=5 in the active order list state 1528. Any further additions of other orders, modifications of existing orders, and/or cancellations of existing orders would be reflected in further modifications to the state of the locally maintained list of active orders for ticker symbol XYZ. In at least one embodiment, the MDPD 104 maintains such a list of active orders for every ticker symbol in the input feed 116.

At step 1316, the MDPD 104 provides, to the downstream device 106, a gap-fill service for the generated market-data output feed 118 using the cached order-book-update copies. In at least one embodiment, step 1316 involves the MDPD 104 transmitting one or more gap-fill responses to the downstream device 106 via the NIC 340.

In at least one embodiment, in substep 1310, the MDPD 104 includes, in each output-feed message, a feed-level sequence number indicating the sequential position of that message among all of the messages in the generated market-data output feed. Such an example is described below in connection with FIGS. 16A-C.

Figures 16A, 16B, 16C, 16D:
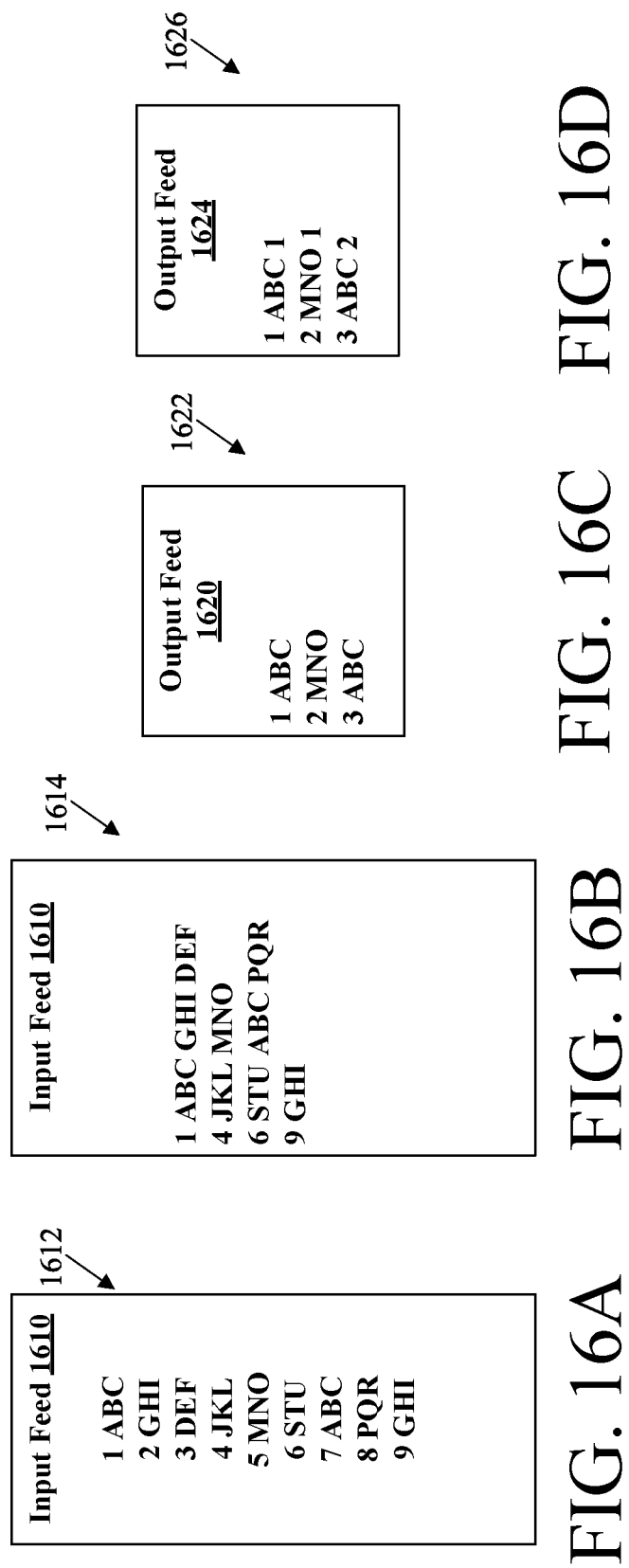
FIG. 16A depicts a first example input feed, in accordance with at least one embodiment.
FIG. 16B depicts a second example input feed, in accordance with at least one embodiment.
FIG. 16C depicts a first example output feed, in accordance with at least one embodiment.
FIG. 16D depicts a second example output feed, in accordance with at least one embodiment.

FIG. 16A depicts a first example input feed, in accordance with at least one embodiment. In particular, FIG. 16A depicts a first view 1612 of an example input feed 1610. In some embodiments, the input feed order-book updates are sequentially numbered. The input feed 1610 includes nine updates for the following ticker symbols: updates 1 and 7 are for ticker symbol ABC, updates 2 and 9 for GHI, update 3 for DEF, update 4 for JKL, update 5 for MNO, update 6 for STU, and update 8 for PQR. Here, a single order-book update is included in each message, or packet, of the input feed. The messages are numbered sequentially.

Each update in the input feed 1610 represents an update to an active order list for the respective symbol, which may for example be add-order, modify-order, or cancelorder updates. The details of the updates are not depicted in the view 1612 of the input feed. Each of the updates may be transmitted in its own packet with its own sequence number. By way of example, the updates may be formatted similar to the order-book updates depicted at 1502-1508 of FIGS. 15A and 15B. As depicted in the view 1612, each update to each ticker symbol has its own sequence number, with the first update being numbered '1' for the ticker symbol 'ABC', and the last update in the input feed 1610 being numbered '9' for the ticker symbol 'GHI'.

FIG. 16B depicts a second example input feed, in accordance with at least one embodiment. In particular, FIG. 16B depicts a second view 1614 of the input feed 1610. The second view 1614 comprises the same information as the input feed 1610 of the view 1612, other than the fact that multiple updates are included into each packet received from the upstream device. In such an embodiment, only the sequence number of the first update is included in each packet. As shown in the second view 1614 of the input feed 1610, the first update packet includes updates for ticker symbols 'ABC', 'GHI', and 'DEF'. The sequence number for the 'ABC' update is '1', and the sequence number for the 'GHI' update is implicitly '2', and the sequence number for the 'DEF' update is implicitly '3'.

The second update packet includes updates for the ticker symbols 'JKL' and 'MNO'. The sequence number for the message including updates for 'JKL' and 'MNO' is '4', and it is implied that the sequence number for the first update in the message (here, for 'JKL') is '4' because it is the first update in the message and the sequence number for the second update in the message (here, for 'MNO') is '5'. The sequence numbers continue for remaining packets in the input feed.

In some embodiments, the views of the input feed 1610 represent a portion of the input feed 116. As disclosed herein, each of the updates of the input feed 1610 may be incremental order-book updates (e.g., add-order, modify-order, cancel-order). Further, the input feed 1610 may be in any of many different protocols. Some standard market-data protocols known in the industry are Nasdaq ITCH and BATS PITCH. In some embodiments, the protocol is a custom-designed (e.g., proprietary) market-data protocol.

FIG. 16C depicts a first example output feed, in accordance with at least one embodiment. In particular, FIG. 16C depicts a view 1622 of an output feed 1620. In some embodiments, the output feed 1620 represents a portion of the output feed 118. In one embodiment, the system depicted in the view 200 of FIG. 2 is used to generate a customized output feed (such as the output feed 1620) from an input feed (such as the input feed 1610). In such an embodiment, the input feed 116 is represented by the input feed 1610 of FIG. 16A or 16B. Further, the output feed 118 is represented by the output feed 1620 of FIG. 16C. The output feed 118 is generated at least in part by filtering the received input feed 116 down to a filtered feed of the order-book updates to respective ticker symbols in a ticker-symbol subset. In an example, an output-feed profile (such as the output-feed profile 210) includes the ticker symbols 'ABC' and 'MNO' as ticker symbols to be included in a customized market-data output feed. Thus, the output feed 118 is filtered down to include only updates to ticker symbols 'ABC' and 'MNO'. Certainly other examples could be listed as well.

Thus, in the output feed 1620, the update "1 ABC" corresponds to the update "1 ABC" of the input feed 1610, the update "2 MNO" corresponds to the update "5 MNO" of the input feed 1610, and the update "3 ABC" corresponds to the update "7 ABC" from the input feed 1610. Similar to the input feed 1610, the updates in the output feed 1620 may be incremental updates. Also, just as the second view 1614 of the input feed 1610 includes multiple updates in a single packet, the output feed 1620 may also be transmitted as a single packet, with one explicit sequence number, and two implied sequence numbers, (e.g., "1 ABC MNO ABC"). In the view 1622 of the output feed 1620, the sequence numbers—either implicit or explicit—indicate the sequence of the updates within the overall output feed (i.e., they are feed-level sequence numbers).

In some embodiments, the sequence numbers of the output feed indicate the sequential order of the messages in each output feed. Thus, a second output feed comprising a different subset of ticker symbols (e.g., 'ABC' and 'PQR') than the output feed 1620 would have different output-feed sequence numbers. By way of example, an output feed based on filtering the input feed 1610 to the ticker symbols 'ABC' and 'PQR' would be represented by an output feed with the following updates: '1 ABC, 2 ABC, 3 PQR'. In this example, the '1 ABC' correlates to the '1 ABC' update of the input feed 1610, the '2 ABC' correlates to the '7 ABC' of the input feed 1610, and the '3 PQR' correlates to the '8 PQR' of the input feed 1610. And certainly other examples could be listed as well.

In at least one embodiment, generating the market-data-output-feed messages in substep 1310 includes including, in each such message, a ticker-symbol-level (or just symbol-level, for short) sequence number indicating the sequential position of the corresponding order-book update among the order-book updates to the corresponding ticker symbol in the received input feed. Such an example is shown in FIG. 16D, which depicts a second example output feed comprising both feed-level and symbol-level sequence numbers, in accordance with at least one embodiment. In particular, FIG. 16D depicts a view 1626 of an example output feed 1624 that includes updates to the ticker symbols 'ABC' and 'MNO' and is similar to the view 1622 of the output feed 1620. However, each update in the view 1626 of the output feed 1624 includes two sequence numbers. A first sequence number (i.e., the feed-level sequence number) is used to identify the sequential position of an update among the other updates in the output feed. A second sequence number (i.e., the symbol-level sequence number) is used to identify the sequential position of the corresponding order-book update among the order-book updates to the corresponding ticker symbol in the received input feed.

In the view 1626 of the output feed 1624, the first update is indicated as '1 ABC 1', with the first '1' indicating the feed-level sequence number, that this is the first message in the output feed 1624. The 'ABC' indicates the message is for ticker symbol 'ABC', and the second '1' is a symbol-level sequence number indicating this is the first update for the ticker symbol 'ABC' in the received input feed. The second message in the output feed 1624 is the first update message for the ticker symbol 'MNO', as indicated by '2 MNO 1'. The '2' indicates it is the second message in the output feed overall, one number incrementally higher than the first '1' of '1 ABC 1'. The 'MNO' indicates the update is for ticker symbol 'MNO', and the '1' indicates it is the first message for the ticker symbol 'MNO' in the received input feed. Finally, the third overall message in the output feed is the second update for the ticker symbol 'ABC', as indicated by '3 ABC 2'. Similar to the previous two examples, the '3' indicates it is the third overall message in the output feed 1324, the 'ABC' indicates the update is for ticker symbol 'ABC' and the '2' indicates it is the second update for the ticker symbol 'ABC' in the received input feed.

In some embodiments, a downstream device (such as a client device or a daisy-chained MDPD) receives the sequentially numbered messages of the output feed. The downstream device may detect a dropped message in the output feed by detecting a gap in the sequence numbers, which may either be a gap in the feed-level sequence numbers or the symbol-level sequence numbers. In embodiments where the output feed is an incremental output feed, if a message is dropped, the downstream device would not be able to determine an accurate order book for one or any of the ticker symbols until requesting and receiving the one or more missed updates using a gap-fill service, or perhaps receiving a reset to the "state of the world" in a late-join response or periodic snapshot; both comprising a current list of active orders.

For example, in an embodiment where an MDPD transmits the output feed 1620 of FIG. 16C, the downstream device may (in an example situation) only receive the messages '1 ABC' and '3 ABC', meaning the message '2 MNO' was dropped before being received by the downstream device. Thus, the downstream device would be unable to determine an up-to-date or accurate order book of any ticker symbol because it is not known which ticker symbol the second message updated. Thus, the downstream device is unable to apply the update message of '3 ABC' to the ABC order book without first receiving the message with a sequence number of '2' because the message with sequence number 2 could have applied to the ticker symbol 'ABC'. In such an embodiment, the downstream device may (buffer further received messages and) request (using a gap-fill request) that the MDPD retransmit the message with the sequence number '2'. And certainly other examples could be presented as well.

In another example, in an embodiment where an MDPD transmits the output feed 1624 of FIG. 16D, the downstream device may (in an example situation) only receive the messages '1 ABC 1' and '3 ABC 2' and not the message '2 MNO 1'. In such an embodiment, the downstream device is able to determine that it has not received the message with a message-based sequence number of '2', however it is still able to maintain an up-to-date order book for the ticker symbol 'ABC' because there is no gap in the symbol-level sequence number for 'ABC'. Order books other than the order book for the ticker symbol 'ABC' are considered to not be up-to-date, because the downstream client device is not able to determine which order book (ticker symbol) was modified by the message associated with the feed-level sequence number of '2'. The downstream device may request (using a gap-fill request) that the upstream device retransmit the message with the feed-level sequence number of '2'. And certainly other examples could be presented as well.

Figure 17:
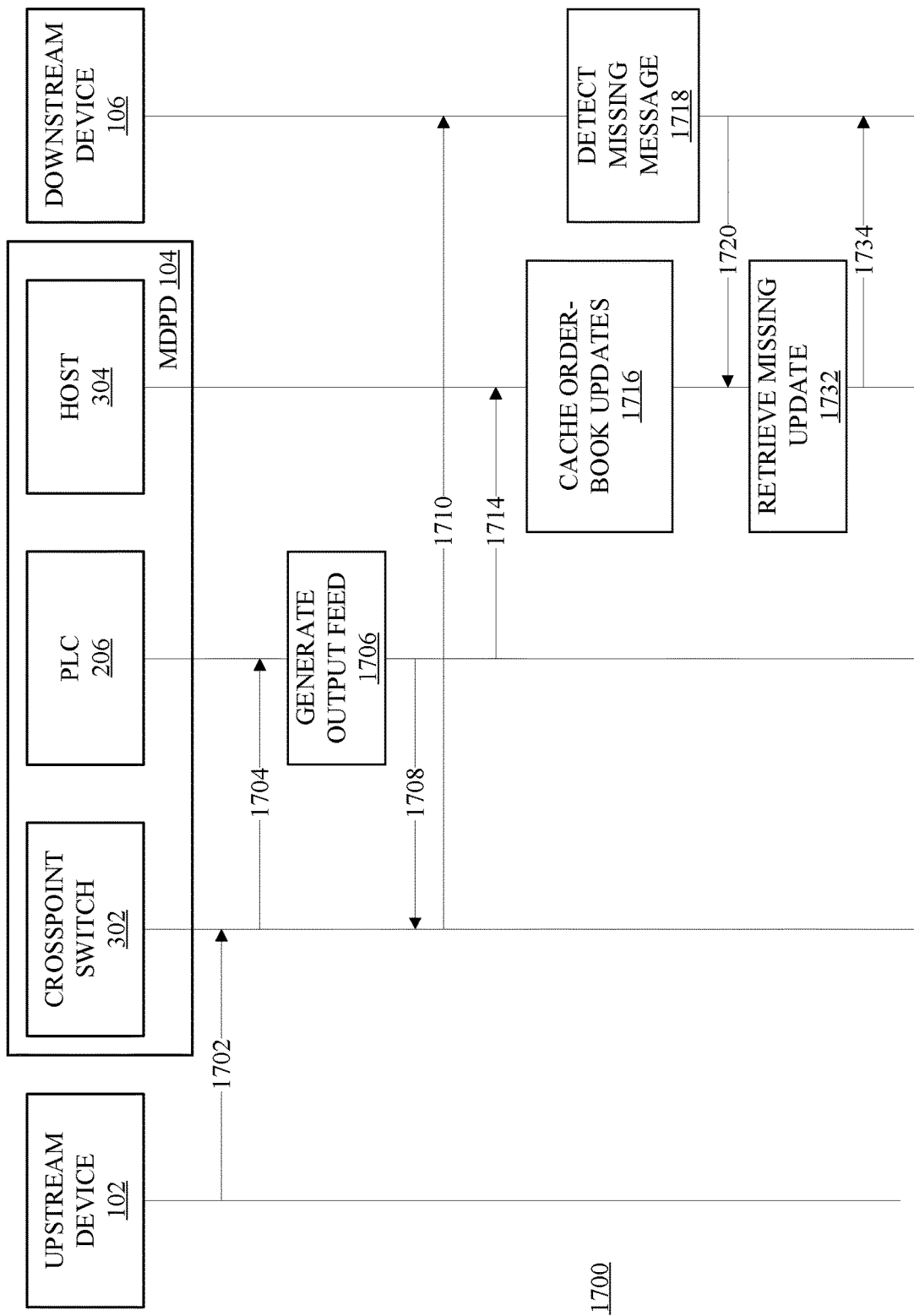
FIG. 17 depicts an example communication sequence, in accordance with at least one embodiment.

FIG. 17 depicts an example communication sequence, in accordance with at least one embodiment. The example communication sequence includes communications among (i) the upstream device 102, (ii) the MDPD 104 (having the crosspoint switch 302, the PLC 206, and the host 304), and (iii) the downstream device 106. The upstream device 102 provides an input feed (e.g., input feed 116) to the crosspoint switch 302 at 1702. The crosspoint switch 302 provides the input feed to the PLC 206 at 1704.

At 1706, the PLC 206 generates an output feed. The output feed (e.g., output feed 118) may be any number of types of output feeds. For example, the output feed generated at 1706 may be a customized market-data output feed as described herein. The output feed may be generated in accordance with an output-feed profile maintained at the MDPD 104, the output-feed profile identifying a subset of ticker symbols, a partitioning scheme, and/or an output-feed protocol. The messages in the output feed may be sequentially numbered. In some embodiments, the sequential numbers are feed-level sequence numbers, symbol-level sequence numbers, and/or partition-level sequence numbers. The PLC 206 may further translate the input feed from a first protocol into a second protocol when generating the output feed.

At 1708, the PLC 206 provides the output feed to the crosspoint switch 302. The crosspoint switch 302 is configured to forward the output feed to the downstream device 106 at 1710. Additionally, the PLC 206 provides an archival copy of the input feed to the host 304 at 1714. In some embodiments, the archival copy of the input feed is created by a digital-logic assembly line of the PLC 206 (e.g., the digital-logic assembly line 1432 of FIG. 14) and is transmitted via a communication path to the host 304 (e.g., via data connection 1450, and PCIe bus 346). At 1716, the host 304 caches the archival copy of the input feed (e.g., the order-book updates) in data storage, facilitating the ability of the MDPD 304 to provide late-join and/or gap-fill responses to the downstream device 106.

At 1718, the downstream device 106 detects a missing message in its received output feed. Detecting the missing message may be based on detecting a gap in the sequence numbers of the received output feed, whether that be a gap in the feed-level, symbol-level, or partition-level sequence numbers. At 1720, the downstream device 106 sends a gap-fill request to the MDPD 104, which may be received by the host 304 as indicated in FIG. 17, indicating the missing sequence numbers of the detected gap. As depicted in FIG. 17, the gap-fill request is sent to the host 304. The gap-fill request may be transmitted via the data network 352 and the NIC 340.

At 1732, the host 304 retrieves the missing updates identified by the downstream device 106 and, at 1734, provides the information in a gap-fill response to the downstream device 106. In some embodiments, retrieving the missing update comprises correlating the identified missing update's sequence number with an input-feed sequence number via a stored mapping. That is, in some embodiments, the host 304 maintains input-feed-to-output-feed mapping data in data storage that correlates between each cached order-book update (from the input feed) and a transmitted customized-market-data-output-feed message (i.e., the respective sequence number of that corresponding transmitted customized-market-data-output-feed message). The host 304 may correlate the missing sequence numbers identified by the downstream device to order-book updates in a cached archival copy of the input feed based on this input-feed-to-output-feed mapping data. An example of such input-feed-to-output-feed mapping data is depicted in—and described below in connection with—FIG. 18D. Indeed, the example data in FIGS. 18A-18D is used below in describing an example scenario.

FIG. 18A depicts a third example input feed, in accordance with at least one embodiment. In particular, FIG. 18A depicts an input feed 1850 that includes incremental order-book updates for a plurality of ticker symbols. In the input feed 1850, there are eleven order-book updates, each of which occupies a row in FIG. 18A. From left to right, each row includes for its corresponding order-book update, the following fields:

IF-SEQ. # (i.e., INPUT-FEED SEQUENCE NUMBER)
    the sequence number that the upstream device 102 (e.g., an exchange) has assigned to that order-book update, conveying the sequential position of that order-book update with respect to the input feed 1850 as a whole (i.e., it is a feed-level sequence number for the input feed 1850));

SYMBOL
    the ticker symbol to which that order-book update pertains;

TYPE
    an update type, which in this example indicates whether the update is an ADD-ORDER update, adding a new (active) order; a MODIFY-ORDER update, modifying an existing (active) order established in a prior ADD-ORDER update; or a CANCEL-ORDER update, cancelling—and therefore removing from consideration—an existing order established in a prior ADD-ORDER update;

ORDER #
    the order number that the upstream device 102 (e.g., an exchange) has assigned to the order to which that order-book update pertains;

DIRECTION
    an indication as to whether the order to which the update pertains is an order to BUY or SELL a quantity of e.g., shares;

QTY
    the quantity (e.g., of shares) specified in that order-book update; and

PRICE
    the price (in US dollars and on a per-share basis, in this example), specified in that order-book update.

It can be seen in FIG. 18A that the example input feed 1850 includes the following eleven example order-book updates in the following order:

IF-SEQ. #: 1
  SYMBOL: ABC
  TYPE: ADD-ORDER
  ORDER #: 7002
  DIRECTION: BUY
  QTY: 100
  PRICE: $7
IF-SEQ. #: 2
  SYMBOL: GHI
  TYPE: ADD-ORDER
  ORDER #: 7003
  DIRECTION: SELL
  QTY: 50
  PRICE: $9
IF-SEQ. #: 3
  SYMBOL: DEF
  TYPE: ADD-ORDER
  ORDER #: 7004
  DIRECTION: SELL
  QTY: 200
  PRICE: $8
IF-SEQ. #: 4
  SYMBOL: JKL
  TYPE: ADD-ORDER
  ORDER #: 7005
  DIRECTION: BUY
  QTY: 75
  PRICE: $8
IF-SEQ. #: 5
  SYMBOL: MNO
  TYPE: ADD-ORDER
  ORDER #: 7006
  DIRECTION: BUY
  QTY: 300
  PRICE: $7
IF-SEQ. #: 6
  SYMBOL: STU
  TYPE: ADD-ORDER
  ORDER #: 7007
  DIRECTION: BUY
  QTY: 100
  PRICE: $6
IF-SEQ. #: 7
  SYMBOL: ABC
  TYPE: ADD-ORDER
  ORDER #: 7008
  DIRECTION: SELL
  QTY: 50
  PRICE: $9
IF-SEQ. #: 8
  SYMBOL: STU
  TYPE: MODIFY-ORDER
  ORDER #: 7007
  DIRECTION: BUY
  QTY: 50
  PRICE: $6
IF-SEQ. #: 9
  SYMBOL: GHI
  TYPE: ADD-ORDER
  ORDER #: 7009
  DIRECTION: SELL
  QTY: 100
  PRICE: $6
IF-SEQ. #: 10
  SYMBOL: ABC
  TYPE: MODIFY-ORDER
  ORDER #: 7002
  DIRECTION: BUY
  QTY: 50
  PRICE: $5
IF-SEQ. #: 11
  SYMBOL: ABC
  TYPE: CANCEL-ORDER
  ORDER #: 7008
  DIRECTION: not required and not present
  QTY: not required and not present
  PRICE: not required and not present FIG. 18B depicts a third example output feed, in accordance with at least one embodiment. In particular, FIG. 18B depicts an output feed 1852 that is generated by filtering the input feed 1850 of FIG. 18A down to the ticker symbols 'ABC' and 'MNO', per an output-feed profile identifying a ticker symbol subset of {ABC, MNO}. As can be seen in FIG. 18B, each row in the example output feed 1852 (i) corresponds to an order-book update that was kept from the input feed 1850 and (ii) from left to right, for its corresponding order-book update, includes the following fields:

OF-SEQ. # (i.e., OUTPUT-FEED SEQUENCE NUMBER)
  the sequence number that the MDPD 104 has assigned to that order-book update in the output feed 1852, conveying the sequential position of that order-book update with respect to the output feed 1852 as a whole (i.e., it is a feed-level sequence number for the output feed 1852));
SYMBOL (copied (or otherwise preserved) from the corresponding input-feed order-book update)
  the ticker symbol to which that order-book update pertains;
SYM SEQ. #
  the symbol-level sequence number that the MDPD 104 has assigned to that order-book update in the output feed 1852, conveying the sequential position of that order-book update with respect to the order-book updates that (i) were received by the MDPD 104 in the input feed 1850 and (ii) pertain to the particular ticker symbol to which that order-book update pertains;
TYPE (copied (or otherwise preserved) from the corresponding input-feed order-book update)
  an update type, which in this example indicates whether the update is an ADD-ORDER update, a MODIFY-ORDER update, or a CANCEL-ORDER update;
ORDER # (copied (or otherwise preserved) from the corresponding input-feed order-book update)
  the order number that the upstream device 102 (e.g., an exchange) has assigned to the order to which that order-book update pertains;
DIRECTION (copied (or otherwise preserved) from the corresponding input-feed order-book update)
  whether the order to which the update pertains is a BUY order or a SELL order;
QTY
  (copied (or otherwise preserved) from the corresponding input-feed order-book update)
  the quantity (e.g., of shares) specified in that order-book update; and
PRICE (copied (or otherwise preserved) from the corresponding input-feed order-book update)

the price (in US dollars and on a per-share basis, in this example), specified in that order-book update.

In the example that is depicted in FIGS. 18A and 18B, the output feed 1852 is a filtered version of the input feed 1850, albeit an annotated filtered version in that output-feed feed-level and symbol-level sequence numbers have been added to the order-book updates that survived the filtration. In various different embodiments, a customized output feed could be any one or any combination of two or more of a filtered version of the input feed 1850, a partitioned version of the input feed 1850, and a protocol-translated version of the input feed 1850.

It can be seen in FIG. 18B that the example output feed 1852 includes the following five order-book updates in the following order:

OF-SEQ. #: 1
  SYMBOL: ABC
  SYM SEQ. #: 1
  TYPE: ADD-ORDER
  ORDER #: 7002
  DIRECTION: BUY
  QTY: 100
  PRICE: $7
OF-SEQ. #: 2
  SYMBOL: MNO
  SYM SEQ. #: 1
  TYPE: ADD-ORDER
  ORDER #: 7006
  DIRECTION: BUY
  QTY: 300
  PRICE: $7
OF-SEQ. #: 3
  SYMBOL: ABC
  SYM SEQ. #: 2
  TYPE: ADD-ORDER
  ORDER #: 7008
  DIRECTION: SELL
  QTY: 50
  PRICE: $9
OF-SEQ. #: 4
  SYMBOL: ABC
  SYM SEQ. #: 3
  TYPE: MODIFY-ORDER
  ORDER #: 7002
  DIRECTION: BUY
  QTY: 50
  PRICE: $5
OF-SEQ. #: 5
  SYMBOL: ABC
  SYM SEQ. #: 4
  TYPE: CANCEL-ORDER
  ORDER #: 7008
  DIRECTION: not required and not present
  QTY: not required and not present
  PRICE: not required and not present In the output feed 1852, the order-book update with the feed-level sequence number of '1' also has a symbol-level sequence number of '1' because it is the first order-book update to the ticker symbol 'ABC' in the input feed 1850. For short, that order-book update is referred to here as "1 ABC 1" (i.e., the syntax for that shorthand is "[feed-level sequence number] [ticker symbol] [symbol-level sequence number]"), and similar shorthand is used at various points in this disclosure for order-book updates in customized market-data output feeds that have both a feed-level and a symbol-level sequence number. It can further be seen, then, that output-feed order-book update '2 MNO 1' is the second-overall update in the output feed 1852 and the first pertaining to the ticker symbol 'MNO' received in the input feed 1850. The output-feed order-book update '3 ABC 2' is third overall and the second pertaining to 'ABC'. The output-feed order-book update '4 ABC 3' is the fourth overall and the third pertaining to 'ABC', and further is a MODIFY-ORDER update to the order bearing the order number 7002 (updating both the (i) quantity from 100 shares to 50 shares and (ii) the bidding price from $7 per share to $5 per share). And the output-feed order-book update '5 ABC 4' is the fifth overall and the fourth pertaining to 'ABC', and further is a CANCEL-ORDER update to the order bearing the order number 7008 (therefore removing the order 7008 from consideration).

FIG. 18C includes a plurality of example views of an example active order list that is based on the third example output feed of FIG. 18B, in accordance with at least one embodiment. In particular, FIG. 18C depicts example active order list views 1862, 1864, 1866, and 1868 of an example active order list 1860. The active order list 1860 is associated with the ticker symbol 'ABC', and the active order list views 1862, 1864, 1866, and 1868 respectively show the state of the active order list 1860 following the receipt of the order-book updates that correspond to the first, third, fourth, and fifth rows of the output feed 1852 of FIG. 18B. It is noted that the active order list views 1862, 1864, 1866, and 1868 could represent the state of an 'ABC' active order list being maintained by a consumer—such as the downstream device 106—of the output feed 1852, or it could represent the state of an 'ABC' active order list being maintained by the generator—i.e., the MDPD 104—of the output feed 1852, such that that generator would be ready if necessary to provide a snapshot (i.e. a current list of active orders) (e.g., in a late-join response or periodically provided snapshot, among other possibilities) for the ticker symbol 'ABC'. And certainly other examples could be described here as well.

Getting now further into the details of FIG. 18C, the active order list view 1862 is a first view of the active order list 1860 after applying—to what in this example is an initially empty list 1860 (not shown)—the '1 ABC 1' order-book update of the output feed 1852, which announced the existence of ORDER #7002 to BUY 100 shares of 'ABC' at $7 per share. As can be seen in the active order list view 1862, that update causes an entry to the list of active orders with an order number of 7002, a direction of BUY, a quantity of 100 shares, and a price of $7 per share.

Next, the active order list view 1864 shows the active order list 1860 after applying—to the active order list view 1862—the '3 ABC 2' order-book update of the output feed 1852, which announced the existence of ORDER #7008 to SELL 50 shares of 'ABC' at $9 per share. As can be seen in the active order list view 1864, that update causes a new entry in the list of active orders 1860 with an order number of 7008, a direction of SELL, a quantity of 50 shares, and a price of $9 per share.

Next, the active order list view 1866 shows the active order list 1860 after applying—to the active order list view 1864—the '4 ABC 3' order-book update of the output feed 1852, which modified ORDER #7002 to be a BUY order for 50 (rather than 100) shares of 'ABC' at a bidding price of $5 (rather than $7) per share. As can be seen in the active order list view 1866, that order-book update updates the entry in the active order list for ORDER #7002 to show the new quantity of 50 shares at the new price of $5.

Lastly with respect to FIG. 18C, the active order list view 1868 shows the active order list 1860 after applying—to the active order list view 1866—the '5 ABC 4' order-book update of the output feed 1852, which cancelled the ORDER #7008. As can be seen in the active order list view 1868, that order-book update has the effect of removing the ORDER #7008 from the list of active orders.

As mentioned above, in at least one embodiment, to be able to provide gap-fill requests, the MDPD 104 maintains (e.g., in the data storage 108 of the host 304) input-feed-to-output-feed mapping data that correlates cached copies of order-book updates from the input feed with (e.g., sequence numbers of) corresponding market-data-output-feed messages in the market-data output feed. In an embodiment, whatever sequence numbers (feed-level, symbol-level, and/or partition-level) are included in transmitted market-data output-feed messages are also incorporated into the input-feed-to-output-feed mapping data so that the MDPD 104 can be responsive to gap-fill requests that are keyed to any of such sequence numbers (i.e., gap-fill requests in which the order-book updates that are being requested are specified in terms of any of such sequence numbers). An example of input-feed-to-output-feed mapping data is discussed below.

FIG. 18D depicts example input-feed-to-output-feed mapping data correlating the order-book updates of the third example input feed of FIG. 18A with the order-book updates of the third example output feed of FIG. 18B, in accordance with at least one embodiment. In particular, FIG. 18D depicts a table 1874 that includes input-feed-to-output-feed mapping data between (i) input-feed (feed-level) sequence numbers of order-book updates from the input feed 1850 on the left side of the table 1874 and (ii) output-feed (feed-level and symbol-level) sequence numbers of corresponding order-book updates from the output feed 1852 on the right side of the table 1874. Also listed on the right side of the table 1874 are the ticker symbols of those updates.

The same five output-feed order-book updates that are depicted in the output feed 1852 of FIG. 18B are mapped in the table 1874. Using the shorthand introduced above, the first mapping (i.e., the first row of the table 1874) is between (i) the order-book update that bore the input-feed sequence number (IF-SEQ. #) '1' in the input feed 1850 and (ii) the order-book update '1 ABC 1' from the output feed 1852. The second mapping is between (i) the order-book update that bore the IF-SEQ. #'5' in the input feed 1850 and (ii) the order-book update '2 MNO 1' from the output feed 1852. The third mapping is between (i) the order-book update that bore the IF-SEQ. #'7' in the input feed 1850 and (ii) the order-book update '3 ABC 2' from the output feed 1852. The fourth mapping is between (i) the order-book update that bore the IF-SEQ. #'10' in the input feed 1850 and (ii) the order-book update '4 ABC 3' from the output feed 1852. The fifth and final mapping is between (i) the order-book update that bore the IF-SEQ. #'11' in the input feed 1850 and (ii) the order-book update '5 ABC 4' from the output feed 1852.

It is noted that FIG. 18D contains the type of input-feed-to-output-feed mapping data that might be used by the MDPD 104 in fulfilling one or more gap-fill requests, as described herein. If the MDPD 104 archived a copy of the input feed 1852 and received gap-fill requests keyed to the '3 ABC 2'-type notation of the output feed 1852, the MDPD 104 could then use a table such as the table 1874 to determine, for example, that '3 ABC 2' in the output feed 1852 corresponds to IF-SEQ. #'7' in an archived copy of the input feed 1852, and accordingly retrieve the archived copy of that order-book update and transmit the same to the requesting party as a replacement copy of '3 ABC 2' from the output feed 1852. And certainly other similar examples could be described.

It is noted that the table 1874 of FIG. 18D depicts one set of input-feed-to-output-feed mapping data for one ticker symbol in one example output feed (i.e., the output feed 1852). This is for clarity of presentation and not by way of limitation. In embodiments with multiple different output feeds, the input-feed-to-output-feed mapping data may take on an expanded form that further includes mappings of input-feed sequence numbers to the output-feed sequence numbers and perhaps also the symbol-level sequence numbers of the respective order-book updates in each of the multiple output feeds. This could be modeled as a separate table—each similar to the table 1874—for each symbol in each output feed. Another way to model this would be as an expanded version of the table 1874 wherein, for example, the first row shows that the same input-feed order-book update (i.e., the input-feed order-book update having the IF-SEQ. #'1' in the input feed 1850) could map to both (i) '1 ABC 1' in the output feed 1852 (as shown in FIG. 18D) and (ii) an example order-book update such as '3 ABC 1' in another example output feed (not shown). It is noted that the first order-book update pertaining to 'ABC' is '[x] ABC 1' in both example output feeds, though this example presupposes that multiple order-book updates preceded this example one in the input feed 1850 (and also matched the filtering criteria of the additional example output feed). And certainly numerous other similar examples could be described as well.

Directing the reader's attention now briefly to FIG. 17 and FIGS. 18A-18D collectively, described just below is an example scenario that refers to both the example sequence diagram 1700 of FIG. 17 and the example data that is depicted and described herein in connection with FIGS. 18A-18D. In the below-described example scenario, the MDPD 104 (i) receives the input feed 1850 from the upstream device 102, (ii) provides the customized output feed 1852 to the downstream device 106, (iii) receives a gap-fill request for missing updates from the downstream device 106; and (iv) provides a gap-fill response containing the requested missing updates to the downstream device 106.

In this example scenario, the upstream device 102 provides the input feed 1850 to the MDPD 104 (at 1702). As discussed above, in at least one embodiment, the input feed 1850 includes a plurality of incremental order-book updates to a plurality of ticker symbols. The PLC 206 generates the output feed 1852 (at 1706) for the downstream device 106. The PLC 206 may generate any number of customized output feeds for any number of downstream devices, but for clarity, only a single output feed is discussed here. In this example, the output feed 1852 is provided to the downstream device 106 by way of the crosspoint switch 302 (at 1708 and 1710).

The PLC 206 also provides the order-book-updates to the host 304 for caching an archival copy of the input feed 1850 (at 1714 and 1716). In at least one embodiment, only those order-book updates that are associated with the ticker symbols 'ABC' and 'MNO' are cached because those are the only symbols in the example filtered output feed 1852. In other embodiments, all order-book updates from the input feed 1850 are cached. And certainly other example subsets of the input feed 1850 could be cached in other embodiments.

The archival copy of the input feed 1850 that is cached by the host 304 may take any number of formats. For example, the host 304 may cache the input-feed order-book updates, maintaining the input-feed sequence numbers to identify each update. The host 304 may further determine a feed-level, a symbol-level, and/or a partition-level sequence number of the updates in each output feed, and map these output-feed sequence numbers to sequence numbers from the input feed 1850, perhaps in a table such as the table 1874. Some options for how the host 304 identifies those output-feed sequence numbers are described below.

In at least one embodiment, the host 304 maintains an updated list of active orders, such as those depicted in the views 1862-1868 of FIG. 18C, for each ticker symbol in the output feed. These current local lists of active orders may be used to fulfill late-join requests and/or to provide periodic (or occasional, interrupt-based, and/or the like) snapshots. In some embodiments, the host 304 caches both a plurality of the most recent order-book updates and maintains a current (i.e., updated) local list of active orders for every ticker symbol in the input feed 1850; in other embodiments, the host 304 does so for just those ticker symbols that are included in at least one output feed. Other example implementations could be listed here as well.

Returning to the example scenario, the downstream device 106 receives the messages of the output feed 1852. In some embodiments, the output feed 1852 is provided to the downstream device 106 as a series of UDP packets, with each packet comprising an order-book update message for a ticker symbol. The downstream device 106 receives each of the messages of the output feed 1852 and is thus able to maintain an up-to-date order book based on receiving and applying the incremental messages. The downstream device 106 is further able to determine whether a message in the output feed 1874 is missing based on detecting a gap in the sequence numbers (at 1718).

In an example, the downstream device 106 receives the output feed 1852 and receives the messages associated with "1 ABC 1", 2 MNO 1", and "4 ABC 3". The downstream device 106 detects a missing message (at 1718) based on the gap in the feed-level sequence number, here the message with the feed-level sequence number of "3". Alternatively, the downstream device 106 may also detect a missing message based on the gap in symbol-level sequence numbers, here the message for the second update to 'ABC'. The downstream device 106 requests (at 1720), from the MDPD 104, a retransmission of the message associated with the feed-level sequence number of "3", or alternatively of the message associated with the symbol-level sequence number of '2' for the ticker symbol 'ABC'. In some embodiments, the downstream device 106 specifies both the feed-level and symbol-level sequence number (and the associated ticker symbol) of the missing update by requesting '3 ABC 2'. And other examples could be listed here as well.

In some embodiments, the host 304 correlates the identified (i.e., requested) missing update message with the cached archival copy of the input feed. Using the table 1874, the host 304 correlates the sequence number from the request (e.g., '3 ABC 2') to the order-book update with an input-feed sequence number of '7', which corresponds to the order number '7008'. The host 304 retrieves the portion of the cached archival copy of the input feed corresponding to the missing message(s) and provides the associated update(s) to the downstream device 106.

In some embodiments, the MDPD 104 determines whether to provide a late-join response or a gap-fill response to the downstream device 106 based on a quantity of order-book updates messages identified as missing by the downstream device 106. The MDPD 104 may determine to provide a gap-fill response if the number of missing messages is low (e.g., less than or equal to a particular threshold), or provide a late-join response if the number of missing messages is high (e.g., greater than the particular threshold). In some embodiments, the MDPD 104 provides a late-join response if the requested individual updates are no longer cached by the host 304. And certainly other example implementations could be listed here as well.

It is described above that, in some embodiments, the MDPD 104 maintains input-feed-to-output-feed mapping data—such as the table 1874 of FIG. 18D—that correlates (feed-level) input-feed sequence numbers of input-feed order-book updates with (feed-level and perhaps also symbol-level) output-feed sequence numbers of output-feed order-book updates. In some embodiments, it is the host 304 that is the subpart of the MDPD 104 that maintains such mapping data. As the reader will recall, in some embodiments, the PLC 206 is the subpart of the MDPD 104 that (i) selects which input-feed order-book updates to include in a given output feed as output-feed order-book updates, (ii) assigns feed-level and perhaps also symbol-level output-feed sequence numbers to those output-feed order-book updates, and (iii) inserts those one or more assigned sequence numbers into those output-feed order-book updates prior to transmitting those output-feed order-book updates to a downstream entity.

Thus, in such embodiments, for the host 304 to be able to maintain accurate input-feed-to-output-feed mapping data for a given output feed, the host 304 either has to (i) independently generate the same output-feed sequence number(s) that the PLC 206 is assigning and inserting into output-feed order-book updates or (ii) receive from the host 304, perhaps via the PCIe bus 346, either (a) the assigned sequence number(s) themselves or (b) information that is sufficient for the host 304 to derive the output-feed sequence number(s)—such information is referred to herein as "sequence-number-record data". All three of these mapping-data-generation options are contemplated as embodiments, and are described in turn below. In those descriptions and elsewhere in this disclosure, the phrase "output-feed sequence numbers" is to be interpreted as "one or more output-feed sequence numbers, which could be feed-level, symbol-level, and/or partition-level sequence numbers for respective output-feed order-book updates".

With respect to the first mapping-data-generation option—i.e., independent generation of the same output-feed sequence numbers by the PLC 206 and the host 304, it has been explained above that, in some embodiments, the PLC 206 maintains an operational copy of an output-feed profile for each output feed and the host 304 maintains a substantively equivalent management copy of that output-feed profile for that same output feed. Thus, in some embodiments, the PLC 206 applies the logic of the operational copy and the host 304 independently applies the (equivalent) logic of the management copy; as a result the output-feed sequence numbers generated by the PLC 206 match the output-feed sequence numbers generated by the host 304, and the host 304 is therefore properly prepared to respond to gap-fill requests from downstream devices that detected the corresponding gaps in the output feed sent to the downstream devices by the PLC 206.

With respect to the second mapping-data-generation option—i.e., the transmission by the PLC 206 to the host 304 of the actually assigned-and-inserted output-feed sequence numbers, the PLC 206 could carry out that function in a number of ways. In some embodiments, the PLC 206 sends reports to the host 304, where substantively those reports are essentially one or more rows of a table such as the table 1874 of FIG. 18D. In other embodiments, the PLC 206 annotates each input-feed order-book update (that is sent to the host 304 as an archival copy) with data indicative of which output-feed sequence numbers (and specifically for which output feeds) had been assigned by the PLC 206 to the corresponding input-feed order-book updates. Two example annotation-architecture options (i.e., configurations of the PLC 206) for annotating archival copies of input-feed order-book updates are further discussed following the below description of the third mapping-data-generation option.

With respect to the third mapping-data-generation option—i.e., the transmission by the PLC 206 to the host 304 of the above-mentioned sequence-number-record data, that data could similarly be transmitted by the PLC 206 to the host 304 in the form of reports (that are separate from the archival copies of input-feed order-book updates but include input-feed sequence numbers so as to disambiguate which input-feed order-book updates correspond with which portion of the sequence-number-record data) or in the form of annotations to the archival copies of the corresponding input-feed order-book updates (which would naturally already include their own respective input-feed sequence numbers).

Whether in a report or in an annotation, and using the example architecture shown in FIG. 14 by way of example, the sequence-number-record data for a given archival copy of a given input-feed order-book update could take the form of a 32-bit (i.e., four-byte) binary number in which, from left to right, each binary digit is set to a '1' if the corresponding digital-logic assembly line included that particular input-feed order-book update in the output feed being generated by that assembly line, or instead is set to a '0' if the corresponding digital-logic assembly line did not include that particular input-feed order-book update in the output feed being generated by that assembly line. The 32nd bit would be ignored in this example as it would not have a corresponding output feed; moreover, this approach is scalable to any number of digital-logic assembly lines and associated output feeds. In at least one embodiment, upon receipt of such sequence-number-record data for an archival copy of a given input-feed order-book update, the host 304 increments and stores appropriate counters for input-feed order-book updates that were included in one or more output feeds. And certainly other suitable implementations could be described here as well.

As mentioned above, what follows here is description of two example annotation-architecture configurations (for the PLC 206) for annotating archival copies of input-feed order-book updates. Each of the first and second example annotation-architecture configurations are described herein as being example configurations of the PLC 206. As a reminder, the PLC 206 could annotate the archival copies of the input-feed order-book updates in accordance with the second mapping-data-generation option—i.e., the annotations could include the actually assigned-and-inserted output-feed sequence numbers, or perhaps in accordance with the third mapping-data-generation option—i.e., the annotations could take an abbreviated form such as the above-described 32-bit-binary-number example of sequence-number-record data. And it is noted that other annotation options could be used as well.

As referenced above, two example annotation-architecture configurations—for the PLC 206—are described below in connection with FIG. 18E and FIG. 18F; by way of illustration and not limitation, both such descriptions use the above-described 32-bit-binary-number example of sequence-number-record data. Broadly speaking, both annotation-architecture configurations that are described herein involve whatever portion of the PLC 206 is making the decision to keep or discard a particular input-feed order-book update in connection with a particular output feed, indeed preserving that decision by either (i) annotating the corresponding input-feed order-book update directly (as is the case in the embodiment shown in—and described in connection with—FIG. 18E) or (ii) instructing the 32nd digital-logic assembly line 1432 to annotate the corresponding input-feed order-book update (as is the case in the embodiment shown in—and described in connection with—FIG. 18F).

Figure 18E:
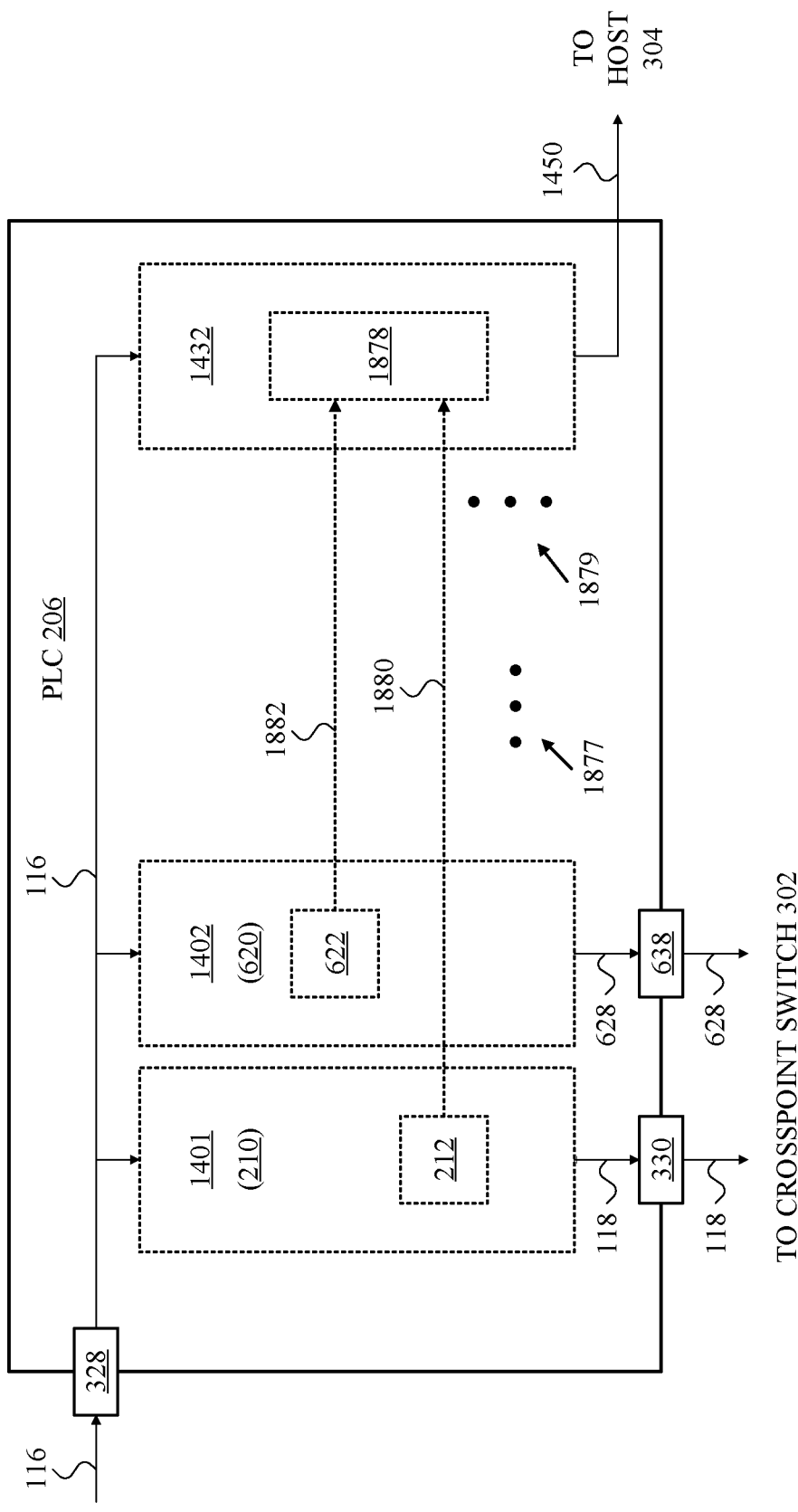
FIG. 18E depicts a first example annotation-architecture configuration of a PLC for an MDPD, in accordance with at least one embodiment.

FIG. 18E depicts a first example annotation-architecture configuration of a PLC for an MDPD, in accordance with at least one embodiment. In particular, FIG. 18E depicts a configuration 1876 of the PLC 206. In the configuration 1876, the PLC 206 is configured somewhat similarly to the configuration shown in FIG. 14, though in an abbreviated form. The digital-logic assembly lines 1403-1431 have been replaced by a horizontal ellipsis 1877. As can be seen in FIG. 18E, the PLC 206 still receives the input feed 116 via the PLC data port 328. And like the configuration of FIG. 14, the input feed 116 is delivered in parallel to each digital-logic assembly line 1401-1432 so that each digital-logic assembly line 1401-1432 can make an independent decision as to whether to keep or discard each order-book update in the input feed 116. Also like FIG. 14, the digital-logic assembly line 1401 delivers the output feed 118 (to the crosspoint switch 302) via the PLC data port 330, and the digital-logic assembly line 1402 delivers the output feed 628 (to the crosspoint switch 302) via the PLC data port 638. And like FIG. 14, in FIG. 18E, the digital-logic assembly line 1432 is arranged to deliver an archival copy of the input feed 116 to the host 304 via the data connection 1450.

Though there are similarities, some of which are noted above, between the configuration of the PLC 206 in FIG. 14 and the configuration 1876 of the PLC 206 in FIG. 18E, there are some differences as well. For example, unlike FIG. 14, FIG. 18E expressly shows the digital-logic segments 212 and 622 that implement the ticker-symbol subsets of the operational output-feed profiles 210 and 620, respectively, in a context in which the operational output-feed profiles 210 and 620 are implemented by the digital-logic assembly lines 1401 and 1402, respectively.

Also unlike FIG. 14, the digital-logic assembly line 1432 is depicted in FIG. 18E as including an annotation digital-logic segment 1878. In the depicted embodiment, the digital-logic segment 212 notifies the annotation digital-logic segment 1878 (via a connection 1880) of each 'keep' or 'discard' decision the digital-logic segment 212 makes with respect to an input-feed order-book update. The digital-logic segment 622 does the same via a connection 1882. Moreover, a vertical ellipsis 1879 in FIG. 18E represents that, in an embodiment, a similar respective connection (not depicted) exists from each digital-logic assembly line 1403-1431 (not depicted) to the annotation digital-logic segment 1878 for similar respective notifications, such that the annotation digital-logic segment 1878 has the information it needs to build the above-described 32-bit binary number for each respective archived copy of an input-feed order-book update.

For a given order-book update, each such notification (sent along the connection 1880, the connection 1882, or the like) could include (i) the corresponding input-feed sequence number and (ii)(a) a '1' (for 'kept', i.e., 'included that order-book update in the respective output feed') or (b) a '0' (for 'discarded', i.e., 'did not include that order-book update in the respective output feed'). In embodiments in which the PLC 206 is arranged such that there is synchronization as to which input-feed order-book update is being processed by all of the digital-logic assembly lines in a given time period, each such notification may simply take the form of a '1' (for 'kept') or a '0' (for 'discarded'). If needed, a suitable delay can be built into the digital-logic assembly line 1432 so as to give the other digital-logic assembly lines 1401-1431 a chance to notify the digital-logic assembly line 1432 prior to the annotation digital-logic segment 1878 copying the corresponding '1s' or '0s' into the corresponding places in the respective 32-bit binary annotation for the particular input-feed order-book update being processed. And certainly other example implementations could be described here as well.

Figure 18F:
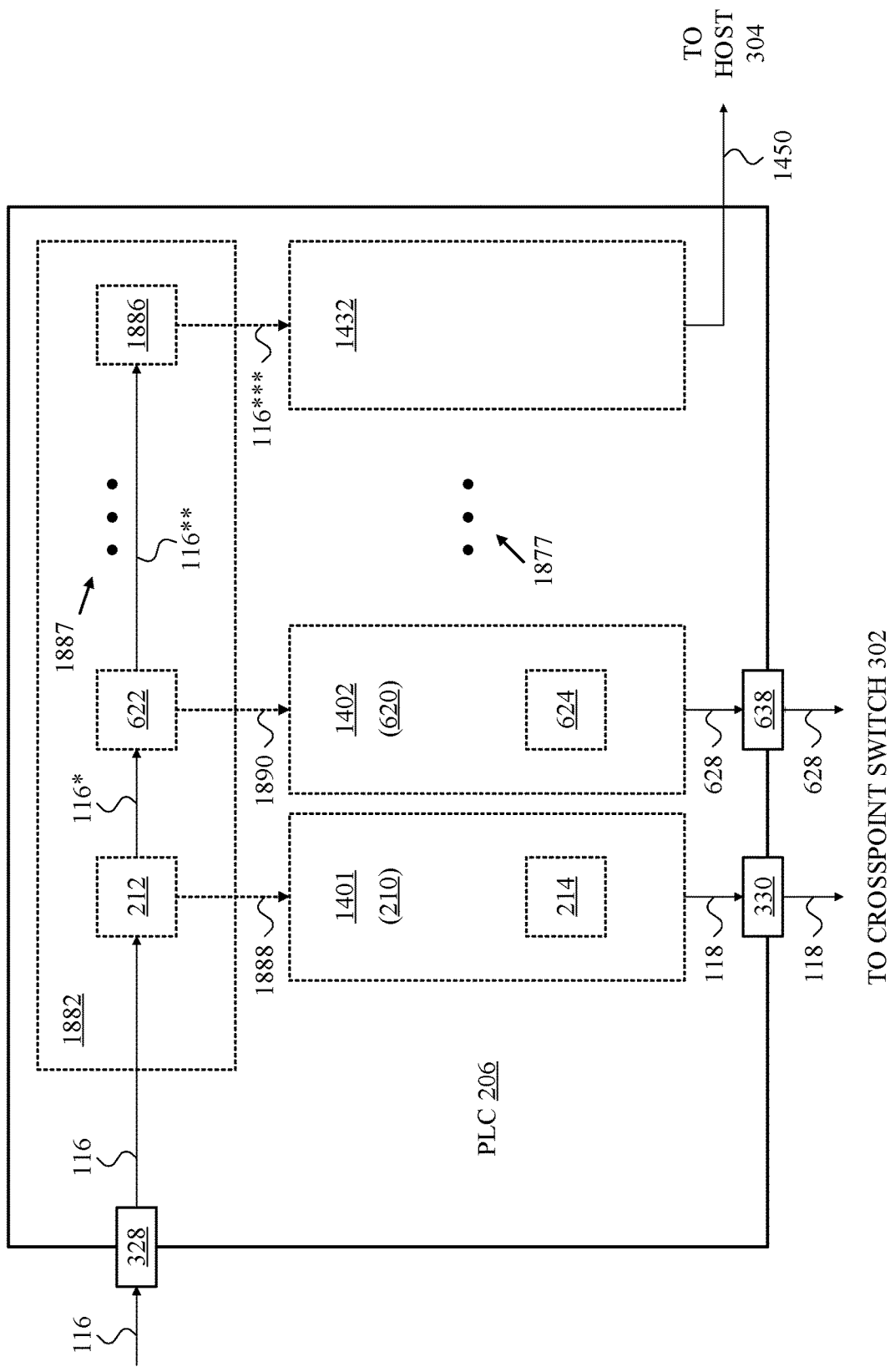
FIG. 18F depicts a second example annotation-architecture configuration of a PLC for an MDPD, in accordance with at least one embodiment.

FIG. 18F depicts a second example annotation-architecture configuration of a PLC for an MDPD, in accordance with at least one embodiment. In particular, FIG. 18F depicts a configuration 1884 of the PLC 206. The configuration 1884 of the PLC 206 that is depicted in FIG. 18F is similar in many ways to the configuration 1876 of the PLC 206 that is depicted in FIG. 18E, and thus it is on the differences that this description of FIG. 18F is focused. First, in the configuration 1884, the digital-logic assembly line 1432 does not include the annotation digital-logic segment 1878; accordingly, the connection 1880, the connection 1882, and the like are also not present in the configuration 1884.

Another difference is that, in the configuration 1884, the PLC 206 includes a master-controller digital-logic segment 1882, which itself includes the above-mentioned digital-logic segments 212 and 622, which have moved from being in the respective digital-logic assembly lines 1401 and 1402 in the configuration 1876 to being in the master-controller digital-logic segment 1882, and which respectively implement the ticker-symbol subsets of the operational output-feed profiles 210 and 620.

In the embodiment that is depicted in FIG. 18F, the digital-logic segment 212 (i) receives the input feed 116 from the PLC data port 328, (ii) outputs a filtered feed 1888 to the digital-logic assembly line 1401 of only those order-book updates from the input feed 116 that match the ticker-symbol subset implemented by the digital-logic segment 212, and (iii) outputs a once-annotated input-feed 116* in which the digital-logic segment 212 has marked each order-book update that it kept (i.e., that it included in the filtered feed 1888) with a '1' in a first place of the respective 32-bit binary sequence-number-record data for that order-book update. In this example embodiment, that 32-bit value is initialized to all '0s', so only kept updates necessitate updating a corresponding place value in the respective sequence-number-record data; clearly other implementations could be described here as well.

Similarly, the digital-logic segment 622 (i) receives the once-annotated input feed 116* from the digital-logic segment 212, (ii) outputs a filtered feed 1890 to the digital-logic assembly line 1402 of only those order-book updates from the once-annotated input feed 116* that match the ticker-symbol subset implemented by the digital-logic segment 622, and (iii) outputs a twice-annotated input-feed 116 in which the digital-logic segment 622 has (a) left alone any annotations made by the digital-logic segment 212 and (b) marked each order-book update that it kept (i.e., that it included in the filtered feed 1890**) with a '1' in a second place of the respective 32-bit binary sequence-number-record data for that order-book update.

For simplicity, the twice-annotated input-feed 116 is shown as being received by a digital-logic segment 1886, which in this depiction represents the combined functions of the digital-logic segments (not explicitly depicted) that are represented by the ellipsis 1887. As shown in FIG. 18F, the digital-logic segment 1886 outputs a fully-annotated input feed 116***, in which each order-book update includes a respective 32-bit binary sequence-number record having a '1' in each place that corresponds with a digital-logic segment that included that respective order-book update in that digital-logic segment's respective output feed. It is that fully-annotated input feed 116*** that traverses the digital-logic assembly line 1432 and the data connection 1450 on its way to being archived by the host 304 as described above. Lastly, it can be seen in FIG. 18F that the digital-logic assembly lines 1401 and 1402 respectively include the digital-logic segments 214 and 624, which as described above implement the ticker-symbol-based feed-partitioning schemes of the operational output-feed profiles 210 and 620**, respectively.

Examples of MDPD Architecture:

Division of Labor Between Line-Rate Processing Module and Host

In some embodiments, the MDPD 104 distributes certain functions to various different MDPD components based on relative processing speed of the various components. For example, in some embodiments, some functions are performed by certain components at 'line rate'. In such embodiments, 'line rate' means that the functions operate at, or near, the data transmission speed of the communications line or network. In other words, data is handled (e.g. processed) at the 'rate' that such data comes in on the 'line'. Example components that operate at line rate include pass-through communication ports, a PLC such as an FPGA, a crosspoint switch, and the like. One reason to allocate some functions to line-rate processing components or modules is to be able to process data without the need to buffer such data.

In various embodiments, other functions are carried out by modules, components, or other resources that operate slower than at line rate. For example, data may be transmitted across legacy communication busses or network interfaces having limited bandwidth. Data may also need to be processed and cached in a traditional memory or data storage, or the like. Example components that, in at least one embodiment, operate at slower-than-line-rate speeds include a host processor, host-processor data storage, communication busses, and/or the like. Described below are some example MDPD-architecture embodiments in accordance with which (i) one or more MDPD components operate at line rate and (ii) one or more MDPD components operate at slower than line rate.

Figure 19:
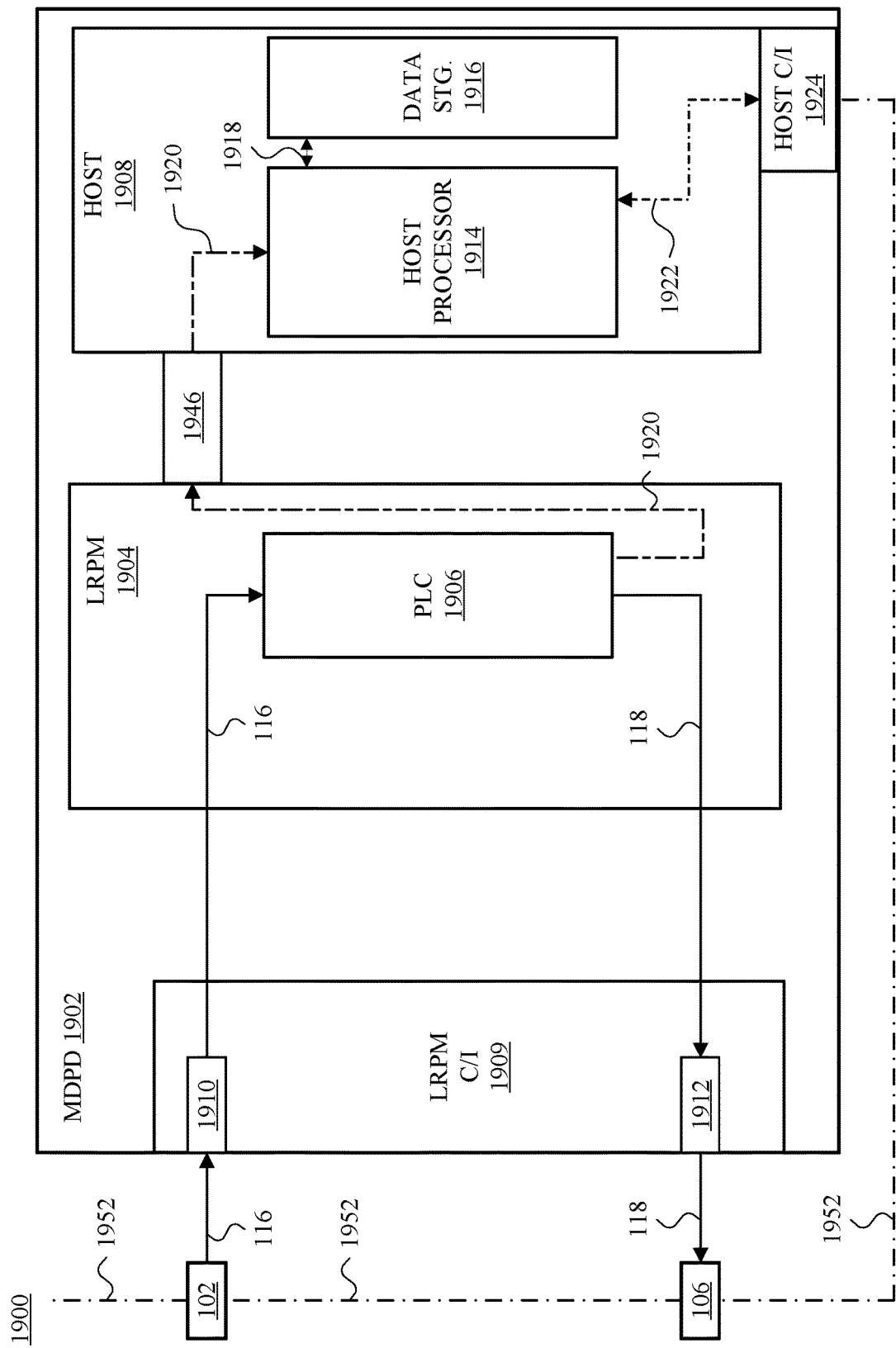
FIG. 19 is a first view of an example communication system that includes an upstream device, a second example MDPD, and an example downstream device, in accordance with at least one embodiment.

FIG. 19 is a first view of an example communication system that includes an upstream device, a second example MDPD, and an example downstream device, in accordance with at least one embodiment. In particular, FIG. 19 depicts a view 1900 that includes the upstream device 102, the downstream device 106, and an MDPD 1902, which receives the input feed 116 from the upstream device 102 and provides the output feed 118 to the downstream device 106, similar to the MDPD 104 of FIG. 1.

The MDPD 1902 comprises a line-rate processing module (LRPM) 1904 and a host 1908. The LRPM 1904 is communicatively coupled to an LRPM external-communication interface 1909. The LRPM external-communication interface 1909 includes (i) a first LRPM external-communication port 1910 that is configured to (a) receive the input feed 116 from the upstream device 102 and (b) pass the input feed 116 to the LRPM 1904 and (ii) a second LRPM external-communication interface port 1912 that is configured to (a) receive the output feed 118 from the LRPM 1904 and (b) transmit the output feed 118 to the downstream device 106.

Similar to the external data ports 202 and 204 of FIG. 2, the LRPM external-communication ports 1910 and 1912 may be of any suitable type of communication ports capable of managing the bandwidth of the input and output feeds. Example port types include SFP, SFP+, QSFP, and QSFP+ data ports, and/or the like. In at least one embodiment, the LRPM external-communication interface 1909 passes data between (i) external devices (such as the upstream and downstream devices 102 and 106, respectively) and (ii) the MDPD 1902, and also sends data to and receives data from the LRPM 1904, at line rate.

In at least one embodiment, the LRPM 1904 includes a PLC 1906 that is configured to (i) generate the output feed 118 based on the input feed 116 and (ii) transmit an archival copy 1920 of the input feed 116 to the host 1908 via a communication bus 1946. In some embodiments, the PLC 1906 generates the output feed 118 based at least in part on an output-feed profile that specifies output-feed parameters, such as a ticker-symbol subset to include in the output feed, a partitioning scheme, an output-feed protocol, and/or the like, as described herein.

In the embodiment that is depicted in FIG. 19, the host 1908 is communicatively coupled to (i) the LRPM 1904 via the communication bus 1946 and (ii) a host external-communication interface 1924. The host 1908 includes a host processor 1914 and host data storage 1916. The host 1908 may be similar to the host 304. The host processor 1914 receives the archival copy 1920 of the input feed 116 and caches it—via a communication link 1918—in host data storage 1916. The host processor 1914 is further configured to use the cached archival copy 1920 of the input feed 116 to provide, to the downstream device 106 via the host external-communication interface 1924, a gap-fill service (and perhaps also one or more other services including but not limited to a late-join service) for the output feed 118.

In at least one embodiment, the functions of the MDPD 1902 of FIG. 19 are similar to that of the MDPD 104. Like the MDPD 104, the MDPD 1902 receives the input feed 116 from the upstream device 102. The input feed 116 is passed through the first LRPM external-communication interface port 1910 to the PLC 1906 on the LRPM 1904. The PLC 1906, which may be or include an FPGA, processes the input feed 116 to generate the output feed 118. As discussed herein, the PLC 1906 may be configured to generate a filtered output feed, a partitioned output feed, an output feed translated into a particular protocol, and/or the like.

As described, in some embodiments, the PLC 1906 generates (i) the output feed 118 for transmission to the downstream device 106 and (ii) the archival copy 1920 of the input feed 116 for caching by the host 1908. The output feed 118 and the archival copy 1920 of the input feed 116 may be generated by operational digital-logic assembly lines, similar to that of the digital-logic assembly lines 1401-1432 of FIG. 14. In one example, the PLC 1906 is configured with a first digital-logic assembly line to produce the output feed 118 and a second digital-logic assembly line to produce the archival copy 1920 of the input feed 116. In the depicted embodiment, the archival copy 1920 of the input feed 116 is (i) transmitted from the PLC 1906 to the host processor 1914 via the communication bus 1946 and (ii) cached—via the communication link 1918—in the host data storage 1916.

In some embodiments, the archival copy 1920 of the input feed 116 is a filtered feed of market-data updates that includes any and all market-data updates that have been included in any of the output feeds generated by the PLC 1906. In one such example, using the input feed 1850 of FIG. 18A by way of illustration, the PLC 1906 generates two filtered output feeds. The first such output feed includes updates associated with the ticker symbol 'ABC' for a first downstream device, while the second such output feed includes updates associated with the ticker symbol 'JKL' for a second downstream device. In such an embodiment, the archival copy 1920 of the input feed 116 includes the updates associated with the set of ticker symbols {'ABC', 'JKL'}—i.e., the updates having the input-feed sequence numbers of '1', '4', '7', '10', and '11' from the input feed 1850. Other example implementations could be described as well.

In some embodiments, the PLC 1906 generates the archival copy 1920 of the input feed 116 such that the archival copy 1920 includes all updates from the input feed 116, regardless of whether the PLC 1906 is currently producing output feeds that collectively include updates to all of the ticker symbols. Thus, if a downstream device requests a modification to its associated output feed to further include updates to an added ticker symbol, the host processor 1914 is able to provide, e.g., a late-join response for that added ticker symbol based on the archival copy 1920 of the input feed 116 to that downstream device without the need for the MDPD 1902 to first request and receive updates associated with the added ticker symbol from the upstream device 102. And certainly other example implementations could be presented as well.

As described, in at least one embodiment, the host processor 1914 caches the archival copy 1920 of the input feed 116 in the host data storage 1916. In one embodiment, this involves storing the input-feed messages and a generating a mapping (e.g., the table 1874 of FIG. 18D) between the input-feed messages (e.g., input-feed sequence numbers) and output-feed messages (e.g., output-feed sequence numbers) for each generated output feed. In at least one embodiment, caching the archival copy 1920 of the input feed 116 involves (i) generating and maintaining a respective current local list of active orders for each of one or more ticker symbols in the input feed 116 and (ii) caching the generated current local list of active orders for one or more symbols in the host data storage 1916. The cached current local list of active orders for one or more symbols may be used to generate late-join responses for downstream devices.

In response to detecting that one or more messages are missing (e.g., detecting a gap in the output-feed sequence numbers) in the output feed 118, the downstream device 106 may request, via a data network 1952, a gap fill. In an embodiment, the data network 1952 is similar to the data network 352 that is depicted in, e.g., FIG. 3. The host 1908 of the MDPD 1902 is communicatively coupled with the data network 1952 by the host external-communication interface 1924, which in turn is communicatively coupled to the host processor 1914 via a communication link 1922.

In at least one embodiment in which the MDPD 1902 provides a gap-fill service, the downstream device 106 transmits a gap-fill request to the MDPD 1902 via the data network 1952. The host external-communication interface 1924 receives the gap-fill request and provides the received gap-fill request to the host processor 1914 via the communication link 1922. The gap-fill request may indicate the identity of the downstream device and the sequence number(s) of the missed message(s). The host processor 1914 retrieves portions of the archived input feed from the host data storage 1916 associated with the gap-fill request and generates a gap-fill response, which is then provided to the host external-communication interface 1924 via the communication link 1922 and then transmitted to the downstream device 106 via the data network 1952.

In some embodiments, the MDPD 1902 is similarly configured to provide a late-join service (e.g., provide an up-to-date copy of the list of active orders associated with a particular ticker symbol) to the downstream device 106 via the data network 1952. In particular, in some embodiments, the host processor 1914 is configured to maintain a current local list of active orders for each ticker symbol in the plurality of ticker symbols based on the archival copy 1920 of the input feed 116. The current local lists of active orders may be similar to the lists of active orders depicted in FIGS. 15A-B and/or FIG. 18C for each ticker symbol in the plurality of ticker symbols. Responsive to receiving, from the downstream device 106, a late-join request for a particular ticker symbol, the host processor 1914 may generate a late-join response from the current local list of active orders for the particular ticker symbol. The host processor 1914 transmits the late-join response via the host external-communication interface 1924 to the downstream device 106.

In some embodiments, the host processor 1914 receives a gap-fill request from the downstream device 106 and the host processor 1914 responsively provides a late-join response to the downstream device 106, the late-join response being generated similar to the above embodiment from the maintained current local lists of active orders. The host processor 1914 may determine that the gap-fill request represents a request for updates that are no longer cached in the host data-storage 1916 and/or that the number of updates requested by the gap-fill request exceeds a pre-determined limit of updates to include in gap-fill responses. Based on this determination, the host processor 1914 may determine to provide a late-join response for the particular ticker symbol instead of a gap-fill response. And certainly other examples could be listed here as well.

Figure 20:
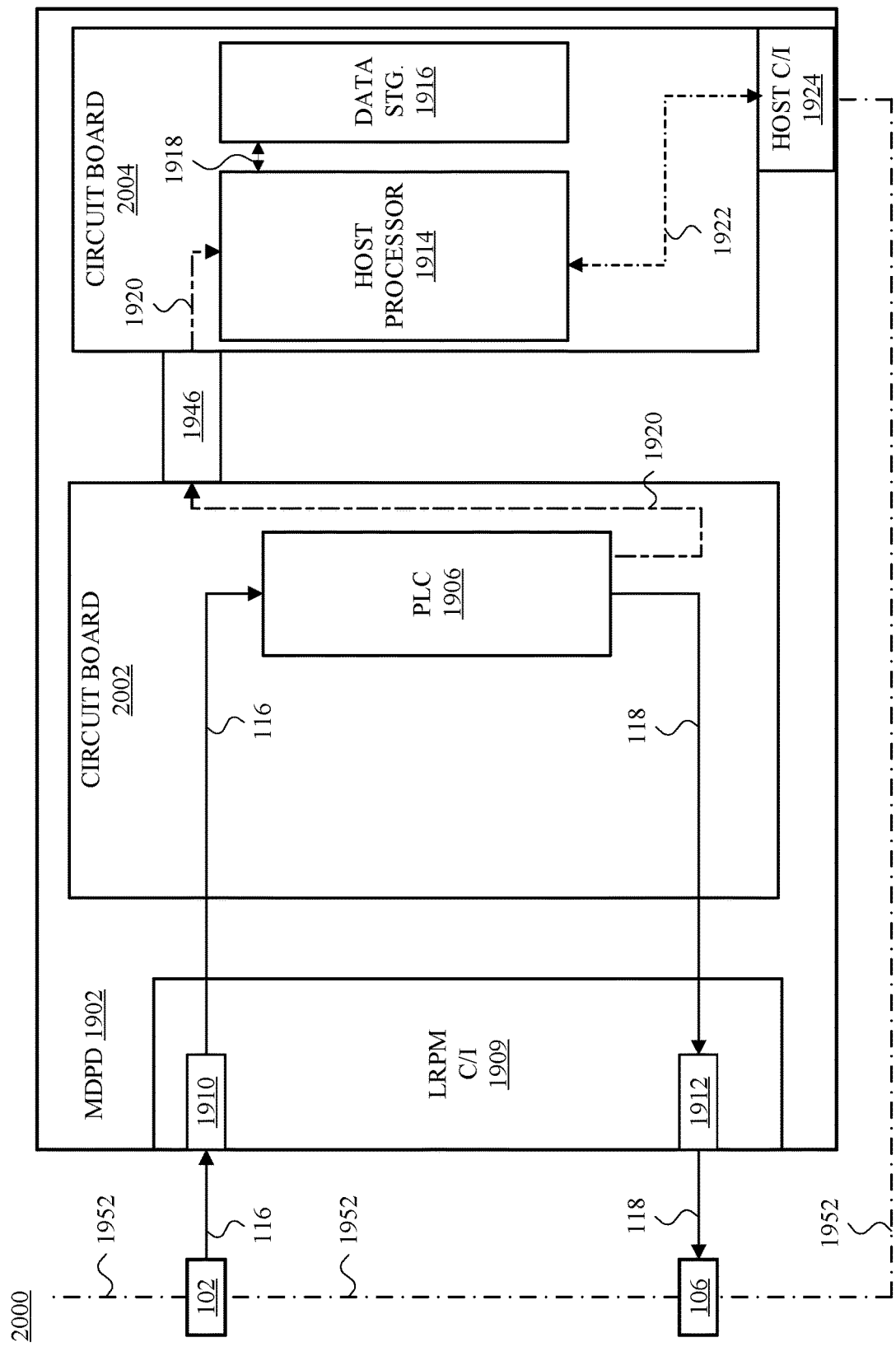
FIG. 20 is a second view of the example communication system of FIG. 19, in accordance with at least one embodiment.

FIG. 20 is a second view of the example communication system of FIG. 19, in accordance with at least one embodiment. In particular, FIG. 20 is a view 2000 that, like the view 1900 of FIG. 19, shows the upstream device 102, the MDPD 1902, and the downstream device 106, as well as the input feed 116 and the output feed 118. In FIG. 20, the LRPM 1904 and the host 1908 are not explicitly depicted. As depicted in the view 2000, the PLC 1906 resides on a first circuit board 2002, and the host processor 1914 resides on a second circuit board 2004. The first and second circuit boards 2002 and 2004, respectively, are communicatively connected via the communication bus 1946. In some embodiments, the communication bus 1946 includes a Peripheral Component Interconnect (PCI) Express (PCIe) bus, a PCI bus, an edge connector, a ribbon connector, or any other board-to-board interconnect capable of passing data signals.

In the view 2000, the PLC 1906, a line-rate processing component, receives the input feed 116 and transmits the generated output feed 118 from the first circuit board 2002. The PLC 1906 also provides, via the communication bus 1946 to the host processor 1914 on the second circuit board 2004, the archival copy 1920 of the input feed 116. Thus, the host processor 1914 is able to cache the archival copy 1920 of the input feed 116 at less than line-rate processing speed without delaying the transmission of the output feed 118, and is therefore further able to provide gap-fill and late-join services to downstream devices, as described herein.

Figure 21:
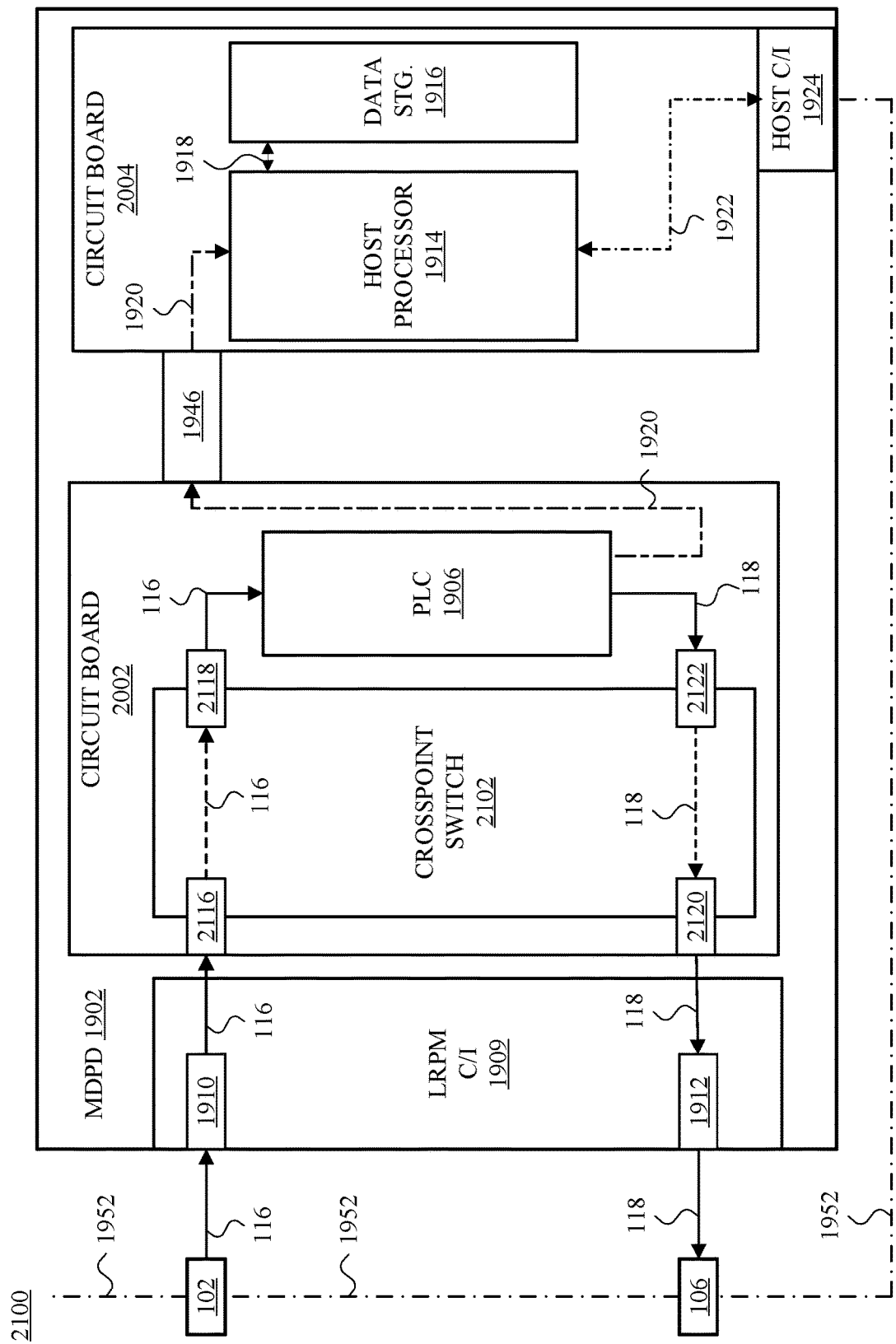
FIG. 21 is a third view of the example communication system of FIG. 19, in accordance with at least one embodiment.

FIG. 21 is a third view of the example communication system of FIG. 19, in accordance with at least one embodiment. In particular, FIG. 21 is a view 2100 that is similar to the view 1900 of FIG. 19 and the view 2000 of FIG. 20, and depicts the MDPD 1902 further comprising a crosspoint switch 2102 residing, along with the PLC 1906, on the first circuit board 2002. The crosspoint switch 2102, another line-rate processing component, includes the crosspoint data ports 2116, 2118, 2120, and 2122, which are similar to the crosspoint data ports 316, 318, 320, and 322 of FIG. 3. The crosspoint switch 2102 is configured to pass the input feed 116 from the first LRPM external-communication port 1910 to the PLC 1906.

As depicted in the view 2100, the crosspoint switch 2102 receives the input feed 116 on the crosspoint data port 2116 and passes it through to the crosspoint data port 2118. The crosspoint switch 2120 is further configured to pass the output feed 118 from the PLC 1906 to the second LRPM external-communication port 1912. As depicted in the view 2100, the crosspoint switch 2102 receives the output feed 118 on the crosspoint data port 2122 and passes it to the crosspoint data port 2120. The crosspoint switch 2102 may be similar to the crosspoint switch 702 depicted in FIG. 7. Similar to the crosspoint switch 702, the crosspoint switch 2102 may be configurable via a crosspoint control port. In some embodiments, the MDPD 1902 further includes a control path between the host processor 1914 and the crosspoint switch 2102 to provide configuration instructions.

Figure 22:
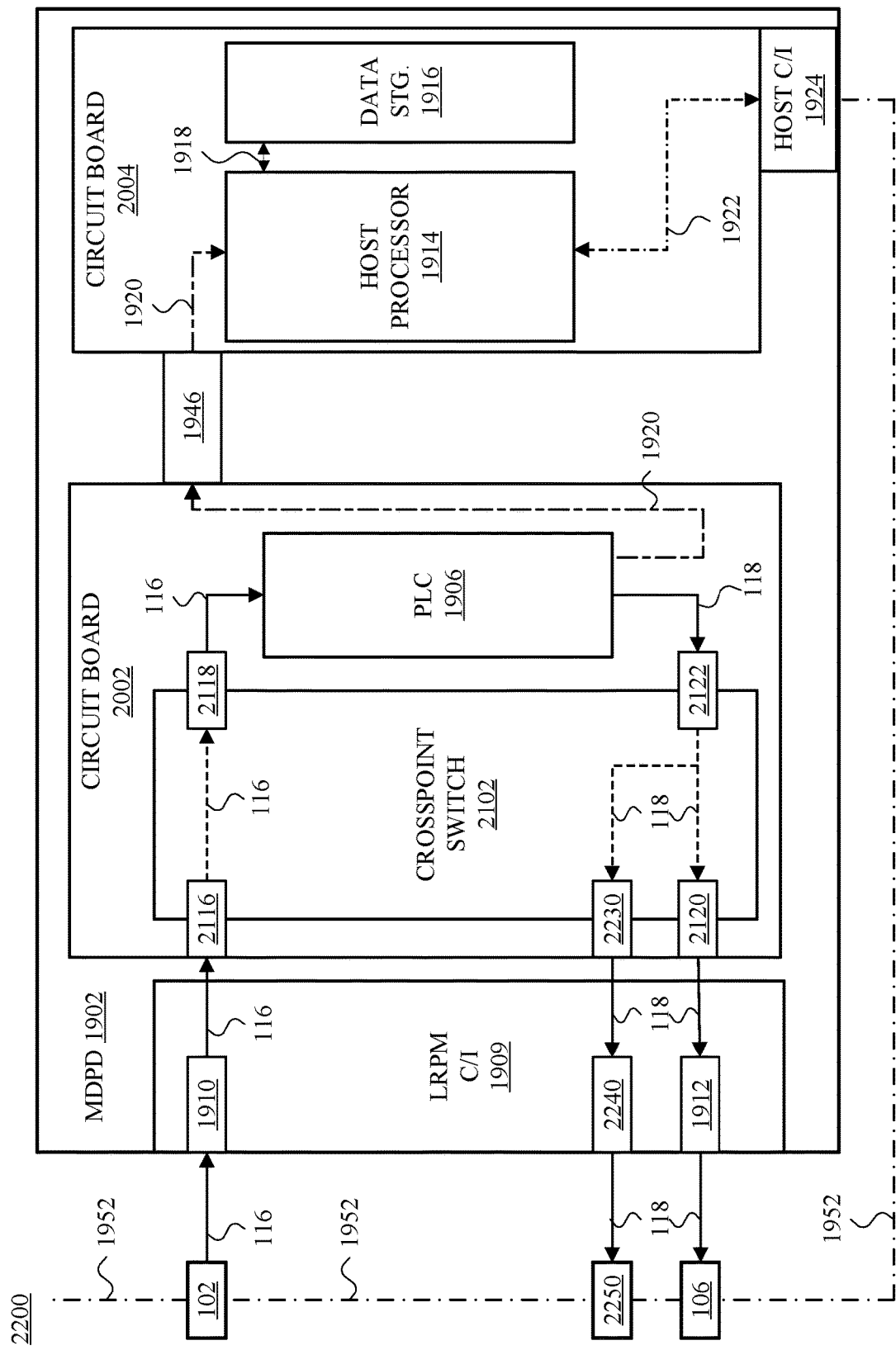
FIG. 22 is a fourth view of the example communication system of FIG. 19, in accordance with at least one embodiment.

FIG. 22 is a fourth view of the example communication system of FIG. 19, in accordance with at least one embodiment. In particular, FIG. 22 is a view 2200 that is similar to the view 2100 of FIG. 21, and depicts the crosspoint switch 2102 further including a crosspoint data port 2230. The LRPM external-communication interface 1909 further includes a third LRPM external-communication port 2240 that is communicatively connected to a second downstream device 2250.

In at least one embodiment, the crosspoint switch 2102 is further configured to generate a duplicate copy of the output feed 118 and pass the duplicate copy of the output feed 118 to the third LRPM external-communication port 2240 in parallel with passing the output feed 118 to the second LRPM external-communication port 1912. In at least one embodiment, the crosspoint switch 2102 is able to be internally dynamically mapped similar to the crosspoint switch 702 of FIG. 7. As depicted in the view 2200, the crosspoint switch 2102 duplicates the output feed 118 via a one-to-many connection from the crosspoint data port 2122 to both the crosspoint data ports 2120 and 2230. Thus, the LRPM external-communication ports 1912 and 2240 transmit the output feed 118 and the duplicate copy of the output feed 118 to the downstream device 106 and the downstream device 2250, respectively, in parallel (i.e., at substantially the same time).

Figure 23:
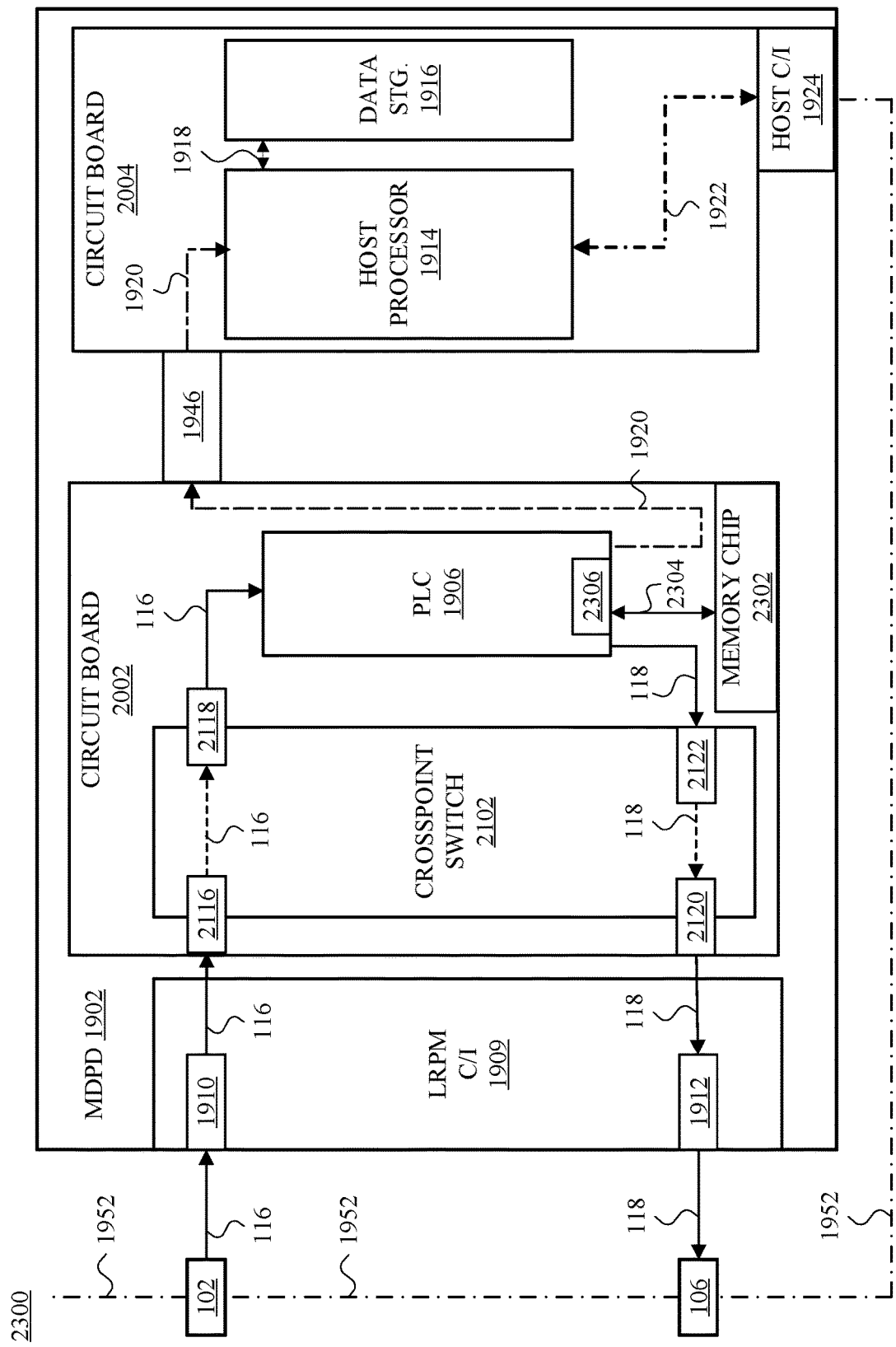
FIG. 23 is a fifth view of the example communication system of FIG. 19, in accordance with at least one embodiment.

FIG. 23 is a fifth view of the example communication system of FIG. 19, in accordance with at least one embodiment. In particular, FIG. 23 is a view 2300 that is similar to the view 2100 of FIG. 21, and further depicts a memory chip 2302 residing on the first circuit board 2002. The PLC 1906 is able to communicate with the memory chip 2302 via the communication link 2304 from the port 2306 on the PLC 1906. The memory chip 2302 and the port 2306 may be similar to the memory chip 502 and the port 506 of FIG. 5.

In some embodiments, the PLC 1906 is further configured to store respective associations on the memory chip 2302 between order numbers and ticker symbols from respective order-book updates received in the input feed 118. The PLC 1906 may further be configured to generate the output feed 118 by using the respective order numbers from respective later-received order-book updates in the input feed to retrieve the respective ticker symbols from the respective stored associations. The PLC 1906 may then insert the respective retrieved ticker symbols into corresponding messages in the output feed 118. In such an embodiment, the PLC 1906 may be able to retrieve the associations from the memory chip 2302 more timely than retrieving, say, stored associations from the host 1908 across the communication bus 1946 (in a hypothetical embodiment (not depicted) that is architected in such a way).

As one example of a way in which the PLC 1906 may store data on and retrieve data from the memory chip 2302, the MDPD 1902 may, at a first time, receive an order-book update that (i) is an add-order update, (ii) pertains to a given ticker symbol, and (iii) includes a given order number, and responsively operate the PLC 1906 to store an association in the memory chip 2302 between the given order number and the given ticker symbol. The MDPD 1902 may thereafter, at a second time, receive a subsequent order-book update that includes the given order number but does not include the given ticker symbol (e.g., a 'MODIFY-ORDER' update that includes the order number but not the associated ticker symbol), and responsively (i) operate the PLC 1906 to use the given order number from the subsequent order-book update to retrieve the given ticker symbol from the stored association in the memory chip 2302, (ii) generate, at the PLC 1906, a given output-feed message for the output feed that (a) pertains to the retrieved given ticker symbol and (b) conveys the subsequent order-book update, and (iii) transmit the given output-feed message from the MDPD 1902 to the downstream device 106. And certainly numerous other examples could be listed as well. In one such other example, the PLC 1906 is further configured to store the associations between ticker symbols and order numbers in a portion of the PLC 1906 that is configured as PLC-data storage, rather than storing the associations in the memory chip 2302. And other example architectures could be listed here as well.

Figure 24:
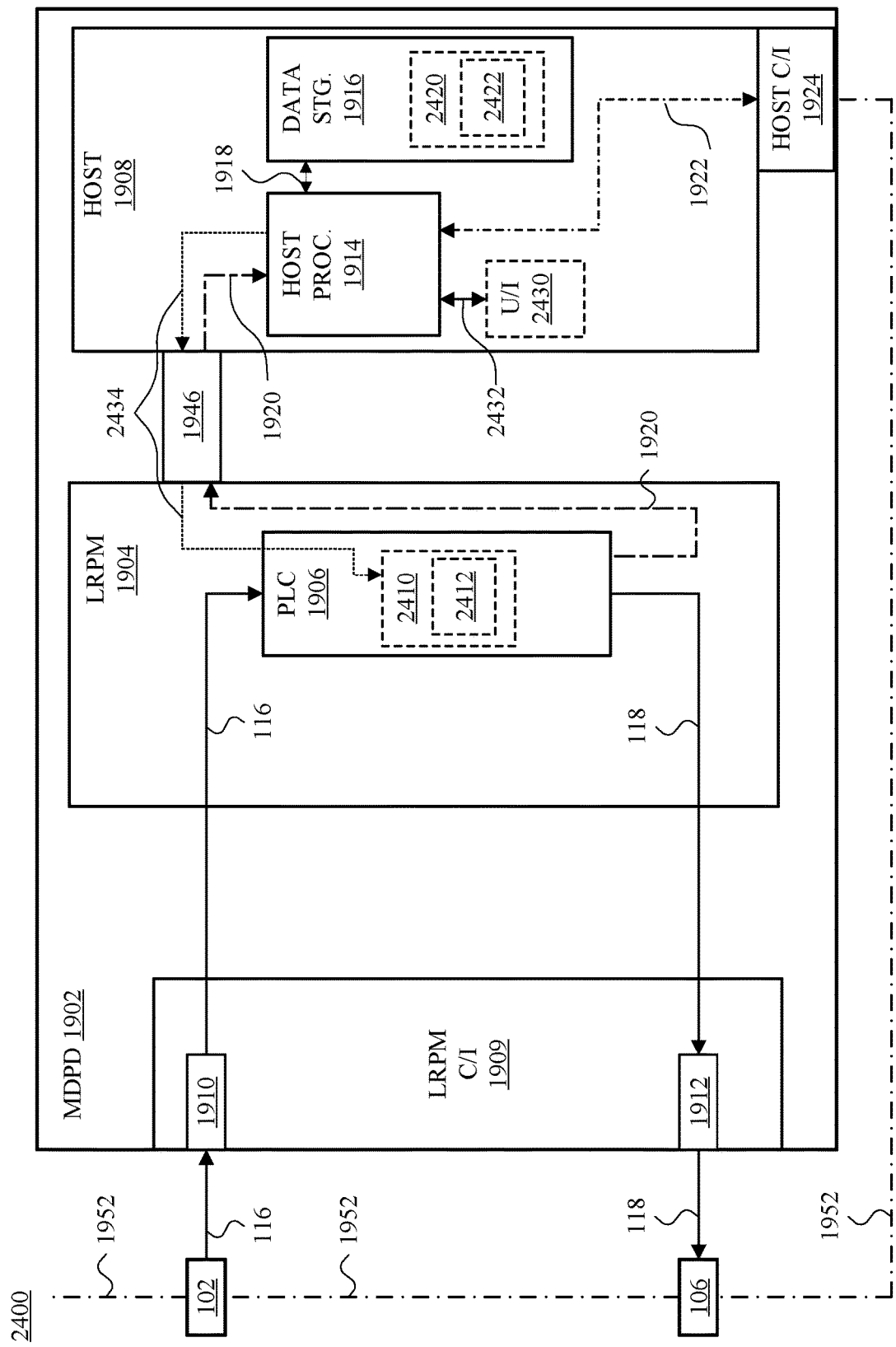
FIG. 24 is a sixth view of the example communication system of FIG. 19, in accordance with at least one embodiment.

FIG. 24 is a sixth view of the example communication system of FIG. 19, in accordance with at least one embodiment. In particular, FIG. 24 is a view 2400 that is similar to the view 1900 of the FIG. 19 but that further depicts, among other additions to the view 1900, the PLC 1906 including an operational output-feed profile 2410. In at least one embodiment, the operational output-feed profile 2410 includes a digital-logic segment 2412 corresponding to a ticker-symbol subset of ticker symbols to include in the output feed 118. The operational output-feed profile 2410 may be similar to the operational output feed 210 of FIG. 2. The operational output-feed profile 2410 may further include additional digital-logic segments defining a partitioning scheme, a protocol format, and/or the like. In an embodiment, the PLC 1906 generates the output feed 118 based on the operational output-feed profile 2410, similar to the generation of the output feed as described at 1006 of FIG. 10.

In FIG. 24, the host 1908 further includes a user interface 2430 communicatively coupled to the host processor 1914 via a communication link 2432. The user interface 2430 may be similar to the user interface 404 or could instead or in addition include an MNI such as the MNI 406 of FIG. 4. The host data storage 1916 further includes a management copy of the output feed profile 2420 containing (i.e., contains data defining) a ticker-symbol subset 2422. The management copy of the output-feed profile 2420 may further contain a partitioning scheme, a protocol format, and/or the like.

In the embodiment depicted by the view 2400, the input feed 116 comprises a plurality of order-book updates to respective ticker symbols in a plurality of ticker symbols. The PLC 1906 uses the ticker-symbol subset identified in the digital-logic segment 2412 to filter down the input feed 116 to a filtered feed of order-book updates to respective ticker symbols in the ticker-symbol subset. The operational output-feed profile 2410 on the PLC 1906 is based on the management copy of the output-feed profile 2420 stored in the host-data storage 1916.

The MDPD 1902 may further be configured to update the operational output-feed profile 2410 and subsequently generate the output feed 118 based on the updated output-feed profile. In one such example, the host processor 1914 receives, via the user interface 2430, a revision input for the management copy of the output-feed profile 2420. In this example, the revision input alters the ticker-symbol subset (e.g., by adding or removing a ticker symbol). The revision input may similarly update or add a partitioning scheme, change the output protocol, and/or the like.

The host processor 1914 updates the management copy of the output-feed profile 2420 based on the revision input and generates revision instructions for the operational output-feed profile 2410 based on the revision input. The revision input is provided to the PLC 1906 via a data connection 2434 that traverses the communication bus 1946. The PLC 1906 receives the revision input and updates the operational output-feed profile 2410 based on the revision instructions. In this example, the ticker symbols stored in the digital-logic segment 2412 are updated to match the ticker symbols contained in the updated ticker-symbol subset 2422. Thus, when the PLC 1906 thereafter continues to generate the output feed 118, the PLC 1906 does so in a manner that keeps updates associated with the updated operational output-feed profile 2410 that includes an updated ticker-symbol subset 2412.

In at least one embodiment, the output feed 118 includes output-feed packets that each include one or more order-book updates, each of which is an order-book update for a respective ticker symbol. The PLC 1906 may be configured to insert, into each output-feed packet, a feed-level sequence number indicating the sequential position of that output-feed packet among all of the output-feed packets in the output feed 118. The host processor 1914 may further be configured to use the cached archival copy 1920 of the input feed 116 to provide a gap-fill service by retrieving portions of the cached archival copy 1920 of the input feed 116. The retrieval may be based on the corresponding feed-level sequence numbers of the received gap-fill request.

The communication system depicted in the view 2400 of FIG. 24 may be used with the example input and output feeds of FIGS. 16A-D used to demonstrate such an example. Here, the input feed 116 may include a plurality of order-book updates to respective ticker symbols in a plurality of ticker symbols and be represented by the input feed 1610 of either FIG. 16A or FIG. 16B. In this example, the PLC 1906 generates an output feed 118 based on an operational output-feed profile specifying that the output feed 118 includes updates associated with the ticker symbols 'ABC' and 'MNO'. This ticker-symbol subset may be represented in the digital-logic segment 2412 of the operational output-feed profile 2410. As examples, the PLC 1906 may generate either the output feed 1620 of FIG. 16C or the output feed 1624 of FIG. 16D, depending on any defined output-feed protocol. That is, the output feed 1620 may comprise feed-level sequence numbers and may also comprise symbol-level sequence numbers, as disclosed above with the description of FIGS. 16C-D. In various different embodiments, these sequence numbers (either just the feed-level sequence number, or both the feed-level and sequence level sequence numbers) may be inserted into each output-feed packet.

In the above-described embodiment, the PLC 1906 generates the output feed 1620 having updates associated with the ticker symbols 'ABC' and 'MNO', with each output-feed packet having feed-level sequence numbers. If the downstream device 106 receives the output-feed packets '1 ABC' and '3 ABC', the downstream device 106 may transmit a gap-fill request to the MDPD 1902 via the data network 1952 requesting the message having the feed-level sequence number of '2'. The gap-fill request may identify the downstream device 106 and request the packets associated with the missing feed-level sequence number, here the output-feed packet for the downstream device 106 with a feed-level sequence number of '2'.

The host external-communication interface 1924 may receive the gap-fill request and provide it to the host processor 1914 via the communication link 1922. The host processor 1914 may retrieve the update associated with the feed-level sequence number of '2' for the downstream device 106 from the cached archival copy 1920 of the input feed 116 from the host data storage 1916. The host processor 1914 may prepare a gap-fill response and provide the gap-fill response to the host external-communication interface 1924 via the communication link 1922. The host external-communication interface 1924 may then transmit the gap-fill response to the downstream device 106 via the data network 1952.

In some embodiments, retrieving the corresponding update comprises referencing a mapping between input-feed sequence numbers and output-feed (feed-level) sequence numbers (e.g., similar to the table 1874 of FIG. 18D). In one such embodiment, the host processor 1914 uses the management copy of the output-feed profile 2420 stored in host data storage 1916 to determine the corresponding output-feed sequence numbers. In an embodiment, the host 1908 generates these output-feed sequence numbers independent of the output-feed sequence numbers generated by the PLC 1906. In such an embodiment, because the operational copy of the output-feed profile 2410 on the PLC 1906 is based on the management copy of the output-feed profile 2420 on the host 1908, which aligns in substance with the operational output-feed profile 2410 on the PLC 1906, the sequence numbers generated by the PLC 1906 match the sequence numbers generated at the host 1908. In other embodiments, the host 1908 generates a mapping such as the table 1874 based on information that the host 1908 receives from the PLC 1906. Examples of such embodiments are described above in connection with FIG. 18E and FIG. 18F.

Figure 25:
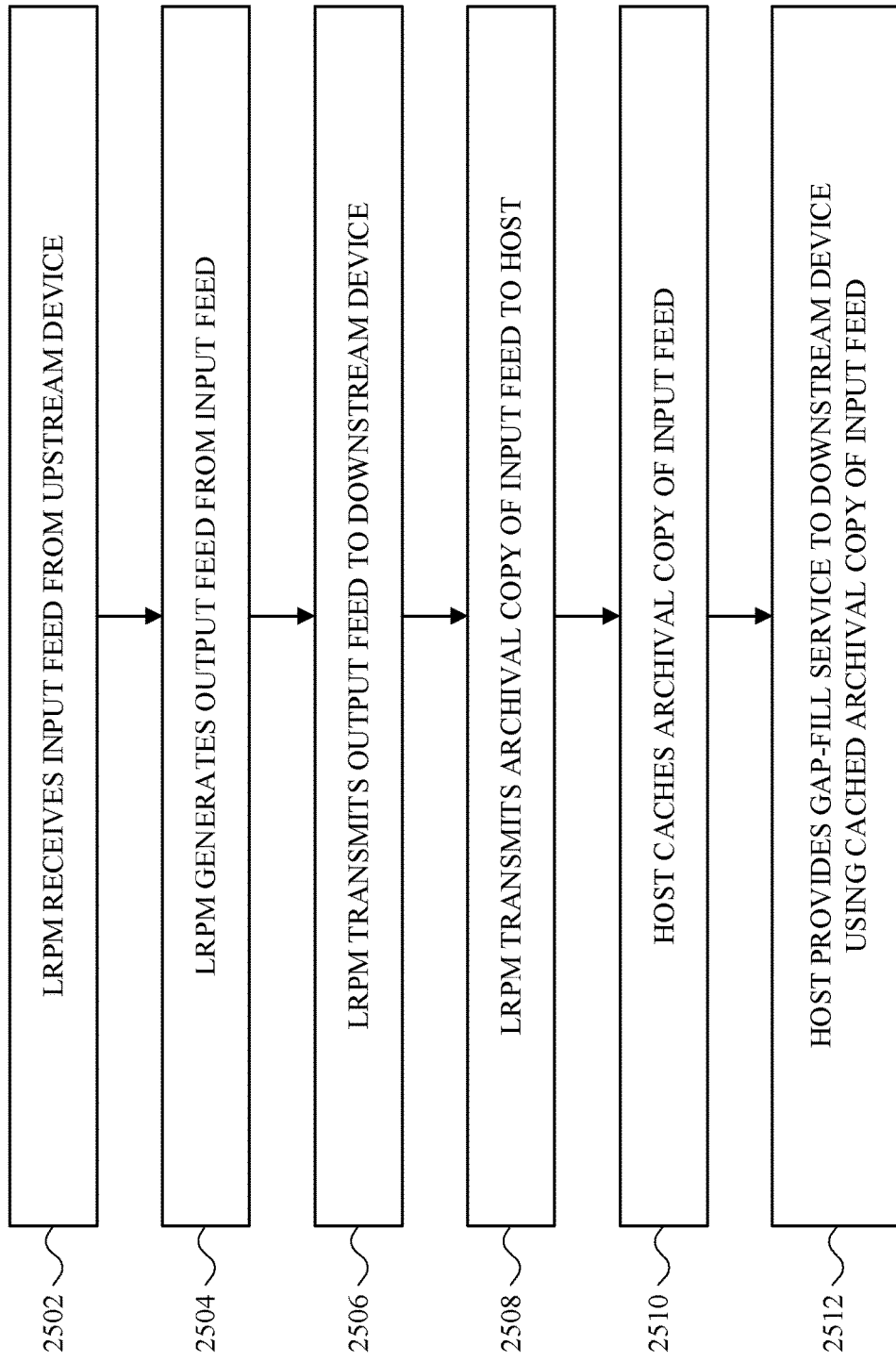
FIG. 25 is a flowchart of an example method, in accordance with at least one embodiment.

FIG. 25 is a flowchart of an example method, in accordance with at least one embodiment. In particular, FIG. 25 depicts an example method 2500 that may be carried out by an MDPD; indeed, the MDPD 1902 that is depicted in the view 1900 of FIG. 19 is described below by way of example and not limitation as carrying out the method 2500.

At step 2502, the LRPM 1904 receives the input feed 116 (via the LRPM external-communication port 1910) from the upstream device 102. The input feed 116 is then provided to the LRPM 1904 having the PLC 1906. At step 2504, the LRPM 1904 (and in particular the PLC 1906) generates the output feed 118 based on the input feed 116. At step 2506, the LRPM 1906 transmits the output feed 118 (via the LRPM external-communication interface port 1912) to the downstream device 106. At step 2508, the LRPM 1904 transmits the archival copy 1920 of the input feed 116 to the host processor 1914 on the host 1908 via the communication bus 1946. At 2510, the host 1908 caches the archival copy 1920 of the input feed 116 in the host data storage 1916. At 2512, the host processor 1914 uses the cached archival copy 1920 of the input feed 116 to provide (via the host external-communication interface 1924 and the data network 1952) a gap-fill service (with respect to the output feed 118) to the downstream device 106.

In various different embodiments, the method 2500 is carried out in manners that are consistent with the architectures depicted in any of the views 1900-2400 of the FIGS. 19-24, respectively. For example, the method 2500 may be adapted to having components of the LRPM 1904 (e.g., the PLC 1906) on the first circuit board 2002 and components of the host 1908 (e.g., the host processor 1914) on the second circuit board 2004 as depicted in the view 2000, the crosspoint switch 2102 residing on the first circuit board 2002 as depicted in the view 2100, the crosspoint switch 2102 duplicating the output feed 118 and providing the duplicated copy of the output feed to the downstream device 2250 in parallel with providing the output feed 118 to the downstream device 106 as depicted in the view 2200, the functions of the memory chip 2302 of the view 2300, and the use of output-feed profiles discussed in conjunction with the view 2400, as a few non-limiting examples. Further, functions disclosed in conjunction with the MDPD 104 may further be incorporated to the method 2500; that is, any of the various embodiments discussed in connection with the MDPD 104 could be carried out by the MDPD 1902, and vice versa. The same applies with respect to the below-described MDPD 2602 and any other MDPDs discussed herein.

Figure 26:
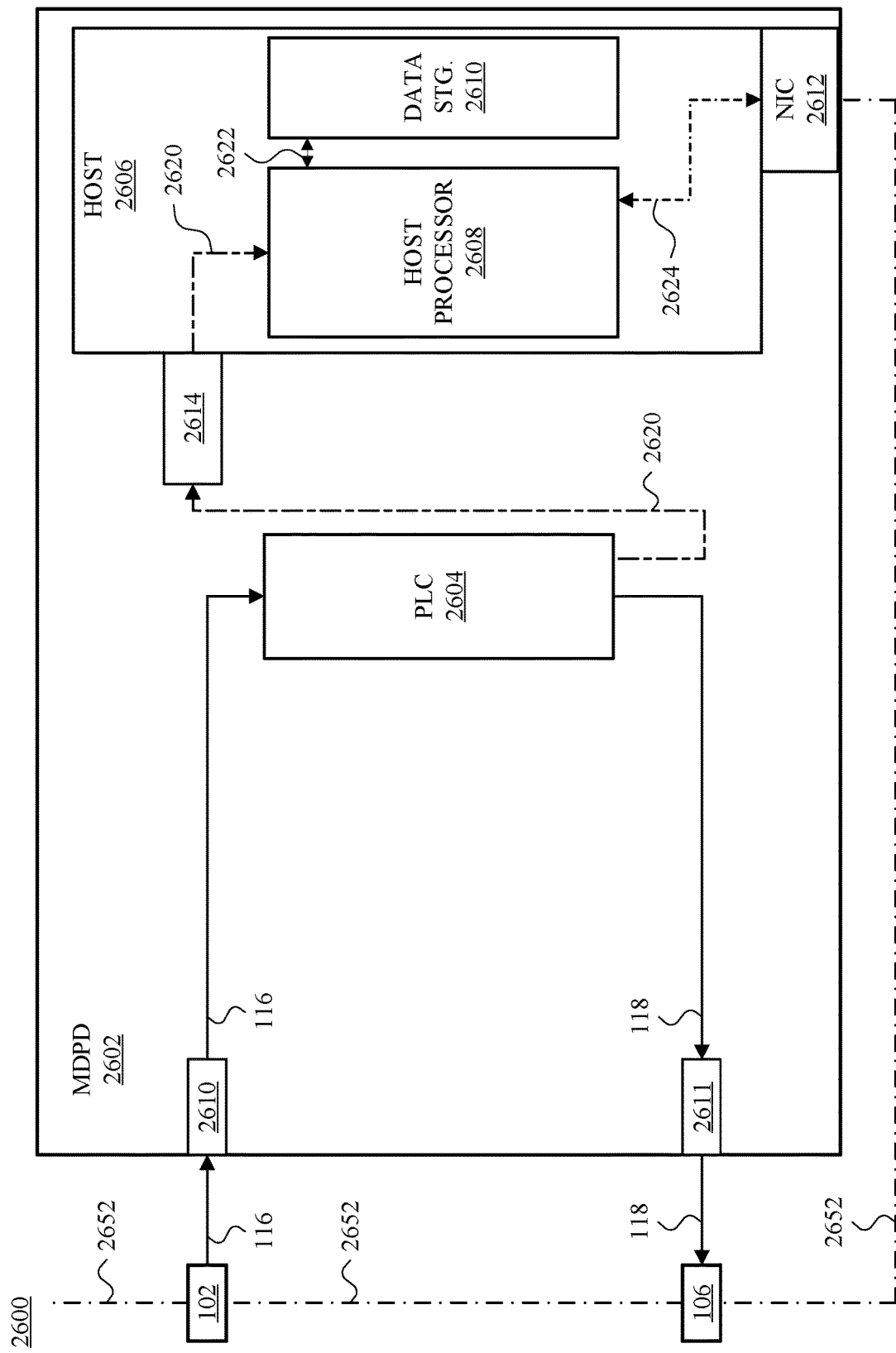
FIG. 26 is a view of an example communication system that includes an example upstream device, a third example MDPD, and an example downstream device, in accordance with at least one embodiment.

FIG. 26 is a view of an example communication system that includes an example upstream device, a third example MDPD, and an example downstream device, in accordance with at least one embodiment. In particular, FIG. 26 depicts a view 2600 that includes the upstream device 102, the downstream device 106, and an MDPD 2602. The MDPD 2602 includes a first external data port 2610, a PLC 2604, a second external data port 2611, and a communication bus 2614 connecting the PLC 2604 (e.g., an FPGA) to a host 2606. The host 2606 includes a host processor 2608 connected to (i) host data storage 2610 via a communication link 2622 and (ii) a NIC 2612 via a communication link 2624. The NIC 2612 is in turn connected with a data network 2652. In at least one embodiment, the MDPD 2602 operates similar to the MDPD 102 and the MDPD 1902, in that the MDPD 2602 receives the input feed 116 from the upstream device 102 and provides the output feed 118 to the downstream device 106.

In at least one embodiment, the first external data port 2610 is configured to receive, from the upstream device 102, an input feed 116 of order-book updates to respective ticker symbols in a plurality of ticker symbols. The second external data port 2611 is configured to transmit, from the PLC 2604, an output feed 118 to the downstream device 106. The external data ports 2610 and 2611 may be similar in function to the LRPM external-communication ports 1910 and 1912 of FIG. 19. The PLC 2604 may be configured to receive the input feed 116 and generate both (i) a market-data output feed (e.g., the output feed 118) and (ii) an archival copy 2620 of the input feed 116. Generating the archival copy 2620 of the input feed 116 may be similar to generating the archival copy 1920 of the input feed 116 of FIG. 19. As mentioned above, the output feed 118 is provided to the second external data port 2611 for transmission to the downstream device 106.

The host 2606 may be communicatively coupled to (i) the PLC 2604 via the communication bus 2614 and (ii) the downstream device 106 via the NIC 2612 and the data network 2652. The host 2606 may be configured to receive and cache the archival copy 2620 of the input feed 116 (e.g., the host processor 2608 receives the archival copy 2620 of the input feed 116 and provides input-feed cache data to the host data storage 2610 via the communication link 2622). The host 2606, responsive to receiving a gap-fill request from the downstream device 106, may further be configured to (i) generate a gap-fill response to the gap-fill request from the cached archival copy 2620 of the input feed 116 and (ii) transmit the generated gap-fill response via the NIC 2612 to the downstream device 106.

In one embodiment, the MDPD 2602 further includes a first circuit board (not depicted) on which the PLC 2604 resides and a second circuit board (not depicted) on which the host 2606 resides, similar to the MDPD 1902 depicted in the view 2000 of FIG. 20 having the PLC 1906 residing on the first circuit board 2002 and the host processor 1914 residing on the second circuit board 2004. The PLC 2604 may be communicatively connected to the host 2606 via the communication bus 2614.

In at least one embodiment, the MDPD 2602 further comprises a crosspoint switch (not depicted) configured to (i) pass the input feed 116 from the first external data port 2610 to the PLC 2604 and (ii) pass the output feed 118 from the PLC 2604 to the second external data port 2611. The crosspoint switch may reside on the first circuit board with the PLC 2604 (e.g., similar to the crosspoint switch 2102 residing on the first circuit board 2002 as depicted in the view 2100 of the MDPD 1902) and be similar in function to the crosspoint switch 702 of FIG. 7. In some embodiments, the crosspoint switch in the MDPD 2602 is configured to generate a duplicate copy of the output feed (see e.g., crosspoint switch 2102 of the view 2200) and pass the duplicate copy of the output feed to a third external data port in parallel with passing the output feed 118 to the second external data port 2611.

In at least one embodiment, the input feed 116 includes a plurality of order-book updates to respective ticker symbols in the plurality of ticker symbols. The PLC 2604 may further be configured to maintain an operational output-feed profile that specifies a ticker-symbol subset that identifies one or more ticker symbols from among the plurality of ticker symbols. The PLC 2604 may generate the output feed 118 based on the input feed 116 at least in part by filtering the input feed 116 down to a filtered feed of the order-book updates to respective ticker symbols in the ticker-symbol subset (see, e.g., the MDPD 1902 of the view 2400 generating an output feed based on output-feed profiles).

In one embodiment, the MDPD 2602 is further configured to maintain a current local list of active orders for each ticker symbol in the plurality of ticker symbols based on the archival copy 2620 of the input feed 116. Responsive to receiving, from the downstream device 106, a late-join request for a particular ticker symbol, the host 2606 may generate a late-join response from the current local list of active orders for the particular ticker symbol. The late-join response may be transmitted via the NIC 2612, via the data network 2652, to the downstream device 106. And other example implementations could be listed here as well.

Figure 27:
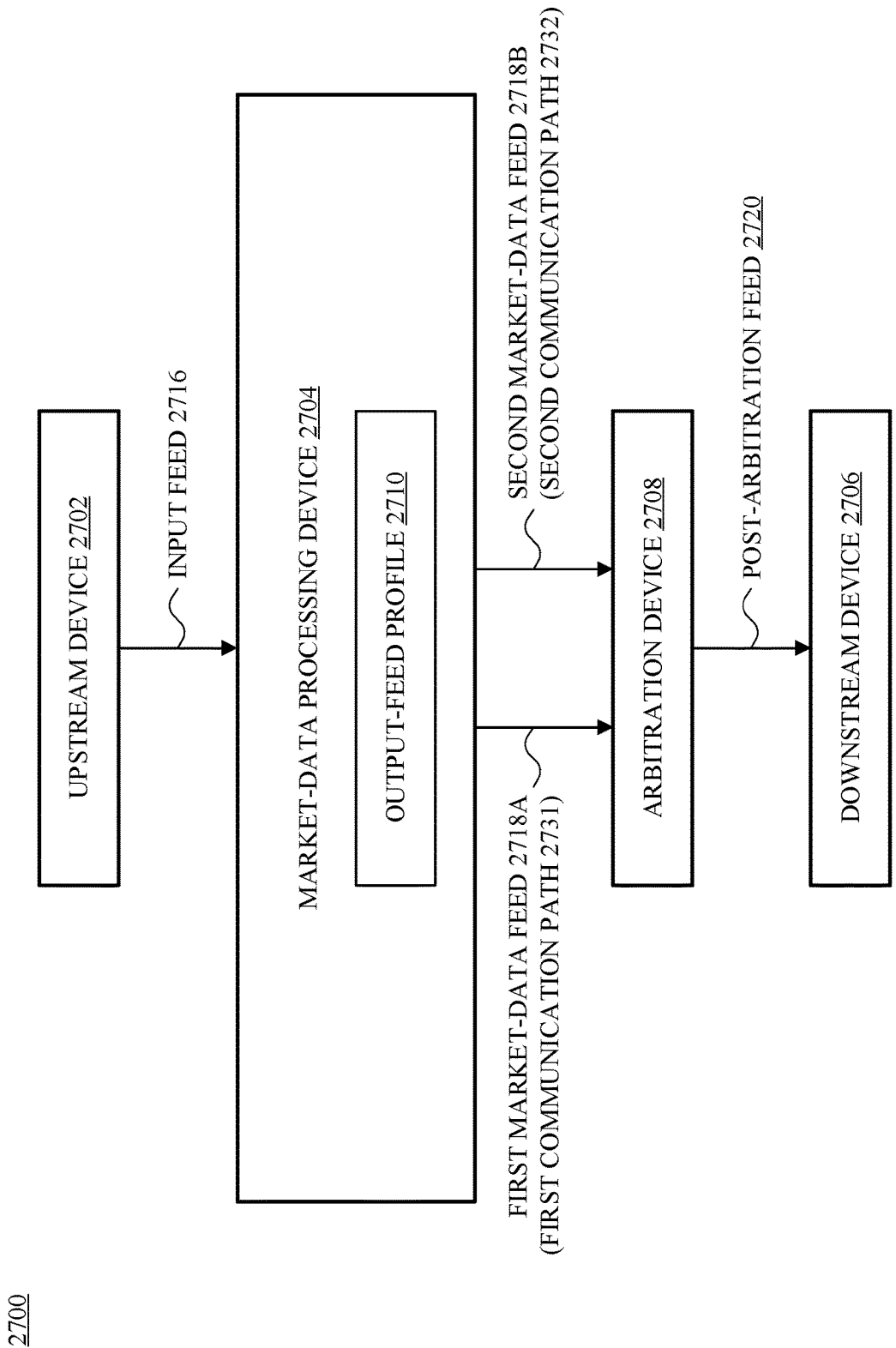
FIG. 27 is a first view of an example communication system that includes an example upstream device, an example MDPD, an example arbitration device, and an example downstream device, in accordance with at least one embodiment.

Examples Involving Generating, Transmitting, and Arbitrating Among Multiple Market-Data Feeds Generating and Transmitting Multiple Market-Data Feeds Via Respective Separate and Distinct Communication Paths FIG. 27 is a first view of an example communication system that includes an example upstream device, an example MDPD, an example arbitration device, and an example downstream device, in accordance with at least one embodiment. In particular, FIG. 27 depicts a view 2700 that includes an upstream device 2702, a MDPD 2704 having an output-feed profile 2710, an arbitration device 2708, and a downstream device 2706. The view 2700 is similar to the view 100 of FIG. 1. For example, the upstream device 2702 is similar to the upstream device 102, the MDPD 2704 is similar to the MDPD 104, the downstream device 2706 is similar to the downstream device 106, the input feed 2716 is similar to the input feed 116, the output-feed profile 2710 is similar to the output-feed profile 110, and the first market-data feed 2718A and second market-data feed 27188 may each be similar—in structure if not in substance—to the output feed 118.

As described, in at least one embodiment, the MDPD 2704 generates the first market-data feed 2718A and the second market-data feed 27188. The first market-data feed 2718A may be generated at least in part by filtering the received input feed 2716 down to a filtered feed of order-book updates by keeping only order-book updates to the respective ticker symbols in a ticker-symbol subset defined in the output-feed profile 2710. Generating the first market-data feed 2718A may further include inserting an output-feed (e.g., feed-level and perhaps also symbol-level) sequence number into each order-book update in the first market-data feed 2718A. The generation of the first market-data feed 2718A may be similar to the herein-described generation of the output feed 118. In at least one embodiment, the MDPD 2704 also generates the second market-data feed 27188, which includes (perhaps among other order-book updates) the order-book updates of the first market data feed 2718A having the same respective sequence numbers inserted into the same respective order-book updates as in the first market-data feed 2718A.

In at least one embodiment, the MDPD 2704 transmits the first market-data feed 2718A via a first communication path 2731 to the arbitration device 2708, and transmits the second market-data feed 27186 via a second communication path 2732 to the arbitration device 2708. The second communication path 2732 is separate and distinct from the first communication path 2731. Examples of the first communication path 2731 and the second communication path 2732 are presented below in connection with at least FIG. 33. As described below, in at least one embodiment, the arbitration device 2708 conducts sequence-number-based arbitration between the first market-data feed 2718A and the second market-data feed 2718B. In some embodiments, this arbitration process results in the arbitration device 2708 outputting a post-arbitration feed 2720 to the downstream device 2706.

It is noted that, in some described embodiments, the post-arbitration feed 2720 is referred to as the "post-arbitration first feed 2720"—i.e., a post-arbitration version of the first market-data feed 2718A; in such embodiments, the first market-data feed 2718A is referred to as the "pre-arbitration first feed 2718A" Such embodiments are described in terms of an arbitration device (or equivalently an arbitration module of a downstream device—see FIG. 28 and its below description) using one or more supplemental market-data feeds (of which the second market-data feed 2718B is but one example) to patch any detected gaps in the pre-arbitration first feed 2718A as part of generating the post-arbitration first feed 2720.

Figure 28:
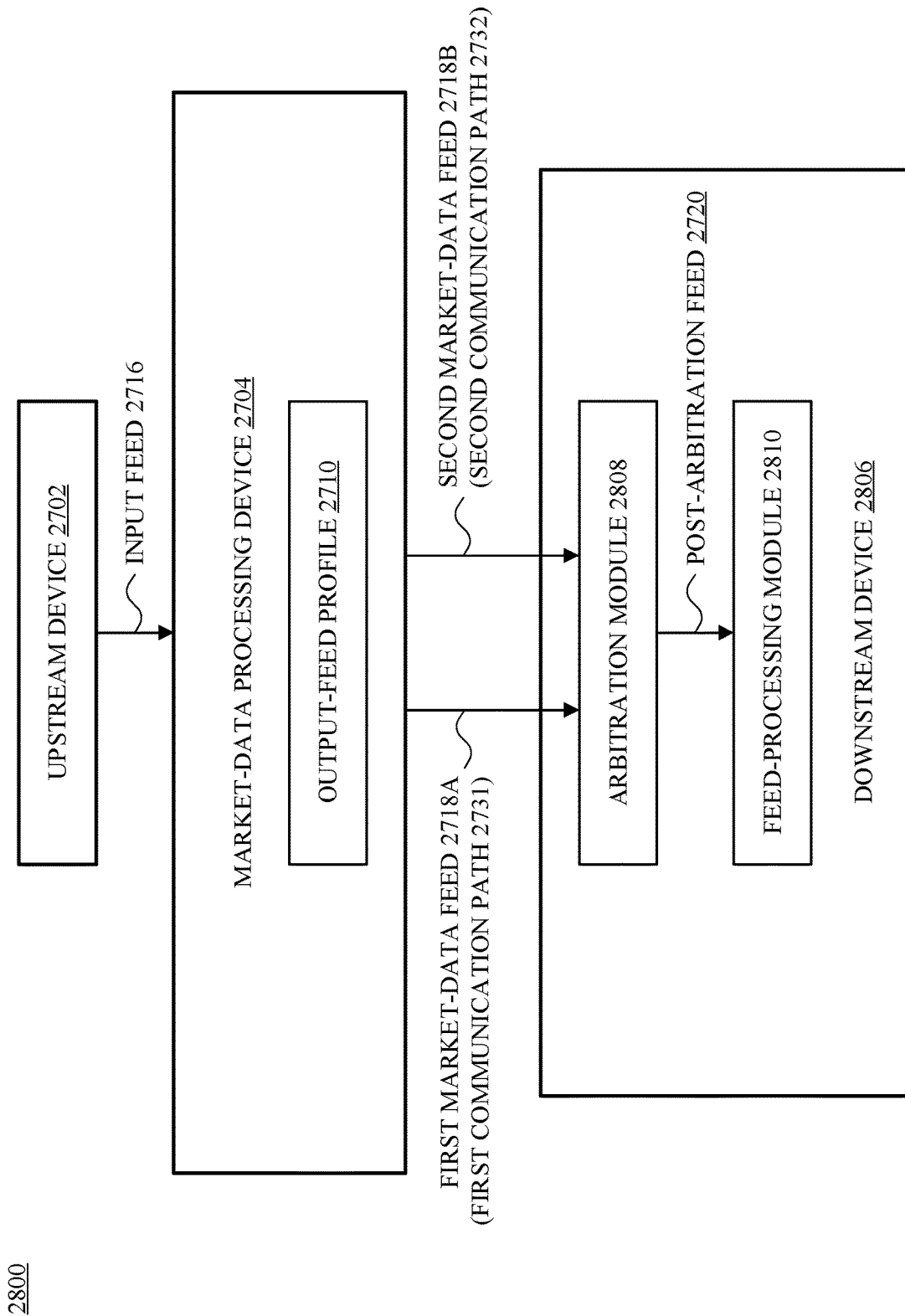
FIG. 28 is a view of an example communication system that includes an example upstream device, an example MDPD, and an example downstream device that itself includes an arbitration module and a feed-processing module, in accordance with at least one embodiment.

FIG. 28 is a view of an example communication system that includes an example upstream device, an example MDPD, and an example downstream device that itself includes an arbitration module and a feed-processing module, in accordance with at least one embodiment. In particular, FIG. 28 depicts a view 2800 that is similar to the view 2700 other than that, instead of the separate arbitration device 2708 and downstream device 2706 of FIG. 27, FIG. 28 includes a downstream device 2806 that itself includes an arbitration module 2808 and a feed-processing module 2810. In substance, the arbitration module 2808 may perform functions similar to those described herein with respect to the arbitration device 2708, and the feed-processing module 2810 may perform functions similar to those described herein with respect to a downstream device such as the downstream device 2706. Indeed, it should be understood that any embodiment that is depicted and described herein as involving a separate arbitration device 2708 and downstream device 2706 could instead be implemented in a way that involves a downstream device 2806 that includes the arbitration module 2808 and a feed-processing module 2810.

FIG. 29 is a flowchart of an example method, in accordance with at least one embodiment. In particular, FIG. 29 depicts a method 2900 that is described below by way of example as being carried out by the MDPD 2704.

At step 2902, the MDPD 2704 receives the input feed 2716 from the upstream device 2702.

At step 2904, the MDPD 2704 generates the first market-data feed 2718A at least in part by (i) filtering the received input feed 2716 down to a filtered feed of order-book updates by keeping only order-book updates to the respective ticker symbols in a ticker-symbol subset that is defined in the output-feed profile 2710 and (ii) inserting a sequence number into each order-book update in the first market-data feed 2718A.

At step 2906, the MDPD 2704 generates the second market-data feed 2718B, which includes, perhaps among other order-book updates, the order-book updates of the first market-data feed 2718A having the same respective sequence numbers inserted into the same respective order-book updates.

With respect to both steps 2904 and 2906, the sequence numbers could be feed-level sequence numbers, symbol-level sequence numbers, and/or partition-level sequence numbers. In at least one embodiment, the sequence numbers include both feed-level and symbol-level sequence numbers.

At step 2908, the MDPD 2704 transmits the first market-data feed 2718A via the first communication path 2731 to the arbitration device 2708. An example first communication path 2731 is depicted in and discussed below in connection with FIG. 33. The first communication path 2731 may include one or more wireless (e.g., point-to-point microwave) communication links.

At step 2910, the MDPD 2704 transmits the second market-data feed 2718B via the second communication path 2732, separate and distinct from the first communication path 2731, to the arbitration device 2708 for use by the arbitration device 2708 in conducting sequence-number-based arbitration between the first market-data feed 2718A and the second market-data feed 2718B. An example second communication path 2732 is also depicted in and discussed below in connection with FIG. 33.

The second communication path 2732 may include one or more fiber-optic communication links. Moreover, it may be the case that (i) at least a threshold portion (e.g., 80%) of a geographical footprint of the first communication path 2731 consists of one or more point-to-point microwave communication links and (ii) at least the threshold portion of a geographical footprint of the second communication path 2732 consists of one or more fiber-optic communication links.

The second market-data feed 2718B could be a copy of the first market-data feed 2718A, perhaps also generated by the PLC at the MDPD 2704 as depicted in and described below in connection with FIG. 30B, or perhaps generated at the MDPD 2704 by a crosspoint switch as depicted in and described below in connection with FIG. 32. The second market-data feed 2718B could instead be a superset of the first market-data feed 2718A. For example, the second market-data feed 2718B could be a full copy of the input feed 2716, among many other possibilities that could be listed here. In embodiments in which the second market-data feed 2718B is a superset of the first market-data feed 2718A, the aforementioned include symbol-level sequence numbers (since feed-level sequence numbers would not match up between the first and second market-data feeds 2718A and 2718B). Moreover, in such embodiments, the PLC of the MDPD 2704 may separately generate the first market-data feed 2718A and the second market-data feed 2718B from the input feed 2716, as depicted in and described below in connection with FIG. 31.

In some embodiments, the MDPD 2704 transmits (i) a duplicate of each order-book update in the first market-data feed 2718A via the first communication path 2731 a first time delay after first transmitting the first instance of the corresponding order-book update in the first market-data feed 2718A and (ii) transmits a duplicate of each order-book update in the second market-data feed 2718B via the second communication path 2732 a second time delay after first transmitting the first instance of the corresponding order-book update in the second market-data feed 2718B. In at least one such embodiment, the first and second time delays are equal to one another, perhaps equaling or at least being on the order of 50 µs. In at least one other such embodiment, the first and second time delays are not equal to one another. In at least one embodiment, the first time delay is selected based on an average outage duration of the first communication path 2731. In at least one such embodiment, the method includes (i) measuring the average outage duration of the first communication path 2731 and (ii) selecting the first time delay to be greater than that measured average outage duration.

Figure 30A:
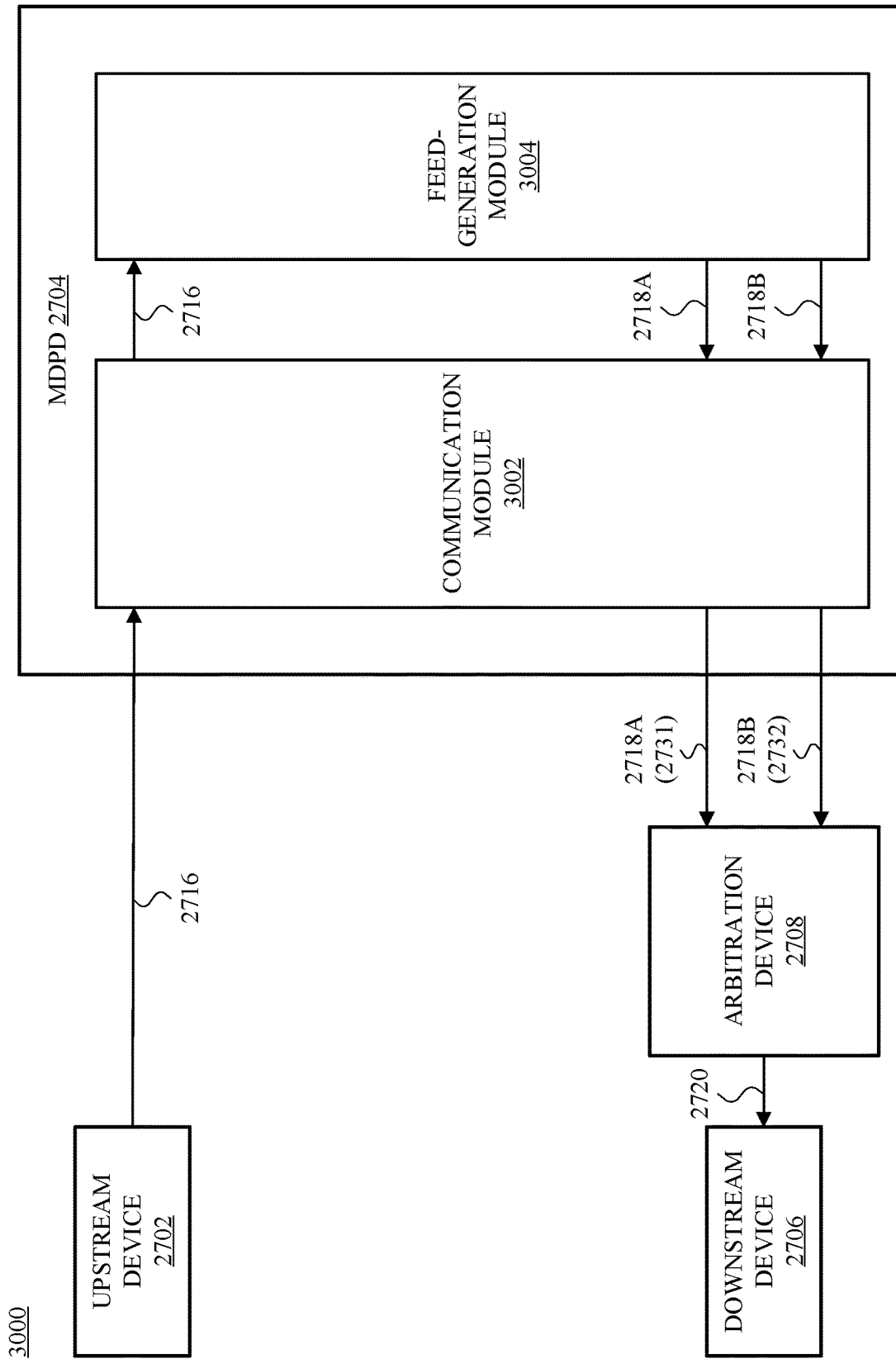
FIG. 30A is a second view of the example communication system of FIG. 27, in accordance with at least one embodiment.

FIG. 30A is a second view of the example communication system of FIG. 27, in accordance with at least one embodiment. In particular, FIG. 30A depicts a view 3000 in which the MDPD 2706 includes a communication module 3002 and a feed-generation module 3004. In at least one embodiment, the communication module 3002 is configured to carry out steps 2902, 2908, and 2910 of the method 2900, and the feed-generation module 3004 is configured to carry out steps 2904, 2906 and 2908 of the method 2900.

Figure 30B:
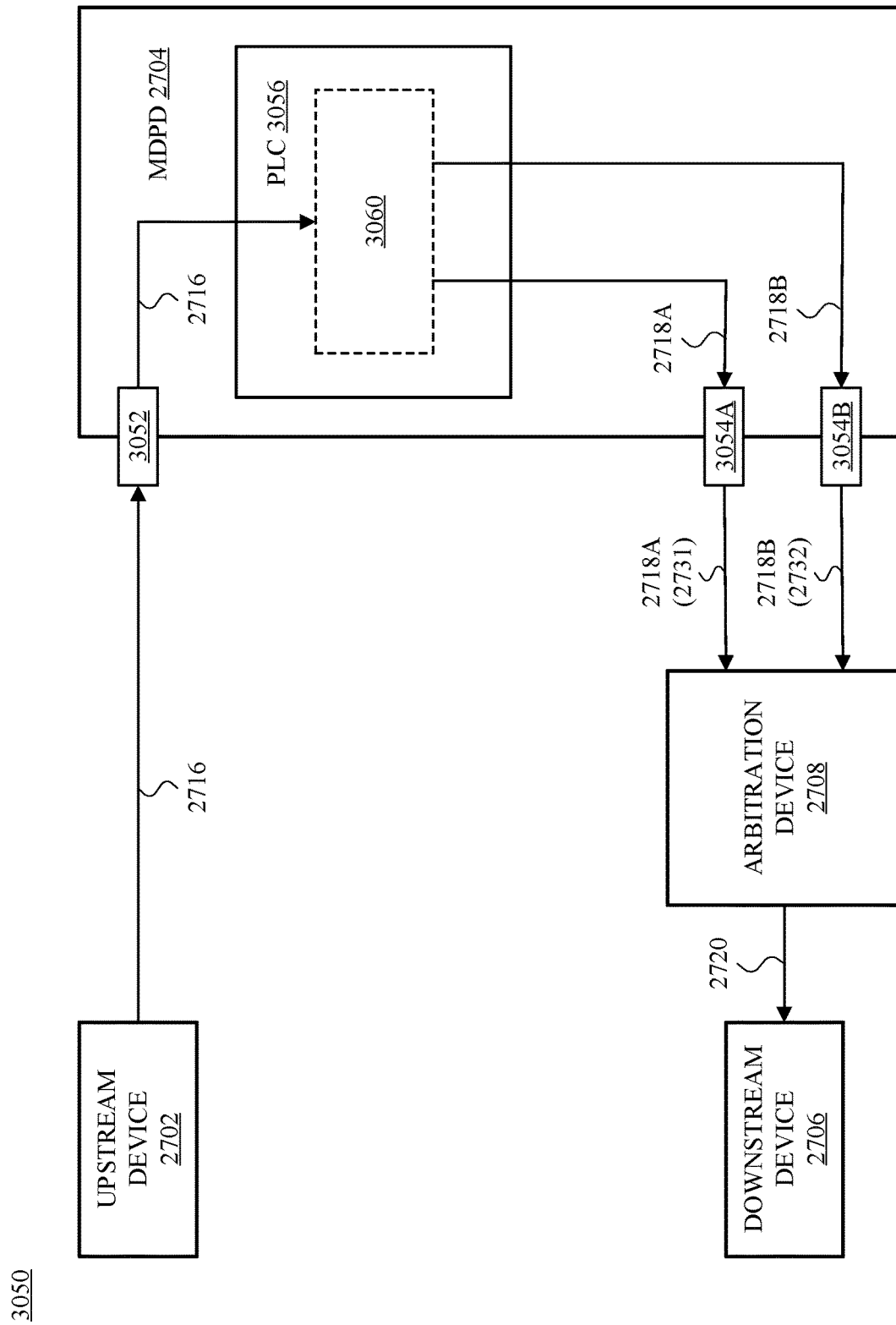
FIG. 30B is a third view of the example communication system of FIG. 27, in accordance with at least one embodiment.

FIG. 30B is a third view of the example communication system of FIG. 27, in accordance with at least one embodiment. In particular, FIG. 30B depicts a view 3050 in which the MDPD 2704 includes external data ports 3052, 3054A, and 3054B, as well as a PLC 3056 that includes an operational output-feed profile 3060. The view 3050 depicts an embodiment in which the second market-data feed 2718B is a copy of the first market-data feed 2718A, in that both are produced by the PLC 3056 using the same operational output-feed profile 3060.

Figure 31:
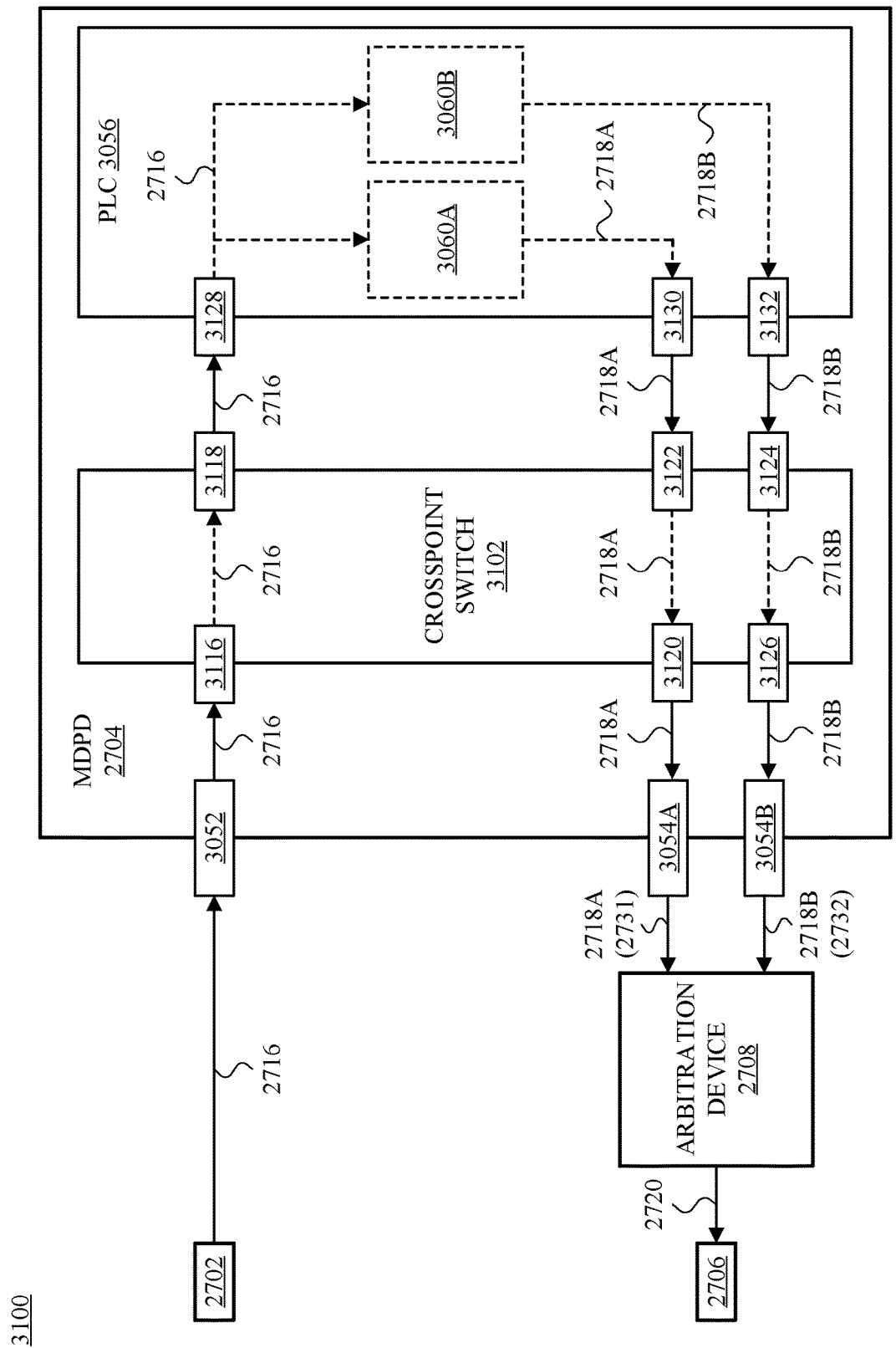
FIG. 31 is a fourth view of the example communication system of FIG. 27, in accordance with at least one embodiment.

FIG. 31 is a fourth view of the example communication system of FIG. 27, in accordance with at least one embodiment. In particular, FIG. 31 depicts a view 3100 that is similar to the view 3050 of FIG. 30B but, among other differences, further includes a crosspoint switch 3102, which is depicted as having six crosspoint data ports 3116, 3118, 3120, 3122, 3124, and 3126. The crosspoint switch 3102 and its associated crosspoint data ports are similar to the crosspoint switch 302 and its associated crosspoint data ports. As depicted in the view 3100, the PLC 3056 comprises multiple output-feed profiles 3060A and 3060B. The PLC 3056 generates the market-data feeds 2718A and 2718B, in accordance with those respective output-feed profiles 3060A and 3060B. Also depicted in FIG. 31 are PLC data ports 3128, 3130, and 3132.

Figure 32:
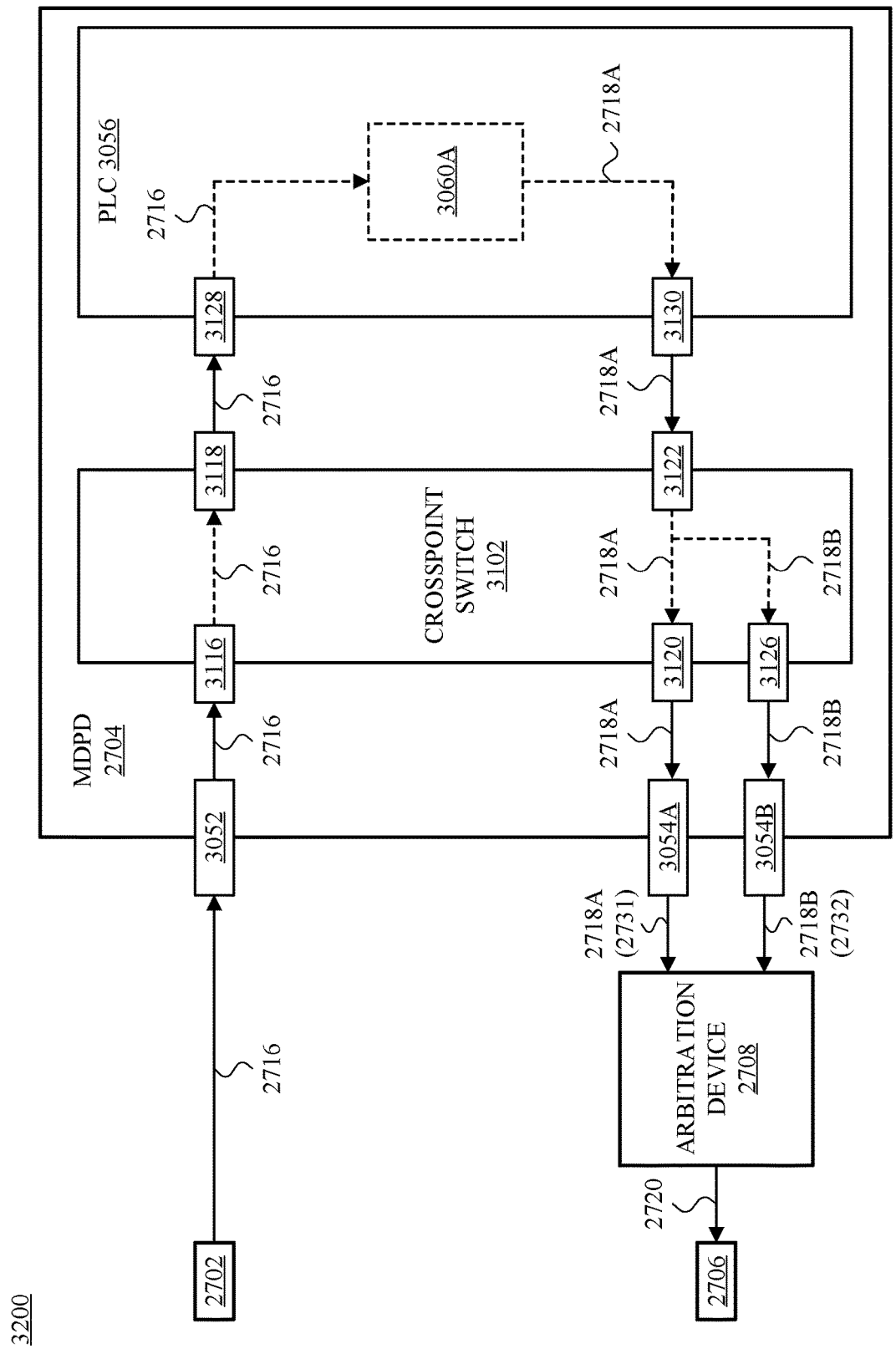
FIG. 32 is a fifth view of the example communication system of FIG. 27, in accordance with at least one embodiment.

FIG. 32 is a fifth view of the example communication system of FIG. 27, in accordance with at least one embodiment. In particular, FIG. 32 depicts a view 3200 that is similar to the view 3100. However, in the view 3200, rather than the PLC 3056 generating both the first (2718A) and second (2718B) market-data feeds, the PLC 3056 generates the first market-data feed 2718A based on the output-feed profile 3060A, and the crosspoint switch 3102 then receives a single copy of the first market-data feed 2718A, which the crosspoint switch 3102 duplicates to generate the second market-data feed 2718B.

Figure 33:
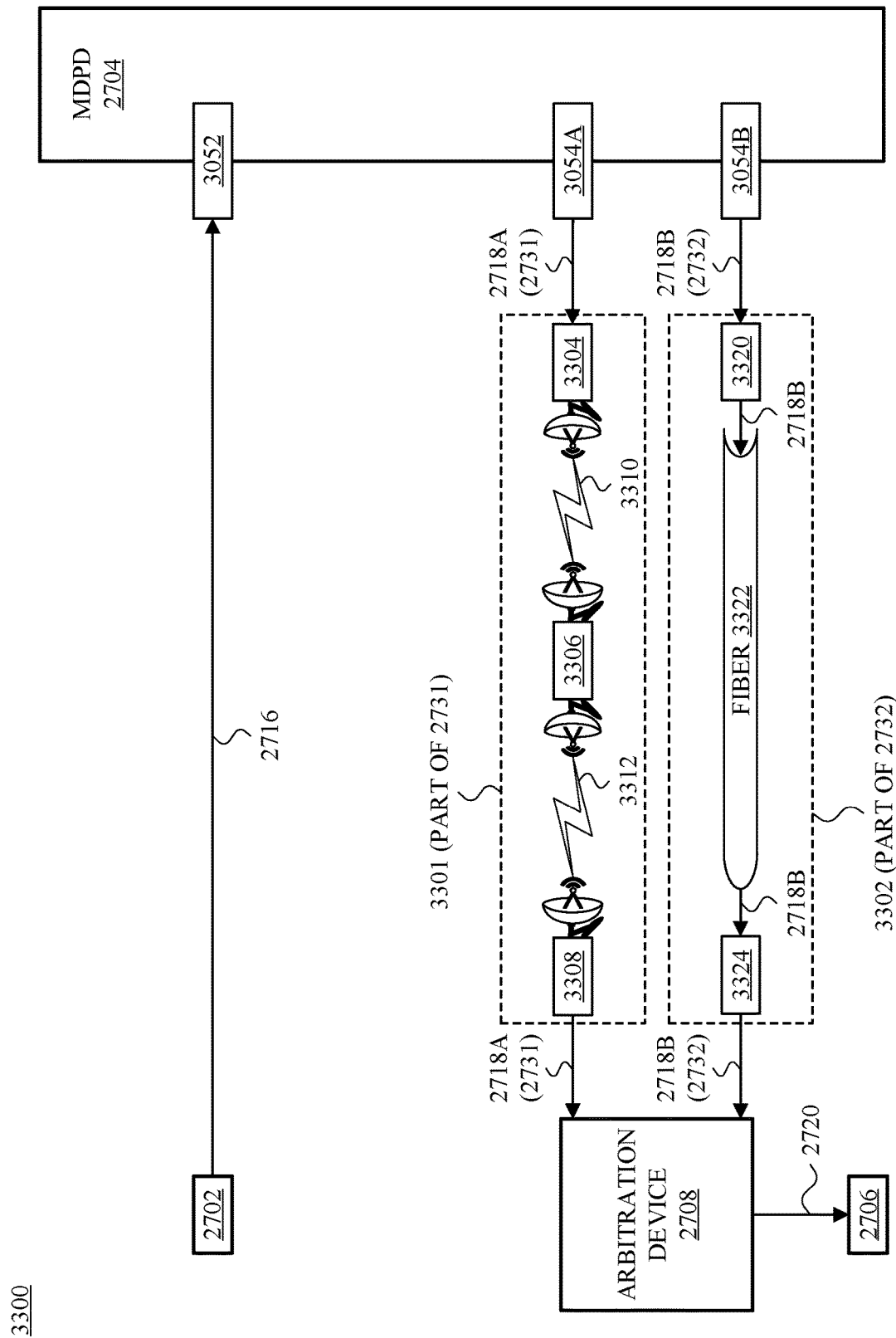
FIG. 33 is a sixth view of the example communication system of FIG. 27, in accordance with at least one embodiment.

FIG. 33 is a sixth view of the example communication system of FIG. 27, in accordance with at least one embodiment. In particular, FIG. 33 depicts a view 3300 that is similar to the view 3050 of FIG. 30B, though the view 3300 includes less detail in some respects and more detail in others. The view 3300 includes less detail with respect to the inner workings of the MDPD 2704, showing only (i) the receipt by the MDPD 2704 (via the external data port 3052) of the input feed 2716 from the upstream device 2702, (ii) the transmitting by the MDPD 2704 (via the external data port 3054A) of the first market-data feed 2718A via the first communication path 2731, and (iii) the transmitting by the MDPD 2704 (via the external data port 3054B) of the second market-data feed 2718B via the second communication path 2732. As described below, the view 3300 includes more detail with respect to possible forms and technologies that could be included in one or both of the first communication path 2731 and the second communication path 2732.

In the embodiment that is depicted in FIG. 33, the first communication path 2731 includes a segment 3301, which itself includes a first transceiver station 3304, a second transceiver station 3306, and a third transceiver station 3308. Also depicted are (i) a wireless-communication link 3310 between the first transceiver station 3304 and the second transceiver station 3306 and (ii) a wireless-communication link 3312 between the second transceiver station 3306 and the third transceiver station 3308. In various different embodiments, there could be any number of transceiver stations and any number of wireless-communication links. Moreover, the transceiver stations and wireless-communication links could make use of any suitable wireless-communication technology, one example being point-to-point microwave communication. Also, different wireless-communication links on a single communication path could use different wireless-communication technologies. And there could be one or more wired-communication links in the same communication path as one or more wireless-communication links. And certainly other example implementations could be listed here.

In the embodiment that is depicted in FIG. 33, the second communication path 2732 includes a segment 3302, which itself includes a first terminal device 3320, a fiber-optic link 3322, and a second terminal device 3324. The first terminal device 3320 and the second terminal device 3324 could take the form of any suitable routers, bridges, or other communication devices suitable for residence on and participation in the second communication path 2732. The fiber-optic link 3322 could be a single fiber-optic connection or could include multiple fiber-optic connections and suitable intermediate communication devices, as is known in the art. In various different embodiments, the second communication path 2732 could include one or more additional wired-communication links of any suitable type and/or one or more wireless-communication links of any suitable type. And certainly other example implementations could be listed here as well.

Geographically, the disclosed devices in any given embodiment can be located in any terrestrial locations—or extraterrestrial locations, should such an implementation be desired—that are suitable for a given implementation. The first communication path 2731 and the second communication path 2732 could span less than a mile, in the single digits of miles, in the hundreds of miles, in the thousands of miles, or any other distance, depending on the needs of a particular context. Moreover, while the endpoints of the first communication path 2731 and the second communication path 2732 are clearly the same (only in that they both span between the MDPD 2704 and the arbitration device 2708), there is no requirement whatsoever that these communication paths have identical, similar, or even overlapping geographical footprints. Such decisions are within the discretion of those of skill in the art.

In one example point-to-point microwave communication link, a microwave transmitter transmits a beam of radio waves in the microwave frequency range to a microwave receiver using a parabolic or dish-type antenna. The microwave transmitter is oriented in a direction of the microwave receiver and is highly directional. The microwave transmissions span the atmosphere between the transmitter and receiver; as such, the signal path is susceptible to blockage and interference by, as examples, weather, passing animals, and the like. Example point-to-point microwave communication links are provided by NEC, Ericsson, Nokia, and the like.

In at least one embodiment, the second communication path 2732 includes one or more fiber-optic communication links. The one or more fiber-optic communication links may be any type of fiber-optic communication links including single-mode, multi-mode, bi-directional, glass or plastic fiber-optic cables, and/or the like.

In at least one embodiment, an MDPD includes a communication interface, a processor, and data storage containing instructions executable by the processor for causing the MDPD to carry the method 2900. Such an embodiment may be realized by the example communication system depicted in the view 3050 of FIG. 30B. For example, the communication interface may be realized by or at least include the external data ports 3052, 3054A, and 3054B. The PLC 3056 may further represent both (i) the processor configured to perform the method 2900 and (ii) the data storage containing the executable instructions for doing so. And other example implementations could be presented here as well.

Arbitrating Among Multiple Market-Data Feeds

Figure 34:
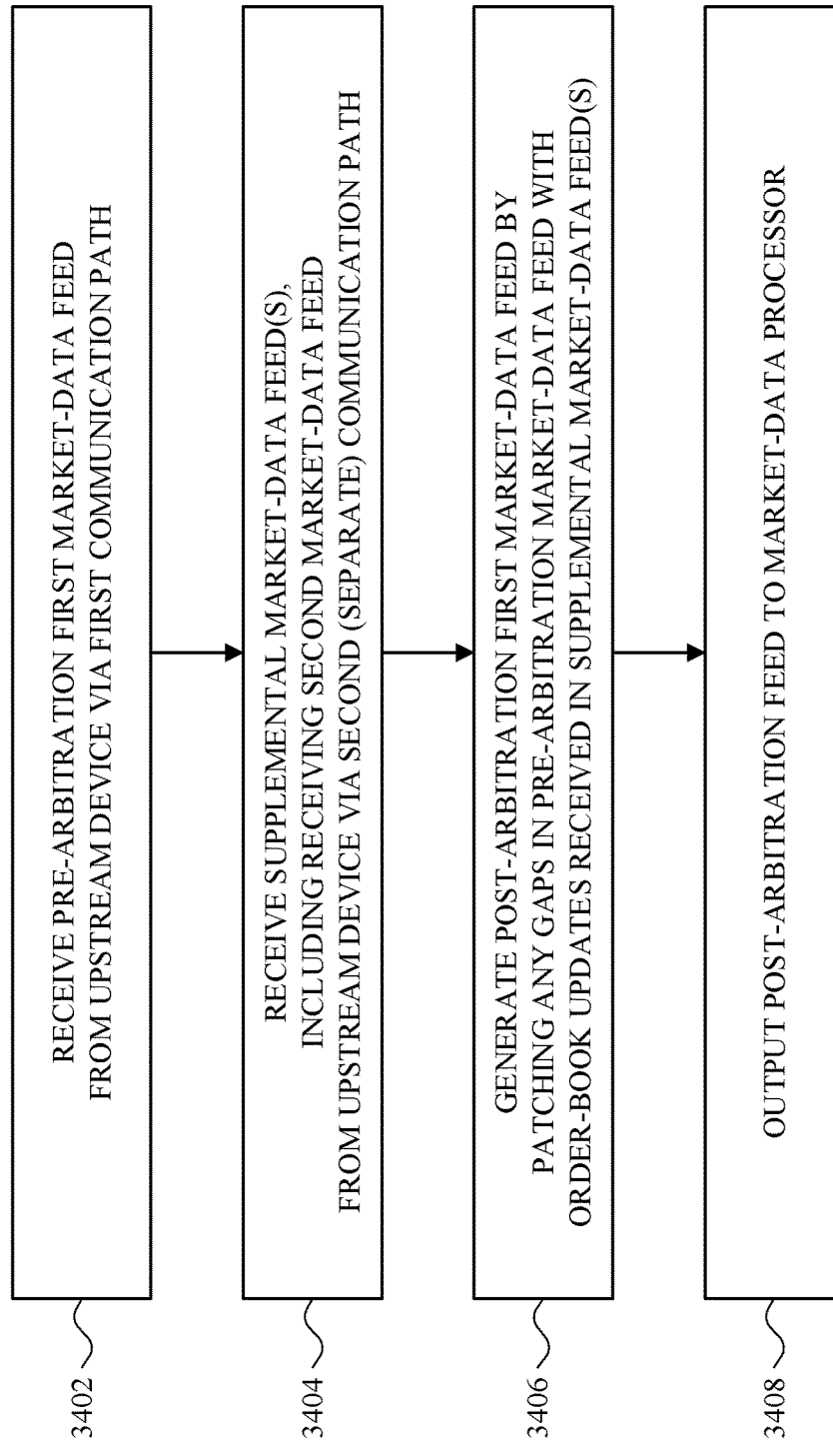
FIG. 34 is a flowchart of an example method, in accordance with at least one embodiment.

FIG. 34 is a flowchart of an example method, in accordance with at least one embodiment. In particular, FIG. 34 depicts a method 3400 that may be carried out by an arbitration device or by an arbitration module of a downstream device, among other possibilities. For simplicity, the method 3400 is for the most part described below as being carried out by the arbitration device 2708, though some aspects would be different in embodiments in which the method 3400 is carried out by an arbitration module of a downstream device. The basic difference is that, in embodiments in which the method 3400 is carried out by the arbitration device 2708, the "market-data processor" that is introduced in step 3408 refers to the downstream device 2706, whereas in embodiments in which the method 3400 is carried out by the arbitration module 2808 of the downstream device 2806, the "market-data processor" that is introduced in step 3408 refers to the feed-processing module 2810 of the downstream device 2806.

At step 3402, the arbitration device 2708 receives the pre-arbitration first market-data feed 2718A from the MDPD 2704 via the first communication path 2731. As explained above, the pre-arbitration first market-data feed 2718A is a feed of order-book updates to respective ticker symbols in a plurality of ticker symbols, and each order-book update in the pre-arbitration first market-data feed 2718A includes a respective sequence number.

At step 3404, the arbitration device 2708 receives, from the MDPD 2704, one or more supplemental market-data feeds of order-book updates to respective ticker symbols in the plurality of ticker symbols. Each order-book update in each supplemental market-data feed also includes a respective sequence number. Moreover, order-book updates having the same sequence numbers in both the pre-arbitration first market-data feed 2718A and a supplemental market-data feed represent the same updates to the same ticker symbols. Additionally, receiving the aforementioned one or more supplemental market-data feeds includes receiving the second market-data feed 2718B via the second communication path 2732.

As stated above, in embodiments in which the second market-data feed 2718B is transmitted by the MDPD 2704 as a copy of the pre-arbitration first market-data feed 2718A, the sequence numbers referred to in this description of the method 3400 could be either feed-level sequence numbers or symbol-level sequence numbers; that is, the herein-described arbitration could be done globally (with respect to the pre-arbitration first market-data feed 2718A) based on feed-level sequence numbers or it could be done on a symbol-by-symbol basis using symbol-level sequence numbers. Partition-level sequence numbers are contemplated as well.

In embodiments in which the second market-data feed 2718B is a superset of the pre-arbitration first market-data feed 2718A, however, arbitration based on feed-level sequence numbers would not work because the feed-level sequence numbers in the two feeds would not match up (e.g., the 500th overall order-book update in the pre-arbitration first market-data feed 2718A would not necessarily be the same substantive update to the same ticker symbol as the 500th overall order-book update in the second market-data feed 2718B, except for the circumstance in which the first 500 order-book updates in the second market-data feed 2718B were also included in the pre-arbitration first market-data feed 2718A); in those embodiments (in which the second market-data feed 2718B is a superset of the pre-arbitration first market-data feed 2718A), therefore, the arbitration would typically be conducted on a symbol-by-symbol basis, and the referenced sequence numbers would therefore be symbol-level sequence numbers.

In some embodiments, the arbitration device 2708 carrying out step 3404 (i.e., receiving the one or more supplemental market-data feeds from the MDPD 2704) involves the arbitration device 2708 receiving either or both of (i) a time-delayed duplicate of the pre-arbitration first market-data feed 2718A via the first communication path 2731 and (ii) a time-delayed duplicate of the second market-data feed 2718B via the second communication path 2732.

As another possibility, in some embodiments, the arbitration device 2708 receiving the one or more supplemental market-data feeds from the MDPD 2704 involves the arbitration device 2708 receiving one or more gap-fill responses (each containing one or more respective order-book updates) from the MDPD 2704.

In at least one embodiment, the arbitration device 2708 arbitrates among order-book updates in a manner that is agnostic as to whether the arbitration device 2708 receives those order-book updates in the pre-arbitration first market-data feed 2718A, in a time-delayed duplicate of the pre-arbitration first market-data feed 2718A, in the second market-data feed 2718B, in a time-delayed duplicate of the second market-data feed 2718B, as part of a gap-fill response, or as part of some other market-data feed not explicitly mentioned here.

At step 3406, the arbitration device 2708 generates the post-arbitration first market-data feed 2720. In at least one embodiment, carrying out step 3406 involves carrying out three substeps. And it is explicitly noted that, in at least one embodiment, the arbitration device 2708 carries out these three substeps substantially simultaneously with respect to different order-book updates—i.e., different order-book updates can be in different stages of the herein-described processing at substantially the same time; indeed, this is true of the steps of the method 3400 as a whole, as well as of the other methods described in this disclosure.

Returning now to the aforementioned three substeps (i.e., subprocesses) of step 3406, the first such substep is the arbitration device 2708 including, in the post-arbitration first market-data feed 2720, all of the order-book updates that the arbitration device 2708 receives in carrying out step 3402 (i.e., in the pre-arbitration first market-data feed 2708). The second such substep is the arbitration device 2708 identifying gaps of one or more order-book updates missing from the pre-arbitration first market-data feed 2718A. The third such substep is the arbitration device patching, in the post-arbitration first market-data feed 2720, one or more of the gaps identified as missing from the pre-arbitration first market-data feed 2718A with one or more matching-sequence-numbered order-book updates received in carrying out step 3404 (i.e., in at least one of the supplemental market-data feeds).

Thus, building on the above description of step 3406, it can be seen that, in at least one embodiment, the pre-arbitration first market-data feed 2718A is the primary feed that the downstream device 2706 is looking to successfully receive from the MDPD 2704; as such, in cases where nothing ever goes wrong with the delivery of any order-book updates in the pre-arbitration first market-data feed 2718A, none of the one or more supplemental market-data feeds are ever needed; but in cases where one or more order-book updates in the pre-arbitration first market-data feed 2718A are not successfully received by the arbitration device 2708 and passed on to the downstream device 2706, the arbitration device 2708 uses the one or more supplemental market-data feeds (e.g., the second market-data feed 2718B, a time-delayed duplicate of the pre-arbitration first market-data feed 2718A, a time-delayed duplicate of the second market-data feed 2718B, and/or one or more gap-fill responses) to patch detected gaps in the pre-arbitration first market-data feed 2718A. Moreover, in at least one embodiment, at least one of the supplemental-market-data feeds is received by the arbitration device 2708 from somewhere other than the MDPD 2704.

At step 3408, the arbitration device 2708 outputs the post-arbitration first market-data feed to a market-data processor; in this described embodiment, that market-data processor is the downstream device 2706. In other embodiments in which the method 3400 is carried out by the arbitration module 2808 of the downstream device 2806, the market-data processor is the feed-generation module 2810. And certainly other example architectures could be described here.

In at least one embodiment, the arbitration device 2708—perhaps as part of the patching substep of step 3406—sends one or more gap-fill requests to the MDPD 2704, where those one or more gap-fill requests are directed to one or more gaps identified as missing from the pre-arbitration first market-data feed 2718A. In various different embodiments, the arbitration device 2708 may send such gap-fill requests to the MDPD 2704 along one or more of the first communication path 2731, the second communication path 2732, and a third communication path that is separate and distinct from both the first communication path 2731 and the second communication path 2732. And as described above, among the one or more supplemental market-data feeds—that the arbitration device 2708 (i) receives at step 3404 and (ii) draw from for the patching substep of step 3406—may be a feed of gap-fill responses from the MDPD 2704. Like the gap-fill requests, these gap-fill responses may be sent along one or more of the first communication path 2731, the second communication path 2732, and a third communication path that is separate and distinct from both the first communication path 2731 and the second communication path 2732. One example third communication path is depicted in and described below in connection with FIG. 35.

Figure 35:
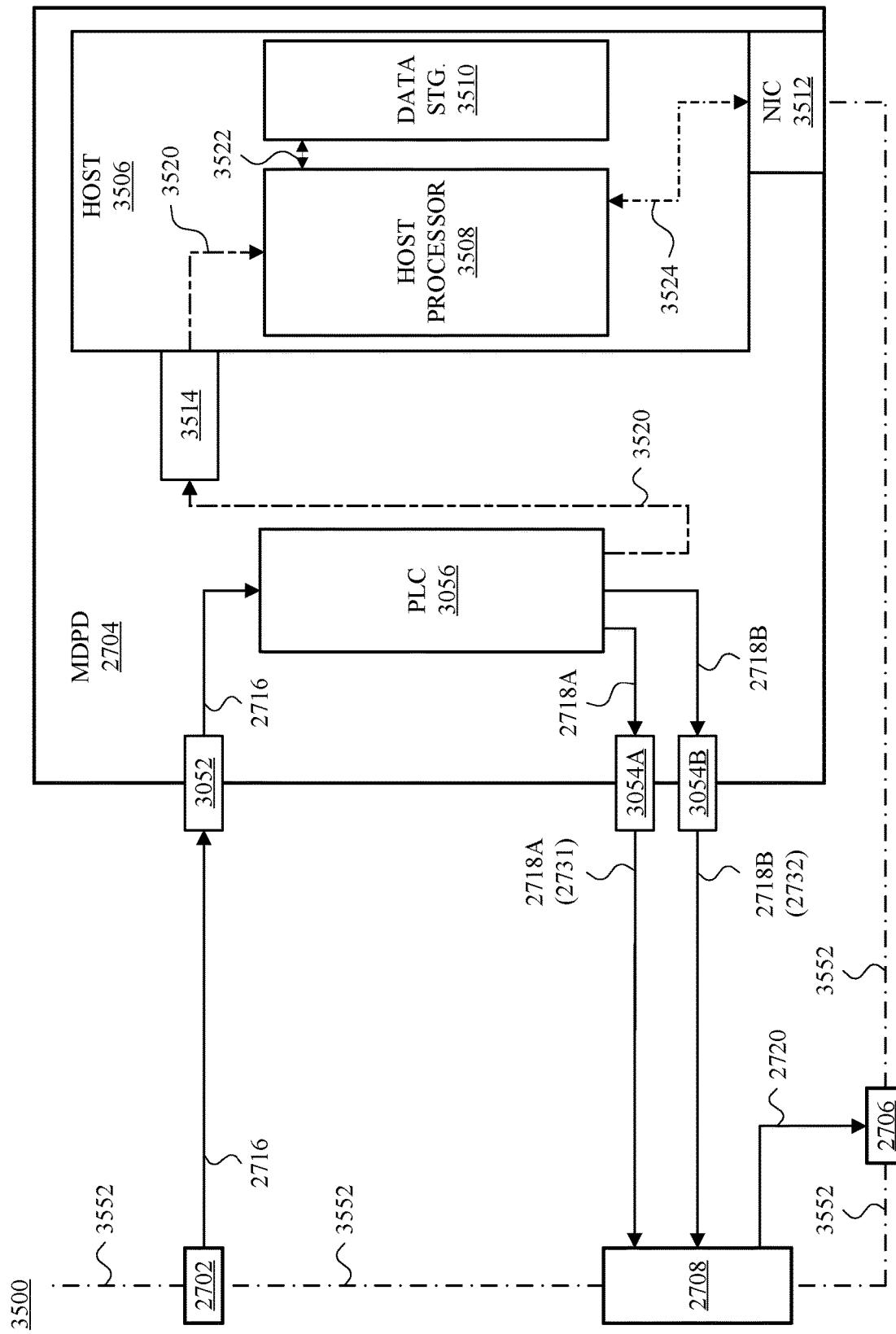
FIG. 35 is a seventh view of the example communication system of FIG. 27, in accordance with at least one embodiment.

FIG. 35 is a seventh view of the example communication system of FIG. 27, in accordance with at least one embodiment. In particular, FIG. 35 depicts a view 3500 that has a number of elements in common with a number of previous figures. Among these elements are (i) the MDPD 2704 receiving (via the external data port 3052) the input feed 2716 from the upstream device 2702; (ii) the MDPD 2704 using the PLC 3056 to generate both the pre-arbitration first market-data feed 2718A and the second market-data feed 2718B; (iii) the MDPD 2704 transmitting the pre-arbitration first market-data feed 2718A (via the external data port 3054A) to the arbitration device 2708 via the first communication path 2731; (iv) the MDPD 2704 transmitting the second market-data feed 2718B (via the external data port 3054B) to the arbitration device 2708 via the second communication path 2732; and (v) the arbitration device 2708 generating—and outputting to the downstream device 2706—the post-arbitration first market-data feed 2720.

The view 3500 also depicts the MDPD 2704 as including a host 3506 that includes a host processor 3508 and host data storage 3510. The host 3506 is connected via a data connection 3524 to a NIC 3512. The PLC 3056 is depicted as generating an archival copy 3520 of the input feed 2716, and transmitting that archival copy 3520 of the input feed 2716 to the host processor via a communications bus 3514. The host processor 3508 archives the archival copy 3520 of the input feed 2716 in the host data storage 3510, which the host processor accesses via a data connection 3522.

Also depicted in the view 3500 is a data network 3552 that may be similar to any one or more of the above-described data networks 352, 1952, and 2652. In at least one example arrangement, as depicted in the view 3500, the devices having their own respective connections to the data network 3552 include the upstream device 2702, the MDPD 2704 (via the NIC 3512), the downstream device 2706, and the arbitration device 2708. In various different embodiments, one or more of those devices might not have a connection to the data network 3552; for example, in one embodiment, the arbitration device 2708 has a connection to the data network 3552 but the downstream device 2706 does not. And certainly other examples could be listed here as well.

Furthermore, as is explained above, the depiction of, e.g., the arbitration device 2708's connection via the data network 3552 to the NIC 3512 of the MDPD 2704 passing through the downstream device 2706 is for convenience only; it is not at all a requirement that such connection pass through the downstream device 2706; the intention is only to show that all three devices (the MDPD 2704, the downstream device 2706, and the arbitration device 2708 (and in this case also the upstream device 2702)) have connections to a common data network, which in this particular instance is the data network 3552.

In at least one embodiment, the above-mentioned third communication path—via which the arbitration device 2708 (i) sends gap-fill requests to the MDPD 2704 and (ii) receives gap-fill responses from the MDPD 2704—includes the data network 3552 to which the MDPD 2704 is connected via the NIC 3512. In at least one embodiment, as depicted in FIG. 35, the MDPD 2704 operates according to division-of-labor principles similar to those described above in connection with at least FIGS. 19-26.

As described above, in at least one embodiment, the arbitration device 2708 identifies any gaps missing from the pre-arbitration first market-data feed 2718A and—to the extent possible based on the content of the one or more received supplemental market-data feeds—attempts to patch all such gaps as part of generating the post-arbitration first market-data feed 2720, which the arbitration device 2708 outputs to the downstream device 2706 at step 3408.

It may occur in some instances that completely patching all such gaps does not happen; in at least one such instance, the market-data processor (e.g., the downstream device 2706) attempts to address this situation by (i) identifying one or more of the unpatched gaps in the post-arbitration first market-data feed 2720; (ii) transmitting, to the upstream device 2708, one or more market-data-processor-initiated gap-fill requests directed to the identified one or more unpatched gaps in the post-arbitration first market-data feed 2720; (iii) receiving, from the upstream device 2708, one or more market-data-processor-terminated gap-fill responses that include the one or more order-book updates that correspond to the transmitted one or more market-data-processor-initiated gap-fill requests; and (iv) supplementing the post-arbitration first market-data feed with the one or more order-book updates included in the received one or more market-data-processor-terminated gap-fill responses.

Irrespective of whether the arbitration device 2708 is successful in completely patching all identified gaps in the pre-arbitration first market-data feed 2718A as part of generating the post-arbitration first market-data feed 2720 at step 3406, it is the case in at least one embodiment that the arbitration device 2708 attempts to do so at least in part by carrying out an arbitration process among all received order-book updates in a manner that, for each received order-book update, is agnostic as to whether that order-book update was received by the arbitration device 2708 in the pre-arbitration first market-data feed 2718A or in a supplemental market-data feed. An example of such an update-feed-of-origin-agnostic process is depicted in and described below in connection with FIG. 36.

In a practical sense, in implementations in which the arrangement of the first communication path 2731 and the respective arrangements of the various delivery paths of each of the supplemental market-data feeds (such as the second communication path 2732, TCP/IP gap-fill communication over the data network 3552, and/or the like) make it likely that each of the supplemental market-data feeds will lag the pre-arbitration first market-data feed 2718A, being agnostic as to the feed in which each order-book update arrives when building the post-arbitration first market-data feed 2720 may take the effective form of identifying gaps in the pre-arbitration first market-data feed 2718A and patching (or at least attempting to patch) those gaps with order-book updates received among the supplemental market-data feeds.

Figure 36:
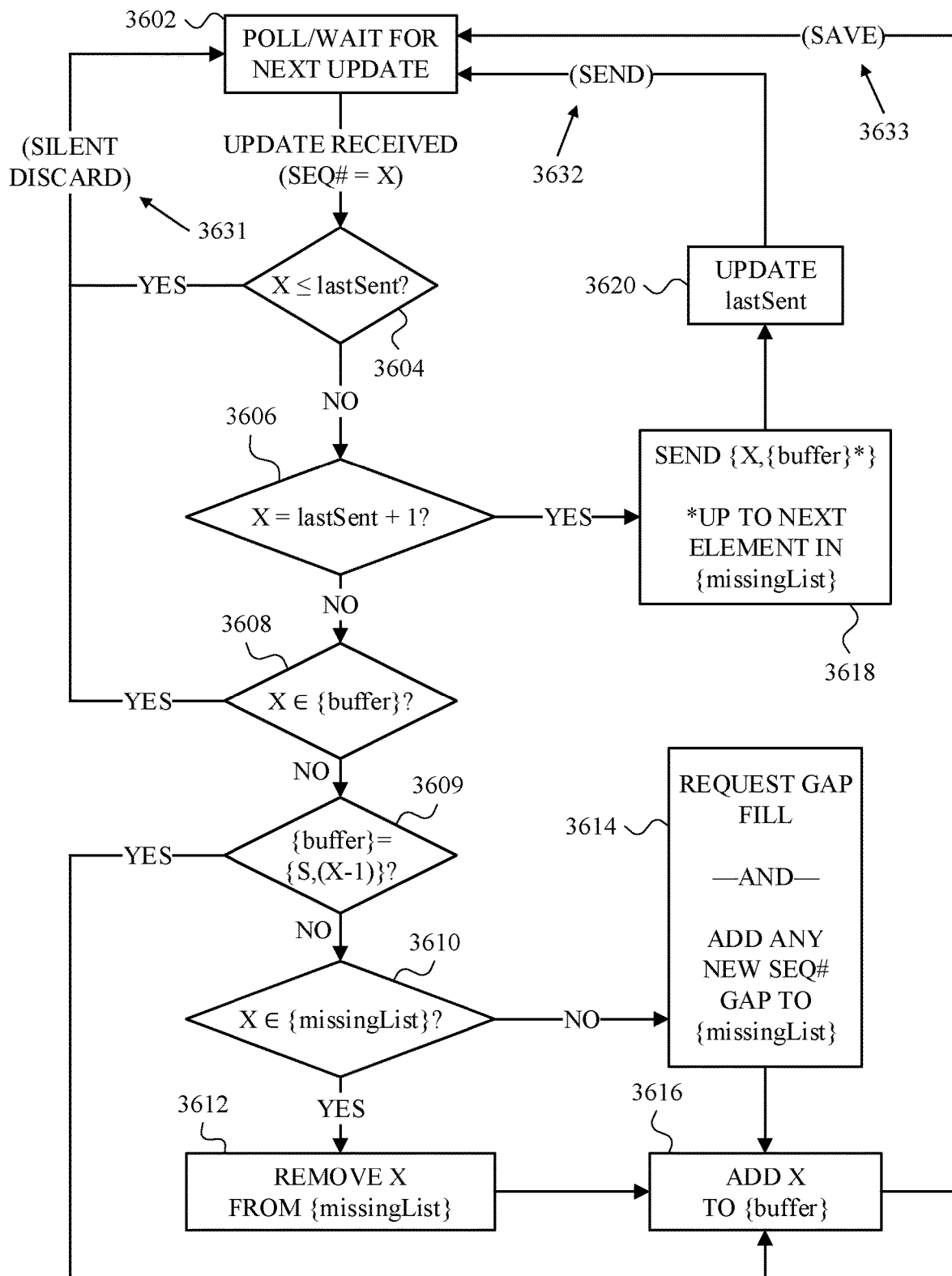
FIG. 36 is a flowchart of an example implementation of one of the steps of the example method of FIG. 34, in accordance with at least one embodiment.

FIG. 36 is a flowchart of an example implementation of one of the steps of the example method of FIG. 34, in accordance with at least one embodiment. In particular, FIG. 36 depicts an order-book-update disposition process 3600 that may be carried out by the arbitration device 2708 as part of carrying out the above-described step 3406 of the method 3400. As can be seen in FIG. 36, the process 3600 begins at step 3602, where the process 3600 polls or waits for the next order-book update (again, regardless of in which market-data feed that next order-book update may arrive or have arrived at the arbitration device 2708). Step 3602 serves as a sort of home base for the process 3600, in that the process starts at step 3602 and always returns to step 3602 (unless the process 3600 is terminated, a possibility that is outside the scope of FIG. 36) via one of three order-book-update disposition paths: a silent-discard path 3631, a send-update path 3632, or a save-update path 3633. These three paths correspond with the three possible dispositions of each order-book update by the process 3600—i.e., each received order-book update is silently discarded, sent (i.e., output) in the post-arbitration first market-data feed 2720, or saved (i.e., buffered) for later sending in the post-arbitration first market-data feed 2720.

Prior to describing the logical flow of the process 3600, and prior to presenting specific examples of order-book updates traversing that logical flow, a few programming constructs that the process 3600 maintains in at least one embodiment are introduced here.

First, the process 3600 maintains a record in data storage of the last-output sequence number of each successive order-book update that is output in the post-arbitration first market-data feed 2720 to the market-data processor, which in this example description is the downstream device 2706. Thus, as described below, each time the process 3600 outputs one or more order-book updates in the post-arbitration first market-data feed 2720, the process 3600 updates that record—referred to herein as 'lastSent'—to be equal to the highest sequence number of an order-book update that has been output (thus far) in the post-arbitration first market-data feed 2720.

Second, the process 3600 maintains in data storage an initially empty missing-order-book-update list of sequence numbers that correspond respectively with any missing order-book updates. In general, the process 3600 considers a given order-book update to be missing if the process 3600 has received at least one order-book update having a sequence number higher than that of the given order-book update but has not yet received the given order-book update. In this description, the missing-order-book-update list is referred to as 'the missingList'.

Third, the process 3600 maintains in data storage an initially empty buffered-order-book-update list of sequence numbers that correspond respectively with any buffered order-book updates. In this description, the buffered-order-book-update list is referred to as simply 'the buffer'. As a general matter, the process 3600 adds a given order-book update to the buffer when the process 3600 has received the given order-book update but the given order-book update has a sequence number that is higher than at least one sequence number on the missingList.

One additional convention that is used in this description of the process 3600 is that, in each instance of a given order-book update being received (and therefore causing a transition in the process 3600 from step 3602 to step 3604), that given order-book update is referred to as 'the current order-book update' and the sequence number of that given order-book update is referred to as 'the current sequence number'. Moreover, the current sequence number is represented by 'X' in FIG. 36. As a reminder, the process 3600 is agnostic to whether the current order-book update was received by the arbitration device in the pre-arbitration first market-data feed 2718A or in a supplemental market-data feed.

Assuming now that a current order-book update has been received at step 3602, the process 3600 checks at step 3604 whether the current sequence number is less than or equal to lastSent. If so, this means that an order-book update that is substantively equivalent to—i.e., having a sequence number that matched that of—the current order-book update has already been sent (i.e., output in the post-arbitration first market-data feed 2720), and the process 3600 therefore silently discards the current order-book update—an action (or perhaps more accurately a lack of action) that is referred to hereinafter as returning to the step 3602 on the silent-discard path 3631.

If it is determined at step 3604, however, that the current sequence number is greater than lastSent, this means that the current order-book update is one that the process 3600 had not seen before, and must therefore determine whether the current order-book update can be sent right away or whether instead the current order-book update needs to be buffered now for sending later.

The process 3600 begins this assessment at step 3606 by checking whether the current sequence number is exactly one greater than lastSent. If so, the process 3600 proceeds to step 3618, where the process 3600 sends X into the post-arbitration first market-data feed 2720; also as part of step 3618, the process 3600 sends (into the post-arbitration first market-data feed 2720) any order-book updates in the buffer (and there may be none) that (i) sequentially follow the current sequence number and (ii) precede a lowest sequence number (other than the current sequence number, of course) that is in the missingList (and there may be none)—i.e., the one or more order-book updates (if any) in the buffer that precede a next element (if any) after the current sequence number in the missingList. After completing any send operations that can be done at step 3618, the process 3600 proceeds to update lastSent at 3620 with the highest sequence number among the one or more order-book updates sent at step 3618. The process 3600 then returns to step 3602 on the send-update path 3632.

If it is determined at step 3606, however, that the current sequence number is not exactly one greater than lastSent, this—coupled with the determination having been made at step 3604 that the current sequence number is greater than lastSent—means that the current sequence number is at least two numbers greater than lastSent. What that means is that the process 3600 should buffer the current order-book update unless the buffer already contains the current order-book update (i.e., already contains an order-book update having a sequence number equal to the current sequence number).

Thus, at step 3608, the process 3600 checks whether the buffer already contains the current order-book update (i.e., "X∈{buffer}?" asks "Is X an element in the set {buffer}?"). If the buffer does contain the current order-book update, the process 3600 returns to step 3602 on the silent-discard path 3631. If, however, the buffer does not contain the current order-book update, the process 3600 proceeds to step 3609.

At step 3609, the process 3600 checks whether the buffer currently ends with the order-book update having the sequence number that immediately precedes the current sequence number, which would indicate that the current order-book update just needs to be buffered as well (i.e., if the current order-book update immediately follows the order-book update that is currently sitting at the end of the buffer, the arrival of the current order-book update would not be a sign of a new gap; furthermore, the presence of the immediately preceding order-book update at the end of the buffer indicates that the process 3600 concluded that it could not send that immediately preceding order-book update (because there must be a missing order-book update that precedes the one at the end of the buffer), and so the conclusion would necessarily be the same with the current order-book update.

The question posed at step 3609—i.e., whether the buffer currently ends with the order-book update having the sequence number that immediately precedes the current sequence number—is represented in FIG. 36 with the notation "{buffer}={S,(X−1)}?", essentially asking whether the current contents of the buffer are some set 'S' of order-book updates followed by the order-book update having the sequence number (i.e., 'X−1') that immediately precedes the current sequence number 'X', where 'S' could be the empty set, a set of one order-book update, or a set of multiple order-book updates. If it is determined at step 3609 that the buffer does currently end with the order-book update having the sequence number 'X−1' that immediately precedes the current sequence number 'X', the process 3600 proceeds to the below-described step 3616. If, however, it is determined at step 3609 that the buffer does not currently end with the order-book update having the sequence number 'X−1' that immediately precedes the current sequence number 'X', the process 3600 proceeds to the below-described step 3610.

At step 3610, the process 3600 checks whether the current sequence number is already on the missingList (i.e., "X∈{missingList}?"). If so, this means that the process 3600 had previously identified the current order-book update as missing and has therefore been waiting for the current order-book update, and the process 3600 accordingly removes the current sequence number from the missing list at step 3612.

If it is determined at step 3610, however, that the current sequence number is not yet on the missingList, this means that this particular instance through the process 3600 is the first occurrence of identifying at least the current order-book update as being missing. And in fact, if the difference between the current sequence number and lastSent is more than two, this indicates that a range of multiple order-book updates is now to be considered missing. Accordingly, the process 3600 proceeds at step 3614 to (i) send, to the MDPD 2704, a gap-fill request directed to the one or more order-book updates now considered missing (i.e., any order-book updates having sequence numbers greater than lastSent and less than the current sequence number) and (ii) add to the missingList the same sequence number or range of sequence numbers to which the gap-fill request was directed.

After (i) answering step 3609 in the affirmative, (ii) carrying out step 3612, or (iii) carrying out step 3614, the process 3600 proceeds to add the current order-book update to the (end of the) buffer at step 3616 and then return to step 3602 on the save-update path 3633.

Using the logic of the example process 3600 that is depicted in and described above in connection with FIG. 36, the readers attention is now directed to an example timetable that spans FIG. 37A, FIG. 37B, and FIG. 37C. In particular, FIG. 37A, FIG. 37B, and FIG. 37C respectively depict the first, second, and third of three parts of an example timetable 3700 that tracks an example handling by the arbitration device 2708 of multiple example order-book updates received among multiple different market-data feeds, in accordance with at least one embodiment.

It can be seen that the timetable 3700 has the following eleven columns, the contents of which are explained below.

TIME

In each row, this column lists the time period (and subperiod thereof, as explained below) in which 'the current order-book update'—as that term is used in the above description of the process 3600—is processed through the logic of the process 3600. Each row of the timetable 3700 corresponds to a different subperiod (of a time period) during which the (exactly one) order-book update that is listed among the second through sixth columns of the timetable 3700 is 'the current order-book update'.

As a reminder, 'the current order-book update' has 'the current sequence number' that is represented by 'X' in FIG. 36.

It is noted that 17 time periods are depicted in the timetable 3700, and that each of these time periods contains between 1 and 5 subperiods that are labeled using notation such as 'T08B*'.

Within that notation, the 'T08' identifies the time period while the 'B*' identifies the subperiod.

Each time period is named to correspond with the sequence number of the order-book update of which the first of two copies is expected via the first communication path 2731 (abbreviated 'P1' in the timetable 3700) during that particular time period. Thus, during 'T01', the first of two copies of order-book update #1 is expected via P1, and during 'T02', the first of two copies of order-book update #2 is expected via P1, and so on.

The labels for the five possible subperiods within each time period are, in order, 'A', 'A*', 'B', 'B*', and 'C'. Those labels are further explained below in connection with the second through sixth columns, respectively, of the timetable 3700.

The division of each time period into subperiods illustrates that order-book updates can arrive for processing at substantially the same time and that, in an embodiment such as the one being described here, the arbitration device 2708 takes a round-robin approach to processing order-book updates arriving via the various respective market-data feeds that are described in this example. Moreover, it is noted that, even in such an approach, the process 3600 may have no visibility regarding which feed each particular order-book update arrives in; to wit, a separate process could simply queue order-book updates in the order they arrive at the arbitration device 2708, and step 3602 could represent the process 3600 pulling an update at a time from such a queue according to a first-in-first-out (FIFO) methodology.

As is explained below, the example scenario of the timetable 3700 contemplates five market-data feeds being received by the arbitration device 2708. Each of those feeds is assigned a subperiod label of 'A', 'A\*', 'B', 'B\*', or 'C' in the timetable 3700. The designation of a subperiod within a time period (e.g., the subperiod 'T08B' within the time period 'T08') corresponds to the arbitration device 2708 using the process 3600 to process whatever order-book update was received in the corresponding feed—i.e., the feed that has that assigned subperiod label—for processing during that time period.

For a number of different reasons, the timetable 3700 omits some rows that could be depicted.

With respect to the first 15 time periods (i.e., 'T01' through 'T15'), rows being omitted corresponds to this example fact pattern dictating that no order-book update arrived in the corresponding market-data feed for processing during the corresponding subperiod of that time period. For example, the timetable 3700 does not include a row 'T05A' or a row 'T05A\*'; as such, the reader should conclude that, in this example scenario, no order-book update arrived for processing during time period 'T05' in either the market-data feed designated 'A' or the market-data feed designated 'A\*'. Nor is there a row 'T05B\*' or a row 'T05C', indicating similarly that no order-book update arrived for processing during time period 'T05' in either the market-data feed designated 'B\*' or the market-data feed designated 'C'. (Which market-data feeds are assigned such labels is explained below.)

With respect to the final 2 time periods (i.e., 'T16' and 'T17'), the omission of the rows other than 'T16A' and 'T17A' is for brevity, and makes no substantive difference since, as is explained below, the arbitration device 2708 is fully 'caught up' at that point.

P1 (A)

In each row, this column lists the sequence number of the order-book update (if any) that arrived in the 'A' feed via 'P1' for processing during the corresponding time period (and that is processed during the subperiod corresponding to that row).

The 'A' feed in this embodiment is the above-described pre-arbitration first feed 2718A.

In this embodiment, 'P1' is an abbreviation for the above-described first communication path 2731.

P1 (A\*)

In each row, this column lists the sequence number of the order-book update (if any) that arrived in the 'A\*' feed via 'P1' for processing during the corresponding time period (and that is processed during the subperiod corresponding to that row).

The 'A\*' feed in this embodiment is the above-described time-delayed duplicate of the pre-arbitration first market-data feed 2718A.

In this example, the second 'P1' copy of a given order-book update is expected to arrive in the 'A\*' feed two time periods after the first 'P1' copy of the given order-book update is expected to arrive in the 'A' feed.

As an example, it can be seen in FIG. 37A that (i) the first 'P1' copy of order-book update #1 arrives in the 'A' feed for processing in time period 'T01' (and in particular is processed in subperiod 'T01A') and (ii) the second (and ultimately discarded) 'P1' copy of order-book update #1 arrives in the 'A\*' feed for processing in time period 'T03' (and in particular is processed in subperiod 'T03A\*').

P2 (B)

In each row, this column lists the sequence number of the order-book update (if any) that arrived in the 'B' feed via 'P2' for processing during the corresponding time period (and that is processed during the subperiod corresponding to that row).

The 'B' feed in this embodiment is the above-described the second market-data feed 2718B.

In this embodiment, 'P2' is an abbreviation for the above-described second communication path 2732.

P2 (B\*)

In each row, this column lists the sequence number of the order-book update (if any) that arrived in the 'B\*' feed via 'P2' for processing during the corresponding time period (and that is processed during the subperiod corresponding to that row).

The 'B\*' feed in this embodiment is the above-described time-delayed duplicate of the second market-data feed 2718B.

Similar to the above-described temporal relationship between the 'A' feed and the 'A\*' feed, in this example, the second 'P2' copy of a given order-book update is expected to arrive in the 'B\*' feed two time periods after the first 'P2' copy of the given order-book update is expected to arrive in the 'B' feed.

As an example, it can be seen in FIG. 37A that (i) the first (and ultimately discarded) 'P2' copy of order-book update #2 arrives in the 'B' feed for processing in time period 'T06' (and in particular is processed in subperiod 'T06B') and (ii) the second (and also ultimately discarded) 'P2' copy of order-book update #2 arrives in the 'B\*' feed for processing in time period 'T08' (and in particular is processed in subperiod 'T08B\*').

G-F RESP (C)

In each row, this column lists the sequence number of the order-book update (if any) that arrived in the 'C' feed via the 'G-F RESP (Gap-Fill Response)' for processing during the corresponding time period (and that is processed during the subperiod corresponding to that row).

The 'C' feed in this embodiment is the above-described series of gap-fill responses sent from the MDPD 2704 to the arbitration device 2708 in response to the above-described series of gap-fill requests sent from the arbitration device 2708 to the MDPD 2704.

In this embodiment, 'G-F RESP' is an abbreviation for the above-described third communication path that extends from the arbitration device 2708, along the data network 3552, to the NIC 3512 of the host 3506 of the MDPD 2704 as depicted in FIG. 35.

In this described example, an elapsed time of 8 of the example time periods is assumed between (i) the arbitration device 2708 sending a given gap-fill request that is addressed to the MDPD 2704 and (ii) the arbitration device 2708 receiving the corresponding gap-fill response to the given gap-fill request from the MDPD 2704.

As an example, it can be seen (i) in FIG. 37A that the arbitration device 2708 sends a gap-fill request directed to order-book update #3 in time period 'T06' and (ii) in FIG. 37C that the arbitration device receives the corresponding gap-fill response containing the (ultimately discarded) requested copy of order-book update #3 for processing in time period 'T14' (and in particular that gap-fill response is processed in subperiod 'T14C').

{BUFFER}

In each row, this column lists the contents (or lack thereof) of the 'buffer'—that is described above in connection with FIG. 36—as a result of (i.e., after or at the end of) the processing by the process 3600 of the current order-book update for that row during the subperiod corresponding to that row.

Consistent with the previous statement, the evaluation of the contents (if any) of the 'buffer' that occur during a given subperiod (i.e., step 3608 or step 3609) is conducted with respect to the contents (if any) of the 'buffer' from the immediately preceding subperiod. Moreover, as stated above, the 'buffer' is initialized to an empty state.

As an example, it can be seen in FIG. 37C that the contents of the 'buffer' are (i) {7,8,9,10,11,12,13,14} after the processing that occurs in connection with subperiod 'T14C' and (ii) {7,8,9,10,11,12,13,14,15} as a result of the processing that occurs in connection with the very next subperiod, which is 'T15A'.

REQ G-F

In each row, this column lists (i) the text '---' if no gap-fill request was sent as a result of the processing during the subperiod corresponding to that row or (ii) the sequence number or sequence numbers of the one or more order-book updates that were requested if a gap-fill request was sent as a result of the processing during the subperiod corresponding to that row.

As examples, it can be seen in FIG. 37A that (i) no gap-fill request was sent as a result of the processing during the subperiod 'T05B' and (ii) a gap-fill request for order-book update #3 was sent as a result of the processing during the subperiod 'T06A*'.

{MISSING}

In each row, this column lists the contents (or lack thereof) of the 'missingList'—that is described above in connection with FIG. 36—as a result of (i.e., after or at the end of) the processing by the process 3600 of the current order-book update for that row during the subperiod corresponding to that row.

Consistent with the previous statement, the evaluation of the contents (if any) of the 'missingList' that occur during a given subperiod (i.e., step 3610) is conducted with respect to the contents (if any) of the 'missingList' from the immediately preceding subperiod. Moreover, as stated above, the 'missingList' is initialized to an empty state.

As examples, it can be seen in FIG. 37A that the contents of the 'missingList' are (i) {3,5,6} after the processing that occurs in connection with subperiod 'T07A' and (ii) {3,6} as a result of the processing that occurs in connection with the very next subperiod, which is 'T07A*'.

SEND

In each row, this column lists (i) the text '---' if no order-book updates were sent as a result of the processing during the subperiod corresponding to that row or (ii) the sequence number(s) of the one or more order-book updates that were sent if one or more order-book updates were sent as a result of the processing during the subperiod corresponding to that row. In this context, as described above, the arbitration device 2708 "sending" a given order-book update takes the form of the arbitration device 2708 outputting the given order-book update in the post-arbitration feed 2720.

As examples, it can be seen in FIG. 37A that (i) the processing during the subperiod 'T02A' results in the sending of order-book update #2, (ii) the processing during the subperiod 'T03A*' does not result in the sending of any order-book updates, and (iii) the processing during the subperiod 'T07B' results in the sending of order-book updates #3, #4, and #5.

LAST SENT

In each row, this column lists the highest sequence number among the one or more order-book updates that have been sent—i.e., output in the post-arbitration first market-data feed 2720—as a result of (i) the processing during the subperiod corresponding to that row and (ii) the processing during the respective subperiods corresponding to all rows that precede that row in the timetable 3700.

This column corresponds with the 'lastSent' value that is described above in connection with FIG. 36 as being maintained as part of the repeated iterative processing through the logic of the process 3600.

Consistent with the other columns in the timetable 3700, the value of 'lastSent' in a given row is the result of the processing by the process 3600 of the current order-book update for that row during the subperiod corresponding to that row.

In particular, the value of 'lastSent' either (i) remains unchanged (when the processing of the current order-book update returns to step 3602 on either the silent-discard path 3631 or the save-update path 3633) or (ii) is updated at step 3620 (when the processing of the current order-book update returns to step 3602 on the send-update path 3632).

Consistent with the previous statement, any use of the value of 'lastSent' in any comparisons (i.e., steps 3604 and 3606) that occur during a given subperiod use the immediately preceding value of 'lastSent'. Moreover, the value of 'lastSent' is initialized to '0' for use by the process 3600 during the first subperiod (here, the subperiod 'T01A').

As examples, it can be seen in FIG. 37A, FIG. 37B, and FIG. 37C that (i) 'lastSent' is equal to '2' for all of the subperiods 'T02A' (the result of which is the sending of order-book update #2) through 'T07A*' (which immediately precedes the subperiod 'T07B', which results in the sending of order-book updates #3, #4, and #5) and (ii) 'lastSent' is equal to '5' for all of the subperiods 'T07B' through 'T15B*' (which immediately precedes the subperiod 'T15C', which results in the sending of order-book updates #6 through #15).

Given the above introduction to the timetable 3700, what follows below is a step-by-step (indeed, subperiod-by-subperiod) walk through the timetable 3700. As one additional note, any order-book update that ends up being silently discarded is displayed in the timetable 3700 with a '(D)' after the corresponding order-book update sequence number. One example of this can be seen in FIG. 37A where the order-book update #1 is shown as an order-book update that ends up being silently discarded in the subperiod 'T03A*' with the notation '1(D)'.

The only order-book update that arrives for processing during time period 'T01' is order-book update #1 in feed 'A' via 'P1'. This makes sense in that, in this embodiment, feed 'A' via 'P1' is the expected feed in which and communication path via which the first copy of any given order-book update is expected to arrive. Thus, as will be seen in the collective description of all 17 time periods, it never occurs that an order-book update that successfully arrives in feed 'A' via 'P1' is ever silently discarded, as such order-book updates are always the first copies to arrive for processing at the arbitration device 2708.

During subperiod 'T01A', it is determined at step 3604 that the current sequence number X (1) is not less than or equal to lastSent (0). Processing therefore proceeds to step 3606, where it is determined that the current sequence number X (1) is equal to the quantity (lastSent (0)+1). Processing therefore proceeds to (i) step 3618, in which order-book update #1 is sent and (ii) step 3620, in which 'lastSent' is updated to '1'. Processing then returns to step 3602 on the send-update path 3632. The 'buffer' remains empty. No gap-fill request is sent. The 'missingList' remains empty.

The only order-book update that arrives for processing during time period 'T02' is order-book update #2 in feed 'A' via 'P1'.

During subperiod 'T02A', it is determined at step 3604 that the current sequence number X (2) is not less than or equal to lastSent (1). Processing therefore proceeds to step 3606, where it is determined that the current sequence number X (2) is equal to the quantity (lastSent (1)+1). Processing therefore proceeds to (i) step 3618, in which order-book update #2 is sent and (ii) step 3620, in which 'lastSent' is updated to '2'. Processing then returns to step 3602 on the send-update path 3632. The 'buffer' remains empty. No gap-fill request is sent. The 'missingList' remains empty.

The only order-book update that arrives for processing during time period 'T03' is order-book update #1 in feed 'A*' via 'P1'.

During subperiod 'T03A*', it is determined at step 3604 that the current sequence number X (1) is less than or equal to lastSent (2). Processing therefore returns to step 3602 on the silent-discard path 3631 (i.e., the current order-book update is silently discarded). The 'buffer' remains empty. No gap-fill request is sent. The 'missingList' remains empty. No updates are sent. The value of 'lastSent' remains '2'.

The only order-book update that arrives for processing during time period 'T04' is order-book update #2 in feed 'A*' via 'P1'.

During subperiod 'T04A*', it is determined at step 3604 that the current sequence number X (2) is less than or equal to lastSent (2). Processing therefore returns to step 3602 on the silent-discard path 3631. The 'buffer' remains empty. No gap-fill request is sent. The 'missingList' remains empty. No updates are sent. The value of 'lastSent' remains '2'.

The only order-book update that arrives for processing during time period 'T05' is order-book update #1 in feed 'B' via 'P2'.

During subperiod 'T05B', it is determined at step 3604 that the current sequence number X (1) is less than or equal to lastSent (2). Processing therefore returns to step 3602 on the silent-discard path 3631. The 'buffer' remains empty. No gap-fill request is sent. The 'missingList' remains empty. No updates are sent. The value of 'lastSent' remains '2'.

The two order-book updates that arrive for processing during time period 'T06' are (i) order-book update #4 in feed 'A*' via 'P1' and (ii) order-book update #2 in feed 'B' via 'P2'.

During subperiod 'T06A*', it is determined at step 3604 that the current sequence number X (4) is not less than or equal to lastSent (2). Processing therefore proceeds to step 3606, where it is determined that the current sequence number X (4) is also not equal to the quantity (lastSent (2)+1). Processing therefore proceeds to step 3608, where it is determined that the current sequence number X (4) is not in the (initially and still currently empty) 'buffer'. Processing therefore proceeds to step 3609, where it is determined that the (empty) 'buffer' does not currently end with the order-book update having the sequence number 'X−1' (3) that immediately precedes the current sequence number X (4). Processing therefore proceeds to step 3610, where it is determined that the current sequence number X (4) is also not in the (initially and still currently empty) 'missingList'. Processing therefore proceeds to (i) step 3614, where (a) a gap-fill request—directed to just order-book update #3—is sent and (b) the sequence number '3' is added to the 'missingList' (which therefore then equals {3}) and (ii) step 3616, where the current sequence number X (4) is added to the 'buffer' (which therefore then equals {4}). Processing then returns to step 3602 on the save-update path 3633. No updates are sent. The value of 'lastSent' remains '2'.

During subperiod 'T06B', it is determined at step 3604 that the current sequence number X (2) is less than or equal to lastSent (2). Processing therefore returns to step 3602 on the silent-discard path 3631. The 'buffer' contents remain {4}. No gap-fill request is sent. The 'missingList' contents remain {3}. No updates are sent. The value of 'lastSent' remains '2'.

The four order-book updates that arrive for processing during time period 'T07' are (i) order-book update #7 in feed 'A' via 'P1', (ii) order-book update #5 in feed 'A*' via 'P1', (iii) order-book update #3 in feed 'B' via 'P2', and (iv) order-book update #1 in feed 'B*' via 'P2'.

During subperiod 'T07A', it is determined at step 3604 that the current sequence number X (7) is not less than or equal to lastSent (2). Processing therefore proceeds to step 3606, where it is determined that the current sequence number X (7) is also not equal to the quantity (lastSent (2)+1). Processing therefore proceeds to step 3608, where it is determined that the current sequence number X (7) is not in the 'buffer' ({4}). Processing therefore proceeds to step 3609, where it is determined that the 'buffer' ({4}) does not currently end with the order-book update having the sequence number 'X−1' (6) that immediately precedes the current sequence number X (7). Processing therefore proceeds to step 3610, where it is determined that the current sequence number X (7) is also not in the 'missingList' ({3}). Processing therefore proceeds to (i) step 3614, where (a) a gap-fill request—directed to order-book updates #5 and #6—is sent and (b) the sequence numbers '5' and '6' are added to the 'missingList' (which therefore then equals {3,5,6}) and (ii) step 3616, where the current sequence number X (7) is added to the 'buffer' (which therefore then equals {4,7}). Processing then returns to step 3602 on the save-update path 3633. No updates are sent. The value of 'lastSent' remains '2'.

During subperiod 'T07A*', it is determined at step 3604 that the current sequence number X (5) is not less than or equal to lastSent (2). Processing therefore proceeds to step 3606, where it is determined that the current sequence number X (5) is also not equal to the quantity (lastSent (2)+1). Processing therefore proceeds to step 3608, where it is determined that the current sequence number X (5) is not in the 'buffer' ({4,7}). Processing therefore proceeds to step 3609, where it is determined that the 'buffer' ({4,7}) does not currently end with the order-book update having the sequence number 'X−1' (4) that immediately precedes the current sequence number X (5). (It is noted that order-book update #4 is in the 'buffer', just not at the end of the 'buffer' as is required for an affirmative answer to be reached at step 3609.) Processing therefore proceeds to step 3610, where it is determined that the current sequence number X (5) is in the 'missingList' ({3,5,6}). Processing therefore proceeds to (i) step 3612, where the current sequence number X (5) is removed from the 'missingList' (which therefore then equals {3,6}) and (ii) step 3616, where the current sequence number X (5) is added to the 'buffer' (which therefore then equals {4,5,7}). Processing then returns to step 3602 on the save-update path 3633. No gap-fill request is sent. No updates are sent. The value of 'lastSent' remains '2'.

During subperiod 'T07B', it is determined at step 3604 that the current sequence number X (3) is not less than or equal to lastSent (2). Processing therefore proceeds to step 3606, where it is determined that the current sequence number X (3) is equal to the quantity (lastSent (2)+1). Processing therefore proceeds to (i) step 3618, in which order-book updates #3, #4, and #5 are sent—these three order-book updates are sent because they are (a) the current order-book update (#3) and (b) the (in this case, two) order-book updates (#4 and #5) in the 'buffer' that precede the next element (6) after the current sequence number (3) in the missingList ({3,6}) and (ii) step 3620, in which 'lastSent' is updated to '5'. Processing then returns to step 3602 on the send-update path 3632. The 'buffer' has been reduced from {4,5,7} to {7}. No gap-fill request is sent. The 'missingList' has been reduced from {3,6} to {6}.

During subperiod 'T07B*', it is determined at step 3604 that the current sequence number X (1) is less than or equal to lastSent (5). Processing therefore returns to step 3602 on the silent-discard path 3631. The 'buffer' remains {7}. No gap-fill request is sent. The 'missingList' remains {6}. No updates are sent. The value of 'lastSent' remains '5'.

The three order-book updates that arrive for processing during time period 'T08' are (i) order-book update #8 in feed 'A' via 'P2', (ii) order-book update #4 in feed 'B' via 'P2', and (iii) order-book update #2 in feed 'B*' via 'P2'.

During subperiod 'T08A', it is determined at step 3604 that the current sequence number X (8) is not less than or equal to lastSent (5). Processing therefore proceeds to step 3606, where it is determined that the current sequence number X (8) is also not equal to the quantity (lastSent (5)+1). Processing therefore proceeds to step 3608, where it is determined that the current sequence number X (8) is not in the 'buffer' ({7}). Processing therefore proceeds to step 3609, where it is determined that the 'buffer' ({4,7}) does currently end with the order-book update having the sequence number 'X−1' (7) that immediately precedes the current sequence number X (8). Processing therefore proceeds to step 3616, where the current sequence number X (8) is added to the 'buffer' (which therefore then equals {7,8}). Processing then returns to step 3602 on the save-update path 3633. No gap-fill request is sent. The 'missingList' remains {6}. No updates are sent. The value of 'lastSent' remains '5'.

During subperiod 'T08B', it is determined at step 3604 that the current sequence number X (4) is less than or equal to lastSent (5). Processing therefore returns to step 3602 on the silent-discard path 3631. The 'buffer' contents remain {7,8}. No gap-fill request is sent. The 'missingList' contents remain {6}. No updates are sent. The value of 'lastSent' remains '5'.

During subperiod 'T08B*', it is determined at step 3604 that the current sequence number X (2) is less than or equal to lastSent (5). Processing therefore returns to step 3602 on the silent-discard path 3631. The 'buffer' contents remain {7,8}. No gap-fill request is sent. The 'missingList' contents remain {6}. No updates are sent. The value of 'lastSent' remains '5'.

Turning now to FIG. 37B, the four order-book updates that arrive for processing during time period 'T09' are (i) order-book update #9 in feed 'A' via 'P1', (ii) order-book update #7 in feed 'A*' via 'P1', (iii) order-book update #5 in feed 'B' via 'P2', and (iv) order-book update #3 in feed 'B*' via 'P2'.

During subperiod 'T09A', it is determined at step 3604 that the current sequence number X (9) is not less than or equal to lastSent (5). Processing therefore proceeds to step 3606, where it is determined that the current sequence number X (9) is also not equal to the quantity (lastSent (5)+1). Processing therefore proceeds to step 3608, where it is determined that the current sequence number X (9) is not in the 'buffer' ({7,8}). Processing therefore proceeds to step 3609, where it is determined that the 'buffer' ({7,8}) does currently end with the order-book update having the sequence number 'X−1' (8) that immediately precedes the current sequence number X (9). Processing therefore proceeds to step 3616, where the current sequence number X (9) is added to the 'buffer' (which therefore then equals {7,8, 9}). Processing then returns to step 3602 on the save-update path 3633. No gap-fill request is sent. The 'missingList' remains {6}. No updates are sent. The value of 'lastSent' remains '5'.

During subperiod 'T09A*', it is determined at step 3604 that the current sequence number X (7) is not less than or equal to lastSent (5). Processing therefore proceeds to step 3606, where it is determined that the current sequence number X (7) is also not equal to the quantity (lastSent (5)+1). Processing therefore proceeds to step 3608, where it is determined that the current sequence number X (7) is in the 'buffer' ({7,8,9}). Processing therefore returns to step 3602 on the silent-discard path 3631. The 'buffer' remains {7,8,9}. No gap-fill request is sent. The 'missingList' remains {6}. No updates are sent. The value of 'lastSent' remains '5'.

During subperiod 'T09B', it is determined at step 3604 that the current sequence number X (5) is less than or equal to lastSent (5). Processing therefore returns to step 3602 on the silent-discard path 3631. The 'buffer' remains {7,8,9}. No gap-fill request is sent. The 'missingList' remains {6}. No updates are sent. The value of 'lastSent' remains '5'.

During subperiod 'T09B*', it is determined at step 3604 that the current sequence number X (3) is less than or equal to lastSent (5). Processing therefore returns to step 3602 on the silent-discard path 3631. The 'buffer' remains {7,8,9}. No gap-fill request is sent. The 'missingList' remains {6}. No updates are sent. The value of 'lastSent' remains '5'.

The three order-book updates that arrive for processing during time period 'T10' are (i) order-book update #10 in feed 'A' via 'P1', (ii) order-book update #8 in feed 'A*' via 'P1', and (iii) order-book update #4 in feed 'B*' via 'P2'.

During subperiod 'T10A', it is determined at step 3604 that the current sequence number X (10) is not less than or equal to lastSent (5). Processing therefore proceeds to step 3606, where it is determined that the current sequence number X (10) is also not equal to the quantity (lastSent (5)+1). Processing therefore proceeds to step 3608, where it is determined that the current sequence number X (10) is not in the 'buffer' ({7,8,9}). Processing therefore proceeds to step 3609, where it is determined that the 'buffer' ({7,8,9}) does currently end with the order-book update having the sequence number 'X−1' (9) that immediately precedes the current sequence number X (10). Processing therefore proceeds to step 3616, where the current sequence number X (10) is added to the 'buffer' (which therefore then equals {7,8,9,10}). Processing then returns to step 3602 on the save-update path 3633. No gap-fill request is sent. The 'missingList' remains {6}. No updates are sent. The value of 'lastSent' remains '5'.

During subperiod 'T10A*', it is determined at step 3604 that the current sequence number X (8) is not less than or equal to lastSent (5). Processing therefore proceeds to step 3606, where it is determined that the current sequence number X (8) is also not equal to the quantity (lastSent (5)+1). Processing therefore proceeds to step 3608, where it is determined that the current sequence number X (8) is in the 'buffer' ({7,8,9,10}). Processing therefore returns to step 3602 on the silent-discard path 3631. The 'buffer' remains {7,8,9,10}. No gap-fill request is sent. The 'missingList' remains {6}. No updates are sent. The value of 'lastSent' remains '5'.

During subperiod 'T10B*', it is determined at step 3604 that the current sequence number X (4) is less than or equal to lastSent (5). Processing therefore returns to step 3602 on the silent-discard path 3631. The 'buffer' remains {7,8,9,10}. No gap-fill request is sent. The 'missingList' remains {6}. No updates are sent. The value of 'lastSent' remains '5'.

The four order-book updates that arrive for processing during time period 'T11' are (i) order-book update #11 in feed 'A' via 'P1', (ii) order-book update #9 in feed 'A*' via 'P1', (iii) order-book update #7 in feed 'B' via 'P2', and (iv) order-book update #5 in feed 'B*' via 'P2'.

During subperiod 'T11A', it is determined at step 3604 that the current sequence number X (11) is not less than or equal to lastSent (5). Processing therefore proceeds to step 3606, where it is determined that the current sequence number X (11) is also not equal to the quantity (lastSent (5)+1). Processing therefore proceeds to step 3608, where it is determined that the current sequence number X (11) is not in the 'buffer' ({7,8,9,10}). Processing therefore proceeds to step 3609, where it is determined that the 'buffer' ({7,8,9,10}) does currently end with the order-book update having the sequence number 'X−1' (10) that immediately precedes the current sequence number X (11). Processing therefore proceeds to step 3616, where the current sequence number X (11) is added to the 'buffer' (which therefore then equals {7,8,9,10,11}). Processing then returns to step 3602 on the save-update path 3633. No gap-fill request is sent. The 'missingList' remains {6}. No updates are sent. The value of 'lastSent' remains '5'.

During subperiod 'T11A*', it is determined at step 3604 that the current sequence number X (9) is not less than or equal to lastSent (5). Processing therefore proceeds to step 3606, where it is determined that the current sequence number X (9) is also not equal to the quantity (lastSent (5)+1). Processing therefore proceeds to step 3608, where it is determined that the current sequence number X (9) is in the 'buffer' ({7,8,9,10,11}). Processing therefore returns to step 3602 on the silent-discard path 3631. The 'buffer' remains {7,8,9,10,11}. No gap-fill request is sent. The 'missingList' remains {6}. No updates are sent. The value of 'lastSent' remains '5'.

During subperiod 'T11B', it is determined at step 3604 that the current sequence number X (7) is not less than or equal to lastSent (5). Processing therefore proceeds to step 3606, where it is determined that the current sequence number X (7) is also not equal to the quantity (lastSent (5)+1). Processing therefore proceeds to step 3608, where it is determined that the current sequence number X (7) is in the 'buffer' ({7,8,9,10,11}). Processing therefore returns to step 3602 on the silent-discard path 3631. The 'buffer' remains {7,8,9,10,11}. No gap-fill request is sent. The 'missingList' remains {6}. No updates are sent. The value of 'lastSent' remains '5'.

During subperiod 'T11B*', it is determined at step 3604 that the current sequence number X (5) is less than or equal to lastSent (5). Processing therefore returns to step 3602 on the silent-discard path 3631. The 'buffer' remains {7,8,9,10,11}. No gap-fill request is sent. The 'missingList' remains {6}. No updates are sent. The value of 'lastSent' remains '5'.

The three order-book updates that arrive for processing during time period 'T12' are (i) order-book update #12 in feed 'A' via 'P1', (ii) order-book update #10 in feed 'A*' via 'P1', and (iii) order-book update #8 in feed 'B' via 'P2'.

During subperiod 'T12A', it is determined at step 3604 that the current sequence number X (12) is not less than or equal to lastSent (5). Processing therefore proceeds to step 3606, where it is determined that the current sequence number X (12) is also not equal to the quantity (lastSent (5)+1). Processing therefore proceeds to step 3608, where it is determined that the current sequence number X (12) is not in the 'buffer' ({7,8,9,10,11}). Processing therefore proceeds to step 3609, where it is determined that the 'buffer' ({7,8,9,10,11}) does currently end with the order-book update having the sequence number 'X−1' (11) that immediately precedes the current sequence number X (12). Processing therefore proceeds to step 3616, where the current sequence number X (12) is added to the 'buffer' (which therefore then equals {7,8,9,10,11,12}). Processing then returns to step 3602 on the save-update path 3633. No gap-fill request is sent. The 'missingList' remains {6}. No updates are sent. The value of 'lastSent' remains '5'.

During subperiod 'T12A*', it is determined at step 3604 that the current sequence number X (10) is not less than or equal to lastSent (5). Processing therefore proceeds to step 3606, where it is determined that the current sequence number X (10) is also not equal to the quantity (lastSent (5)+1). Processing therefore proceeds to step 3608, where it is determined that the current sequence number X (10) is in the 'buffer' ({7,8,9,10,11,12}). Processing therefore returns to step 3602 on the silent-discard path 3631. The 'buffer' remains {7,8,9,10,11,12}. No gap-fill request is sent. The 'missingList' remains {6}. No updates are sent. The value of 'lastSent' remains '5'.

During subperiod 'T12B', it is determined at step 3604 that the current sequence number X (8) is not less than or equal to lastSent (5). Processing therefore proceeds to step 3606, where it is determined that the current sequence number X (8) is also not equal to the quantity (lastSent (5)+1). Processing therefore proceeds to step 3608, where it is determined that the current sequence number X (8) is in the 'buffer' ({7,8,9,10,11,12}). Processing therefore returns to step 3602 on the silent-discard path 3631. The 'buffer' remains {7,8,9,10,11,12}. No gap-fill request is sent. The 'missingList' remains {6}. No updates are sent. The value of 'lastSent' remains '5'.

Turning now to FIG. 37C, the four order-book updates that arrive for processing during time period 'T13' are (i) order-book update #13 in feed 'A' via 'P1', (ii) order-book update #11 in feed 'A*' via 'P1', (iii) order-book update #9 in feed 'B' via 'P2', and (iv) order-book update #7 in feed 'B*' via 'P2'.

During subperiod 'T13A', it is determined at step 3604 that the current sequence number X (13) is not less than or equal to lastSent (5). Processing therefore proceeds to step 3606, where it is determined that the current sequence number X (13) is also not equal to the quantity (lastSent (5)+1). Processing therefore proceeds to step 3608, where it is determined that the current sequence number X (13) is not in the 'buffer' ({7,8,9,10,11,12}). Processing therefore proceeds to step 3609, where it is determined that the 'buffer' ({7,8,9,10,11,12}) does currently end with the order-book update having the sequence number 'X−1' (12) that immediately precedes the current sequence number X (13). Processing therefore proceeds to step 3616, where the current sequence number X (13) is added to the 'buffer' (which therefore then equals {7,8,9,10,11,12,13}). Processing then returns to step 3602 on the save-update path 3633. No gap-fill request is sent. The 'missingList' remains {6}. No updates are sent. The value of 'lastSent' remains '5'.

During subperiod 'T13A*', it is determined at step 3604 that the current sequence number X (11) is not less than or equal to lastSent (5). Processing therefore proceeds to step 3606, where it is determined that the current sequence number X (11) is also not equal to the quantity (lastSent (5)+1). Processing therefore proceeds to step 3608, where it is determined that the current sequence number X (11) is in the 'buffer' ({7,8,9,10,11,12,13}). Processing therefore returns to step 3602 on the silent-discard path 3631. The 'buffer' remains {7,8,9,10,11,12,13}. No gap-fill request is sent. The 'missingList' remains {6}. No updates are sent. The value of 'lastSent' remains '5'.

During subperiod 'T13B', it is determined at step 3604 that the current sequence number X (9) is not less than or equal to lastSent (5). Processing therefore proceeds to step 3606, where it is determined that the current sequence number X (9) is also not equal to the quantity (lastSent (5)+1). Processing therefore proceeds to step 3608, where it is determined that the current sequence number X (9) is in the 'buffer' ({7,8,9,10,11,12,13}). Processing therefore returns to step 3602 on the silent-discard path 3631. The 'buffer' remains {7,8,9,10,11,12,13}. No gap-fill request is sent. The 'missingList' remains {6}. No updates are sent. The value of 'lastSent' remains '5'.

During subperiod 'T13B*', it is determined at step 3604 that the current sequence number X (7) is not less than or equal to lastSent (5). Processing therefore proceeds to step 3606, where it is determined that the current sequence number X (7) is also not equal to the quantity (lastSent (5)+1). Processing therefore proceeds to step 3608, where it is determined that the current sequence number X (7) is in the 'buffer' ({7,8,9,10,11,12,13}). Processing therefore returns to step 3602 on the silent-discard path 3631. The 'buffer' remains {7,8,9,10,11,12,13}. No gap-fill request is sent. The 'missingList' remains {6}. No updates are sent. The value of 'lastSent' remains '5'.

The five order-book updates that arrive for processing during time period 'T14' are (i) order-book update #14 in feed 'A' via 'P1', (ii) order-book update #12 in feed 'A*' via 'P1', (iii) order-book update #10 in feed 'B' via 'P2', (iv) order-book update #8 in feed 'B*' via 'P2', and (v) order-book update #3 in feed 'C' via 'G-F RESP'.

During subperiod 'T14A', it is determined at step 3604 that the current sequence number X (14) is not less than or equal to lastSent (5). Processing therefore proceeds to step 3606, where it is determined that the current sequence number X (14) is also not equal to the quantity (lastSent (5)+1). Processing therefore proceeds to step 3608, where it is determined that the current sequence number X (14) is not in the 'buffer' ({7,8,9,10,11,12,13}). Processing therefore proceeds to step 3609, where it is determined that the 'buffer' ({7,8,9,10,11,12,13}) does currently end with the order-book update having the sequence number 'X−1' (13) that immediately precedes the current sequence number X (14). Processing therefore proceeds to step 3616, where the current sequence number X (14) is added to the 'buffer' (which therefore then equals {7,8,9,10,11,12,13,14}). Processing then returns to step 3602 on the save-update path 3633. No gap-fill request is sent. The 'missingList' remains {6}. No updates are sent. The value of 'lastSent' remains '5'.

During subperiod 'T14A*', it is determined at step 3604 that the current sequence number X (12) is not less than or equal to lastSent (5). Processing therefore proceeds to step 3606, where it is determined that the current sequence number X (12) is also not equal to the quantity (lastSent (5)+1). Processing therefore proceeds to step 3608, where it is determined that the current sequence number X (12) is in the 'buffer' ({7,8,9,10,11,12,13,14}). Processing therefore returns to step 3602 on the silent-discard path 3631. The 'buffer' remains {7,8,9,10,11,12,13,14}. No gap-fill request is sent. The 'missingList' remains {6}. No updates are sent. The value of 'lastSent' remains '5'.

During subperiod 'T14B', it is determined at step 3604 that the current sequence number X (10) is not less than or equal to lastSent (5). Processing therefore proceeds to step 3606, where it is determined that the current sequence number X (10) is also not equal to the quantity (lastSent (5)+1). Processing therefore proceeds to step 3608, where it is determined that the current sequence number X (10) is in the 'buffer' ({7,8,9,10,11,12,13,14}). Processing therefore returns to step 3602 on the silent-discard path 3631. The 'buffer' remains {7,8,9,10,11,12,13,14}. No gap-fill request is sent. The 'missingList' remains {6}. No updates are sent. The value of 'lastSent' remains '5'.

During subperiod 'T14B*', it is determined at step 3604 that the current sequence number X (8) is not less than or equal to lastSent (5). Processing therefore proceeds to step 3606, where it is determined that the current sequence number X (8) is also not equal to the quantity (lastSent (5)+1). Processing therefore proceeds to step 3608, where it is determined that the current sequence number X (8) is in the 'buffer' ({7,8,9,10,11,12,13,14}). Processing therefore returns to step 3602 on the silent-discard path 3631. The 'buffer' remains {7,8,9,10,11,12,13,14}. No gap-fill request is sent. The 'missingList' remains {6}. No updates are sent. The value of 'lastSent' remains '5'.

During subperiod 'T14C', it is determined at step 3604 that the current sequence number X (3) is less than or equal to lastSent (5). Processing therefore returns to step 3602 on the silent-discard path 3631. This is an example of a gap-fill response that arrived too late to be useful and therefore was silently discarded. The 'buffer' remains {7,8,9,10,11,12,13,14}. No gap-fill request is sent. The 'missingList' remains {6}. No updates are sent. The value of 'lastSent' remains '5'.

The six order-book updates that arrive for processing during time period 'T15' are (i) order-book update #15 in feed 'A' via 'P1', (ii) order-book update #13 in feed 'A*' via 'P1', (iii) order-book update #11 in feed 'B' via 'P2', (iv) order-book update #9 in feed 'B*' via 'P2', and (v)(a) order-book update #5 and (b) order-book update #6, both in feed 'C' via 'G-F RESP'.

During subperiod 'T15A', it is determined at step 3604 that the current sequence number X (15) is not less than or equal to lastSent (5). Processing therefore proceeds to step 3606, where it is determined that the current sequence number X (15) is also not equal to the quantity (lastSent (5)+1). Processing therefore proceeds to step 3608, where it is determined that the current sequence number X (15) is not in the 'buffer' ({7,8,9,10,11,12,13,14}). Processing therefore proceeds to step 3609, where it is determined that the 'buffer' ({7,8,9,10,11,12,13,14}) does currently end with the order-book update having the sequence number 'X−1' (14) that immediately precedes the current sequence number X (15). Processing therefore proceeds to step 3616, where the current sequence number X (15) is added to the 'buffer' (which therefore then equals {7,8,9,10,11,12,13,14,15}). Processing then returns to step 3602 on the save-update path 3633. No gap-fill request is sent. The 'missingList' remains {6}. No updates are sent. The value of 'lastSent' remains '5'.

During subperiod 'T15A*', it is determined at step 3604 that the current sequence number X (13) is not less than or equal to lastSent (5). Processing therefore proceeds to step 3606, where it is determined that the current sequence number X (13) is also not equal to the quantity (lastSent (5)+1). Processing therefore proceeds to step 3608, where it is determined that the current sequence number X (13) is in the 'buffer' ({7,8,9,10,11,12,13,14,15}). Processing therefore returns to step 3602 on the silent-discard path 3631. The 'buffer' remains {7,8,9,10,11,12,13,14,15}. No gap-fill request is sent. The 'missingList' remains {6}. No updates are sent. The value of 'lastSent' remains '5'.

During subperiod 'T15B', it is determined at step 3604 that the current sequence number X (11) is not less than or equal to lastSent (5). Processing therefore proceeds to step 3606, where it is determined that the current sequence number X (11) is also not equal to the quantity (lastSent (5)+1). Processing therefore proceeds to step 3608, where it is determined that the current sequence number X (11) is in the 'buffer' ({7,8,9,10,11,12,13,14,15}). Processing therefore returns to step 3602 on the silent-discard path 3631. The 'buffer' remains {7,8,9,10,11,12,13,14,15}. No gap-fill request is sent. The 'missingList' remains {6}. No updates are sent. The value of 'lastSent' remains '5'.

During subperiod 'T15B*', it is determined at step 3604 that the current sequence number X (9) is not less than or equal to lastSent (5). Processing therefore proceeds to step 3606, where it is determined that the current sequence number X (9) is also not equal to the quantity (lastSent (5)+1). Processing therefore proceeds to step 3608, where it is determined that the current sequence number X (9) is in the 'buffer' ({7,8,9,10,11,12,13,14,15}). Processing therefore returns to step 3602 on the silent-discard path 3631. The 'buffer' remains {7,8,9,10,11,12,13,14,15}. No gap-fill request is sent. The 'missingList' remains {6}. No updates are sent. The value of 'lastSent' remains '5'.

As mentioned above, in this example, among the order-book updates that arrive for processing during time period 'T15' order-book updates #5 and #6, both of which arrive in feed 'C' via 'G-F RESP'. In at least one embodiment, these two order-book updates arrive together in a single (e.g., TCP/IP) communication from the MDPD 2704. In at least one other embodiment, these two order-book updates arrive in two separate communications from the MDPD 2704. Either way, in this described example, the process 3600 handles them one at a time—in this case, first handling order-book update #5 in a subperiod referred to herein as 'T15C1' and then handling order-book update #6 in a subperiod referred to herein as 'T15C2'. As demonstrated in the ensuing two paragraphs, these two subperiods present an example in which two order-book updates arrive as part of one or two gap-fill responses, and in which one of those two order-book updates arrives too late to be useful and the other arrives to an arbitration device 2708 that has been waiting for it.

During subperiod 'T15C1', it is determined at step 3604 that the current sequence number X (5) is less than or equal to lastSent (5). Processing therefore returns to step 3602 on the silent-discard path 3631. This is another example of an order-book update that arrived in a gap-fill response too late to be useful and therefore was silently discarded. The 'buffer' remains {7,8,9,10,11,12,13,14,15}. No gap-fill request is sent. The 'missingList' remains {6}. No updates are sent. The value of 'lastSent' remains '5'.

During subperiod 'T15C2', it is determined at step 3604 that the current sequence number X (6) is not less than or equal to lastSent (5). Processing therefore proceeds to step 3606, where it is determined that the current sequence number X (6) is equal to the quantity (lastSent (5)+1). Processing therefore proceeds to (i) step 3618, in which order-book updates #6 through #15 are sent—these ten order-book updates are sent because they are (a) the current order-book update (#6) and (b) the (in this case, nine) order-book updates (#7 through #15) in the 'buffer' that precede the next element (if there is one, which here there is not) after the current sequence number (6) in the missingList ({6}) and (ii) step 3620, in which 'lastSent' is updated to '15'. Processing then returns to step 3602 on the send-update path 3632. The 'buffer' has been reduced from {7,8,9,10,11,12,13,14,15} to { } (i.e., the empty set). No gap-fill request is sent. The 'missingList' has been reduced from {6} to { } (i.e., the empty set).

As mentioned above, with respect to the final 2 time periods (i.e., 'T16' and 'T17') that are shown in the timetable 3700 and that are described below, the omission of the rows other than 'T16A' and 'T17A' is for brevity, and makes no substantive difference since, as is explained below, the arbitration device 2708 is fully 'caught up' at this point.

The one order-book update that is described here as arriving for processing during time period 'T16' is order-book update #16 in feed 'A' via 'P1'.

During subperiod 'T16A', it is determined at step 3604 that the current sequence number X (16) is not less than or equal to lastSent (15). Processing therefore proceeds to step 3606, where it is determined that the current sequence number X (16) is equal to the quantity (lastSent (15)+1). Processing therefore proceeds to (i) step 3618, in which order-book update #16 is sent and (ii) step 3620, in which 'lastSent' is updated to '16'. Processing then returns to step 3602 on the send-update path 3632. The 'buffer' remains empty. No gap-fill request is sent. The 'missingList' remains empty.

And finally, the one order-book update that is described here as arriving for processing during time period 'T17' is order-book update #17 in feed 'A' via 'P1'.

During subperiod 'T17A', it is determined at step 3604 that the current sequence number X (17) is not less than or equal to lastSent (16). Processing therefore proceeds to step 3606, where it is determined that the current sequence number X (17) is equal to the quantity (lastSent (16)+1). Processing therefore proceeds to (i) step 3618, in which order-book update #17 is sent and (ii) step 3620, in which 'lastSent' is updated to '17'. Processing then returns to step 3602 on the send-update path 3632. The 'buffer' remains empty. No gap-fill request is sent. The 'missingList' remains empty.

What is claimed is:

1. A method comprising:
receiving, by a market data processing device (MDPD), from an upstream device, an input feed of order-book updates to respective ticker symbols in a plurality of ticker symbols;
generating, at the MDPD, a first market-data feed at least in part by:
filtering the received input feed down to a filtered feed of order-book updates by keeping only order-book updates to the respective ticker symbols in a ticker-symbol subset; and
inserting a sequence number into each order-book update in the first market-data feed;
generating, at the MDPD, a second market-data feed, wherein the second market-data feed comprises the order-book updates of the first market-data feed having the same respective sequence numbers inserted into the same respective order-book updates;
transmitting the first market-data feed via a first communication path to an arbitration device; and
transmitting the second market-data feed via a second communication path, separate and distinct from the first communication path, to the arbitration device for use by the arbitration device in conducting sequence-number-based arbitration between the first and second market-data feeds.

2. The method of claim 1, wherein the second market-data feed is a copy of the first market-data feed.

3. The method of claim 2, wherein generating the second market-data feed comprises a crosspoint switch duplicating the first market-data feed.

4. The method of claim 2, wherein the sequence numbers are feed-level sequence numbers.

5. The method of claim 2, wherein the sequence numbers are symbol-level sequence numbers.

6. The method of claim 1, wherein:
the second market-data feed is a superset of the first market-data feed;
the sequence numbers of the first and second market-data feeds are symbol-level sequence numbers; and
generating the first and second market-data feeds comprises a programmable logic circuit (PLC) of the MDPD separately generating the first and second market-data feeds from the input feed.

7. The method of claim 1, wherein the first communication path comprises one or more wireless communication links.

8. The method of claim 7, wherein the one or more wireless communication links comprise one or more point-to-point microwave communication links.

9. The method of claim 1, wherein the second communication path comprises one or more fiber-optic communication links.

10. The method of claim 1, wherein:
at least a threshold portion of a geographical footprint of the first communication path consists of one or more point-to-point microwave communication links; and
at least the threshold portion of a geographical footprint of the second communication path consists of one or more fiber-optic communication links.

11. The method of claim 1, further comprising:
transmitting a duplicate of each order-book update in the first market-data feed via the first communication path a first time delay after transmitting the corresponding order-book update; and
transmitting a duplicate of each order-book update in the second market-data feed via the second communication path a second time delay after transmitting the corresponding order-book update.

12. The method of claim 11, wherein the first and second time delays are equal to one another.

13. The method of claim 12, wherein each of the first and second time delays is 50 microseconds (µs).

14. The method of claim 11, wherein the first and second time delays are not equal to one another.

15. The method of claim 11, wherein the first time delay is selected based on an average outage duration of the first communication path.

16. The method of claim 15, further comprising:
measuring the average outage duration of the first communication path; and
selecting the first time delay to be greater than the measured average outage duration of the first communication path.

17. A market-data-processing device (MDPD) comprising:
a communication interface;
a processor; and
data storage containing instructions executable by the processor for causing the MDPD to carry out a set of functions, wherein the set of functions comprises:
receiving, by a market data processing device (MDPD), from an upstream device, an input feed of order-book updates to respective ticker symbols in a plurality of ticker symbols;
generating, at the MDPD, a first market-data feed at least in part by:
filtering the received input feed down to a filtered feed of order-book updates by keeping only order-book updates to the respective ticker symbols in a ticker-symbol subset; and
inserting a sequence number into each order-book update in the first market-data feed;
generating, at the MDPD, a second market-data feed, wherein the second market-data feed comprises the order-book updates of the first market-data feed having the same respective sequence numbers inserted into the same respective order-book updates;
transmitting the first market-data feed via a first communication path to an arbitration device; and
transmitting the second market-data feed via a second communication path, separate and distinct from the first communication path, to the arbitration device for use by the arbitration device in conducting sequence-number-based arbitration between the first and second market-data feeds.

18. A market-data-processing device (MDPD) comprising:
a communication module configured to receive, from an upstream device, an input feed of order-book updates to respective ticker symbols in a plurality of ticker symbols; and
a feed-generation module configured to:
generate a first market-data feed at least in part by:
filtering the received input feed down to a filtered feed of order-book updates by keeping only order-book updates to the respective ticker symbols in a ticker-symbol subset; and
inserting a sequence number into each order-book update in the first market-data feed;
generate a second market-data feed, wherein the second market-data feed comprises the order-book updates of the first market-data feed having the same respective sequence numbers inserted into the same respective order-book updates,
wherein the communication module is further configured to:
- transmit the first market-data feed via a first communication path to an arbitration device; and
- transmit the second market-data feed via a second communication path, separate and distinct from the first communication path, to the arbitration device for use by the arbitration device in conducting sequence-number-based arbitration between the first and second market-data feeds.

19. A method comprising:
receiving, from an upstream device via a first communication path, a pre-arbitration first market-data feed of order-book updates to respective ticker symbols in a plurality of ticker symbols, wherein each order-book update in the pre-arbitration first market-data feed comprises a respective sequence number;
receiving, from the upstream device, one or more supplemental market-data feeds of order-book updates to respective ticker symbols in the plurality of ticker symbols, wherein:
- each order-book update in each supplemental market-data feed comprises a respective sequence number;
- order-book updates having the same sequence numbers in both the pre-arbitration first market-data feed and a supplemental market-data feed represent the same updates to the same ticker symbols; and
receiving the one or more supplemental market-data feeds comprises receiving a second market-data feed via a second communication path that is separate and distinct from the first communication path;
generating a post-arbitration first market-data feed at least in part by:
- including all order-book updates received in the pre-arbitration first market-data feed in the post-arbitration first market-data feed;
- identifying gaps of one or more order-book updates missing from the pre-arbitration first market-data feed; and
- patching, in the post-arbitration first market-data feed, one or more of the gaps identified as missing from the pre-arbitration first market-data feed with one or more matching-sequence-numbered order-book updates received in at least one of the supplemental market-data feeds; and
outputting the post-arbitration first market-data feed to a market-data processor.

20. The method of claim 19, carried out by an arbitration module of a downstream device, wherein the market-data processor is a market-data-processing module of the downstream device.

21. The method of claim 19, wherein:
the second market-data feed is a superset of the pre-arbitration first market-data feed; and
the sequence numbers are symbol-level sequence numbers.

22. The method of claim 19, wherein the first communication path comprises one or more wireless communication links.

23. The method of claim 19, wherein:
at least a threshold portion of a geographical footprint of the first communication path consists of one or more point-to-point microwave communication links; and
at least the threshold portion of a geographical footprint of the second communication path consists of one or more fiber-optic communication links.

24. The method of claim 19, wherein receiving the one or more supplemental market-data feeds from the upstream device further comprises:
receiving a time-delayed duplicate of the pre-arbitration first market-data feed via the first communication path, wherein the upstream device transmitted each order-book update in the time-delayed duplicate of the pre-arbitration first market-data feed a first time delay after transmitting the matching order-book update in the pre-arbitration first market-data feed; and
receiving a time-delayed duplicate of the second market-data feed via the second communication path, wherein the upstream device transmitted each order-book update in the time-delayed duplicate of the second market-data feed a second time delay after transmitting the matching order-book update in the second market-data feed.

25. A downstream device comprising:
an arbitration module; and
a feed-processing module,
wherein the arbitration module is configured to:
receive, from an upstream device via a first communication path, a pre-arbitration first market-data feed of order-book updates to respective ticker symbols in a plurality of ticker symbols, wherein each order-book update in the pre-arbitration first market-data feed comprises a respective sequence number;
receive, from the upstream device, one or more supplemental market-data feeds of order-book updates to respective ticker symbols in the plurality of ticker symbols, wherein:
- each order-book update in each supplemental market-data feed comprises a respective sequence number;
- order-book updates having the same sequence numbers in both the pre-arbitration first market-data feed and a supplemental market-data feed represent the same updates to the same ticker symbols; and
- the arbitration module being configured to receive the one or more supplemental market-data feeds comprises the arbitration module being configured to receive a second market-data feed via a second communication path that is separate and distinct from the first communication path;
generate a post-arbitration first market-data feed at least in part by:
- including all order-book updates received in the pre-arbitration first market-data feed in the post-arbitration first market-data feed;
- identifying gaps of one or more order-book updates missing from the pre-arbitration first market-data feed; and
- patching, in the post-arbitration first market-data feed, one or more of the gaps identified as missing from the pre-arbitration first market-data feed with one or more matching-sequence-numbered order-book updates received in at least one of the supplemental market-data feeds; and
output the post-arbitration first market-data feed to the feed-processing module; and wherein the feed-processing module is configured to:
  receive the post-arbitration first market-data feed from the arbitration module; and
  process the post-arbitration first market-data feed.

* * * * *